(12) United States Patent
Abe et al.

(10) Patent No.: US 8,190,529 B2
(45) Date of Patent: May 29, 2012

(54) INFORMATION PROCESSING SYSTEM, INFORMATION COMMUNICATION TERMINAL AND METHOD, INFORMATION PROCESSING APPARATUS AND METHOD, RECORDING MEDIUM, AND PROGRAM FOR INTERNET TRANSACTION

(75) Inventors: Makoto Abe, Tokyo (JP); Shuichi Sekiya, Saitama (JP); Yuji Fukuzawa, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 1393 days.

(21) Appl. No.: 10/491,218

(22) PCT Filed: Jul. 15, 2003

(86) PCT No.: PCT/JP03/08955
§ 371 (c)(1),
(2), (4) Date: Dec. 15, 2004

(87) PCT Pub. No.: WO2004/012114
PCT Pub. Date: Feb. 5, 2004

(65) Prior Publication Data
US 2005/0086171 A1    Apr. 21, 2005

(30) Foreign Application Priority Data
Jul. 30, 2002 (JP) .................................. 2002-221577

(51) Int. Cl.
*G06F 21/00* (2006.01)
*G06F 1/00* (2006.01)
*H04L 29/06* (2006.01)
(52) U.S. Cl. ........................................ 705/54; 713/187
(58) Field of Classification Search .................... 705/52, 705/54
See application file for complete search history.

(56) References Cited

U.S. PATENT DOCUMENTS

| | | | | |
|---|---|---|---|---|
| 5,285,055 A | * | 2/1994 | Oonakahara et al. | 235/380 |
| 5,592,611 A | * | 1/1997 | Midgely et al. | 714/4 |
| 5,629,980 A | * | 5/1997 | Stefik et al. | 705/54 |

(Continued)

FOREIGN PATENT DOCUMENTS

JP    2001-297206    10/2001

(Continued)

OTHER PUBLICATIONS

"The Official eBay Guide", Kaiser, Laura Fisher and Michael. 1999. ISBN: 0-684-87372-9 or 0-684-86954-3.*

(Continued)

*Primary Examiner* — Evens J Augustin
(74) *Attorney, Agent, or Firm* — Frommer Lawrence & Haug LLP; William S. Frommer; Thomas F. Presson

(57) ABSTRACT

An information processing system, information communication terminal and method, information processing apparatus and method, recording medium, and program capable of enabling safer electronic commercial transactions. A point-of-purchase server generates purchasing information using a card Identification number allotted to a non-contact IC-card of a mobile telephone. A point-of-receipt server acquires this purchasing information and confirms the card identification number allotted to the non-contact IC card of the mobile telephone and a purchasing card identification number. The authentication server calculates user trustworthiness and store trustworthiness based on temporary commercial transaction information stored in the non-contact IC card of the mobile telephone. The calculated user trustworthiness and store trustworthiness is then reference by the mobile telephone and point-of-purchase server in the next commercial transaction.

14 Claims, 49 Drawing Sheets

U.S. PATENT DOCUMENTS

| | | | | |
|---|---|---|---|---|
| 5,825,884 A * | 10/1998 | Zdepski et al. | | 705/78 |
| 6,105,133 A | 8/2000 | Fielder et al. | | |
| 6,219,692 B1 * | 4/2001 | Stiles | | 709/201 |
| 6,223,209 B1 * | 4/2001 | Watson | | 709/201 |
| 6,298,373 B1 * | 10/2001 | Burns et al. | | 709/203 |
| 6,370,580 B2 * | 4/2002 | Kriegsman | | 709/226 |
| 7,134,024 B1 * | 11/2006 | Binding et al. | | 713/187 |
| 8,046,840 B2 * | 10/2011 | Kawell et al. | | 726/27 |
| 8,046,841 B2 * | 10/2011 | Moskowitz et al. | | 726/32 |
| RE42,893 E * | 11/2011 | Walker et al. | | 713/178 |
| RE42,921 E * | 11/2011 | Park | | 380/201 |
| RE42,922 E * | 11/2011 | Park | | 380/201 |
| RE42,950 E * | 11/2011 | Park | | 380/201 |
| RE42,951 E * | 11/2011 | Park | | 380/201 |
| 8,050,980 B2 * | 11/2011 | Ronning et al. | | 705/26.1 |
| 8,051,175 B2 * | 11/2011 | Tolson et al. | | 709/226 |
| 8,055,781 B2 * | 11/2011 | Fernandez | | 709/229 |
| 8,055,899 B2 * | 11/2011 | Levy et al. | | 713/176 |
| 8,055,913 B2 * | 11/2011 | Ginter et al. | | 713/194 |
| 8,060,504 B2 * | 11/2011 | Roegner | | 707/728 |
| 8,068,638 B2 * | 11/2011 | Malone et al. | | 382/100 |
| 8,068,679 B2 * | 11/2011 | Rhoads | | 382/227 |
| 8,069,116 B2 * | 11/2011 | Gilliam et al. | | 705/54 |
| 8,069,174 B2 * | 11/2011 | Holzgrafe et al. | | 707/738 |
| 8,073,828 B2 * | 12/2011 | Bowden et al. | | 707/705 |
| 8,078,542 B2 * | 12/2011 | Nguyen et al. | | 705/59 |
| 8,082,563 B2 * | 12/2011 | Gabriel et al. | | 725/28 |
| 8,086,537 B2 * | 12/2011 | Ogai | | 705/59 |
| 8,086,746 B2 * | 12/2011 | Patterson | | 709/229 |
| 8,090,605 B2 * | 1/2012 | Tota et al. | | 705/7.11 |
| 8,090,774 B2 * | 1/2012 | Fernandez | | 709/203 |
| 8,091,142 B2 * | 1/2012 | Liu et al. | | 726/30 |
| 8,092,307 B2 * | 1/2012 | Kelly | | 463/42 |
| 8,094,949 B1 * | 1/2012 | Rhoads | | 382/232 |
| 8,095,989 B2 * | 1/2012 | Levy | | 726/26 |
| 8,099,364 B2 * | 1/2012 | Padhye et al. | | 705/59 |
| 8,103,542 B1 * | 1/2012 | Davis et al. | | 705/14.1 |
| 8,103,592 B2 * | 1/2012 | Lilikov et al. | | 705/59 |
| 8,103,877 B2 * | 1/2012 | Hannigan et al. | | 713/176 |
| 8,104,079 B2 * | 1/2012 | Moskowitz | | 726/13 |
| 2001/0032150 A1 | 10/2001 | Terashima | | |
| 2001/0037210 A1 * | 11/2001 | Hirayama | | 705/1 |
| 2001/0037261 A1 | 11/2001 | Ishitsuka | | |
| 2002/0016910 A1 * | 2/2002 | Wright et al. | | 713/150 |
| 2002/0016913 A1 * | 2/2002 | Wheeler et al. | | 713/170 |
| 2003/0014372 A1 * | 1/2003 | Wheeler et al. | | 705/71 |

FOREIGN PATENT DOCUMENTS

| | | |
|---|---|---|
| JP | 2001-306864 | 11/2001 |
| JP | 2002-157541 | 5/2002 |
| JP | 2002 157541 | 5/2002 |
| JP | 2002 207928 | 7/2002 |
| JP | 2002-207928 | 7/2002 |

OTHER PUBLICATIONS

"How Networks Work", Derfler, Frank and Les Freed. 2000.*

"How the Internet Works", Gralla, Preson. 2002.*

Network Security Essentials: Applications and Standards. Stallings, William. Prentice-Hall, 2000. pp. 203-223 provided, ISBN 0-13-016093-8.*

ISO/IEC 14443, Identification Cards—Contactless integrated circuit(s) cards—Proximity cards. "Part 1—Physical Characteristics". 1997.*

ISO/IEC 14443, Identification Cards—Contactless integrated circuit(s) cards—Proximity cards. "Part 2—Radio frequency power and signal interface". 1997.*

ISO/IEC 14443, Identification Cards—Contactless integrated circuit(s) cards—Proximity cards. "Part 3—Initialization & anticollision". 1997.*

ISO/IEC 14443, Identification Cards—Contactless integrated circuit(s) cards—Proximity cards. "Part 4—Transmission protocols". 1997.*

Menezes, A. J., Oorschot Paul C. Van, and Scott a. Vanstone. Handbook of Applied Cryptography. Boca Raton: CRC, 1997. http://www.cacr.math.uwaterloo.ca/hac. Web. Chapter 11 included.*

Rankl, W., and W. Effing. Smart Card Handbook. Chichester, England: Wiley, 2000. Print. Front matter, back matter, chapters 1, 2 included.*

White, Ron. How Computers Work. Indianapolis, IN: Que, 1998. Print. Front matter, back matter, and pp. 69-79 included.*

Rankl, Wolfgang et al. Smart Card Handbook, Second Edition. Wiley, New York, 2000. pp. 349-353 included.*

* cited by examiner

FIG. 6

| SPECIFIED ITEMS | | | |
|---|---|---|---|
| COMMUNICATION SPEED | | | 211.875kbps |
| ELECTRICAL POWER TRANSMISSION | | CENTER FREQUENCY | 13.56MHz |
| | | OUTPUT | 350mW |
| DATA TRANSFER | R/W → CARD | CENTER FREQUENCY | 13.56MHz |
| | | MODULATION METHOD | ASK |
| | CARD → R/W | CENTER FREQUENCY | 13.56MHz |
| | | MODULATION METHOD | |

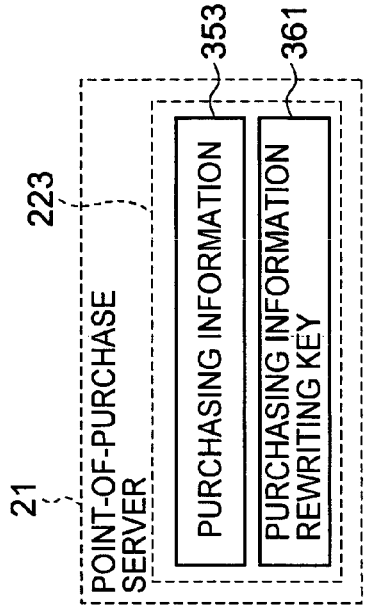
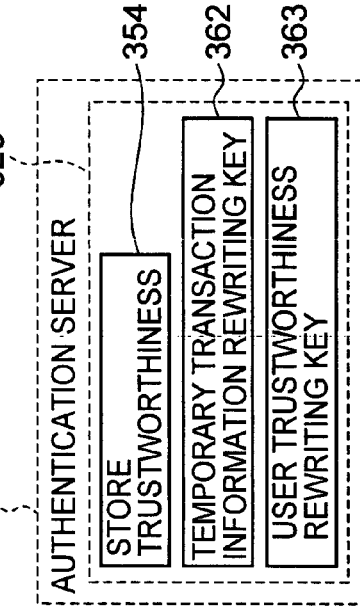
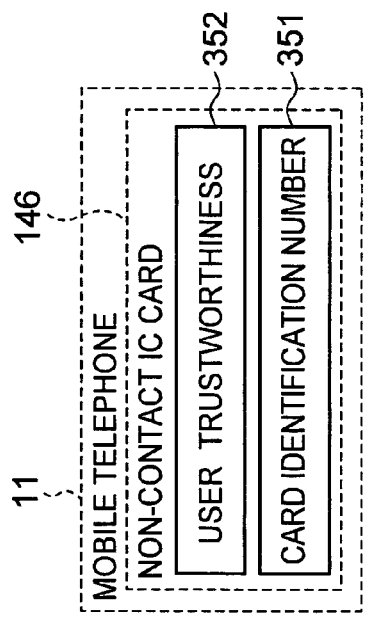
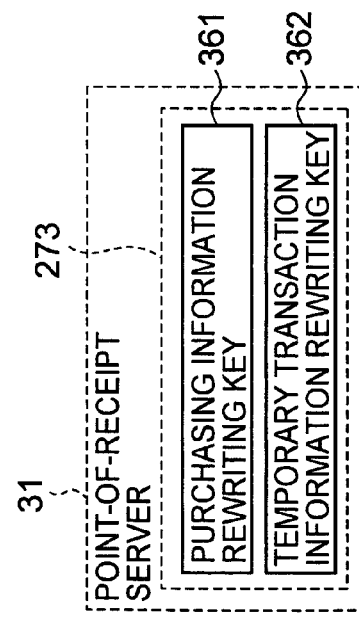

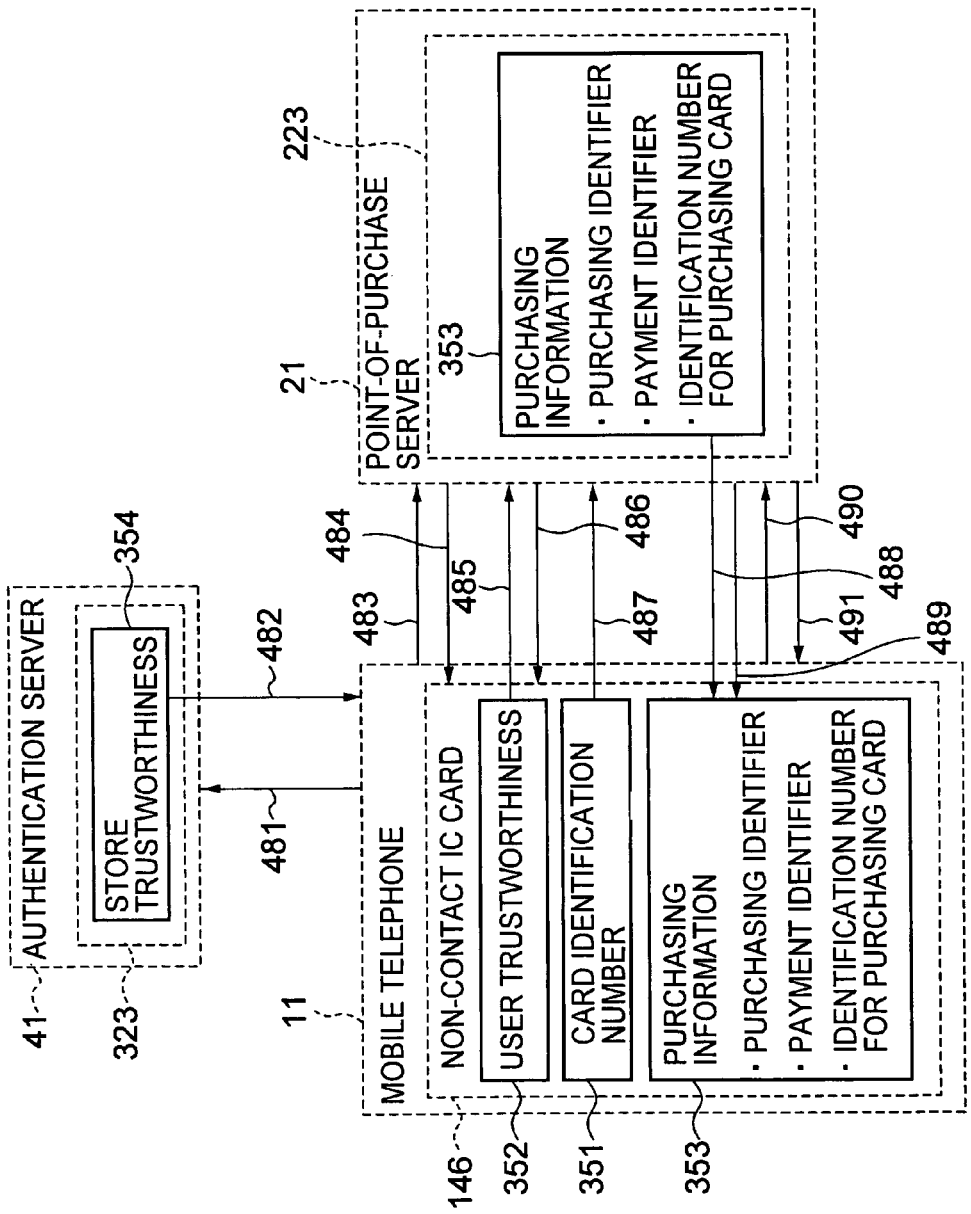

INFORMATION PROCESSING SYSTEM, INFORMATION COMMUNICATION TERMINAL AND METHOD, INFORMATION PROCESSING APPARATUS AND METHOD, RECORDING MEDIUM, AND PROGRAM FOR INTERNET TRANSACTION

TECHNICAL FIELD

The present invention relates to an information processing system, information communication terminal and method, information processing apparatus and method, recording medium, and program, and particularly relates to an information processing system, information communication terminal and method, information processing apparatus and method, recording medium, and program capable of enabling safer electronic commercial transactions in a straightforward manner.

BACKGROUND ART

In the related art, when operations relating to commercial transactions such as ordering merchandise, paying a charge, or receiving a product, etc., differ with respect to time and position, such as, for example, in cases of a purchaser making a reservation in advance in order to purchase merchandise, or in cases where a purchaser receives merchandise purchased by an electronic commercial transaction via the Internet at a shop such as their nearest convenience store, the shop assistant in the shop that is handing over the merchandise asks the purchaser to disclose personal information such as their name, address, and telephone number etc. in order to confirm whether or not the person coming to the shop is the purchaser of the merchandise. Alternatively, by distributing prescribed reservation tokens and exchange tokens to purchasers beforehand on the sales side, the shop assistant handing over the merchandise can confirm whether or not the customer coming to the shop is the purchaser to whom the merchandise is to be handed over to by presenting the distributed reservation tokens and exchange tokens to customers.

However, in the case described above, it is necessary for the purchaser of the merchandise to provide their personal information. In particular, in cases where the provided personal information is saved on a computer in a shop, there is the fear the information provided may be misappropriated for other uses or may be disclosed.

Further, in cases where prescribed reservation tokens and exchange tokens are distributed in advance at places selling the merchandise, there is the fear that the reservation tokens and exchange tokens may be fraudulently made or may be copied.

DISCLOSURE OF INVENTION

The present invention has been conceived in order to take this situation into consideration and is aimed at setting out to enable safer electronic commercial transactions to be carried out in a straightforward manner.

An information processing system of the present invention is characterized by an information communication terminal connected to a network, for holding information relating to a commercial transaction and an information processing apparatus connected to the network, for managing information relating to the commercial transaction, wherein the information communication terminal comprises first acquiring means for acquiring information relating to the commercial transaction from the information processing apparatus during merchandise purchasing, first storage means for storing information relating to the commercial transaction acquired by the first acquiring means, and first providing means for providing information relating to the commercial transaction stored by the first storage means to the information processing apparatus during receipt of merchandise, wherein the information processing apparatus comprises second providing means for providing information relating to the commercial transaction to the information communication terminal during merchandise sales, second storage means for storing information relating to the commercial transaction, second acquiring means for acquiring information relating to the commercial transaction from the information communication terminal during merchandise delivery, and authentication means for authenticating information relating to said commercial transaction acquired by the second acquiring means using information relating to the commercial transaction stored by the second storage means.

A second information processing system of the present invention is characterized by an information communication terminal connected to a network, for holding information relating to a commercial transaction, a first information processing apparatus connected to the network, for managing information relating to the commercial transaction, and a second information processing apparatus connected to the network, for managing information relating to trustworthiness of a first user constituting a user of the information communication terminal and information relating to trustworthiness of a second user constituting a user of the first information processing apparatus, wherein the information communication terminal comprises first storage means for storing information relating to trustworthiness of the first user, first providing means for providing information relating to trustworthiness of the first user stored by the first storage means to the first information processing apparatus, first acquiring means for acquiring information relating to trustworthiness of the second user from the second information processing apparatus, second acquiring means for acquiring information relating to the commercial transaction from the first information processing apparatus, first providing means for providing trustworthiness of the first user stored by the first storage means and information relating to the commercial transaction acquired by the second acquiring means to the second information processing apparatus, and third acquiring means for acquiring information relating to trustworthiness of the first user updated by the second information processing apparatus, wherein the first information processing apparatus comprises fourth acquiring means for acquiring information relating to trustworthiness of the first user from the information communication terminal, and second providing means for providing information relating to the commercial transaction to the information communication terminal, and the second information processing apparatus comprises second storage means for storing information relating to trustworthiness of the second user, second providing means for providing information relating to trustworthiness of the second user stored by the second storage means to the information communication terminal, fifth acquiring means for acquiring information relating to the first user from the information communication terminal and information relating to the commercial transaction, updating means for updating information relating to the first user acquired by the fifth acquiring means and information relating to trustworthiness of the second user stored by the second storage means based on information relating to the commercial transaction acquired by the fifth acquiring means, and third providing means for providing the information relating to trustworthiness of the first user updated by the updating means to the information communication terminal.

An information communication terminal of the present invention is characterized by first acquiring means for acquiring information relating to a commercial transaction employed in user authentication from the first information processing apparatus during merchandise purchasing, storage means for storing information relating to the commercial transaction acquired by the first acquiring means, and first providing means for providing the information relating to the commercial transaction stored by the storage means to the first information processing apparatus during receipt of merchandise.

The information communication device is further characterized by wireless communication means for carrying out short-range wireless communication via electromagnetic radiation with the first information processing apparatus in close proximity. The first providing means is then capable of providing information relating to the commercial transaction to the first information processing apparatus using short-range wireless communication by the wireless communication means.

The aforementioned storage means stores an identification number identifying the information communication terminal, and the first providing means is capable of providing the identification number stored by the storage means to the first information processing apparatus together with information relating to the commercial transaction during receipt of merchandise.

Information relating to the commercial transaction is made to contain a first identifier for identifying the commercial transaction, a second identifier for identifying whether or not payment of fees is complete for the commercial transaction, and the identification number of the information communication terminal used in the commercial transaction.

It is also possible to further provide second acquiring means for acquiring key information required to edit information relating to the aforementioned commercial transaction, and deleting means for deleting information relating to the commercial transaction stored by the storage means using the key information acquired by the second acquiring means.

It is also possible for the aforementioned storage means to store information relating to trustworthiness of the user decided based on results of commercial transactions of the user up to this point, and to further provide providing means for providing information relating to trustworthiness of the user stored by the storage means to the first information processing apparatus during receipt of the merchandise.

Second acquiring means for acquiring key information required to edit information relating to trustworthiness of the aforementioned user may also be provided, and the storage means may store information relating to trustworthiness of the user using the key information acquired by the second acquiring means.

It is also possible to provide password input means for inputting a password permitting providing of information relating to trustworthiness of the user, and authentication means for authenticating the password inputted by the password input means. The providing means then provides information relating to trustworthiness of the user when the password is authenticated by authentication by the authentication means.

Second acquiring means for acquiring information relating to trustworthiness of a commercial transaction target of the commercial transaction constituted by the user of the aforementioned first information processing apparatus from a second information processing apparatus separate from the first information processing apparatus, and display means for displaying information relating to trustworthiness of the commercial transaction target acquired by the second acquiring means may also be provided.

Third acquiring means for acquiring information relating to the first information processing apparatus from the first information processing means in order to decide trustworthiness of the commercial transaction target of the commercial transaction and second providing means for providing information relating to the first information processing apparatus acquired by the third acquiring means to the second information processing apparatus may also be provided. The storage means then further stores information relating to the first information processing apparatus acquired by the third acquiring means.

Fourth acquiring means for acquiring key information required to edit information relating to the aforementioned first information processing apparatus, and deleting means for deleting information relating to the first information processing apparatus stored by the storage means using the key information acquired by the fourth acquiring means may also be provided.

An information communication method of the present invention may also be characterized by an acquisition control step of controlling acquiring of information relating to a commercial transaction used in authentication of a user provided by the information processing apparatus during merchandise purchasing, a storage control step of controlling information relating to the commercial transaction where acquisition is controlled by processing of the acquisition control step, and a first providing control step of controlling providing of information relating to the commercial transaction with storage controlled by processing of the storage control step to the information processing apparatus when receiving merchandise.

A first recording medium program of the present invention may also be characterized by an acquisition control step of controlling acquiring of information relating to a commercial transaction used in authentication of a user provided by the information processing apparatus during merchandise purchasing, a storage control step of controlling information relating to the commercial transaction where acquisition is controlled by processing of the acquisition control step, and a first providing control step of controlling providing of information relating to the commercial transaction with storage controlled by processing of the storage control step to the information processing apparatus when receiving merchandise.

A first program of the present invention may also be characterized by implementing an acquisition control step of controlling acquiring of information relating to a commercial transaction used in authentication of a user provided by the information processing apparatus during merchandise purchasing, a storage control step of controlling information relating to the commercial transaction where acquisition is controlled by processing of the acquisition control step, and a first providing control step of controlling providing of information relating to the commercial transaction with storage controlled by processing of the storage control step to the information processing apparatus when receiving merchandise on a computer.

A first information processing apparatus of the present invention may be characterized by first acquiring means for acquiring information relating to trustworthiness of a target of the commercial transaction from a communication terminal of the commercial transaction target of the commercial transaction, generating means for generating information relating to the commercial transaction during merchandise sales, first providing means for providing information relating to the commercial transaction generated by the generating means to the information communication terminal, storage means for storing information relating to the commercial transaction generated by the generating means, second acquiring means for acquiring information relating to the commercial transaction from the information communication terminal during merchandise delivery, authentication means for authenticating information relating to the commercial transaction acquired by the second acquiring means using information relating to the commercial transaction stored by the storage means, and second providing means for providing information relating to the information processing apparatus for generating information relating to user trustworthiness to the information communication terminal authenticated by the authentication means.

A first information processing method of the present invention may be characterized by a first acquisition control step of controlling the acquisition of information relating to trustworthiness of a target of the commercial transaction provided by a communication terminal of the commercial transaction target of the commercial transaction, a generating step for generating information relating to the commercial transaction during merchandise sales, a first providing control step for controlling providing of information relating to the commercial transaction generated by the generating step process to the information communication terminal, a storage control step for controlling storage of information relating to the commercial transaction generated by the generating step process, a second acquisition control step for controlling acquisition of information relating to the commercial transaction provided by the information communication terminal during merchandise delivery, an authentication step for authenticating information relating to the commercial transaction having acquisition thereof controlled by the second acquisition control step using information relating to the commercial transaction having storage thereof controlled by the storage control step process, and a first providing control step for controlling providing of information relating to the information processing apparatus for generating information relating to user trustworthiness to the information communication terminal authenticated by the authentication step processing.

A second recording medium program of the present invention may be characterized by a first acquisition control step of controlling the acquisition of information relating to trustworthiness of a target of the commercial transaction provided by a communication terminal of the commercial transaction target of the commercial transaction, a generating step for generating information relating to the commercial transaction during merchandise sales, a first providing control step for controlling providing of information relating to the commercial transaction generated by the generating step process to the information communication terminal, a storage control step for controlling storage of information relating to the commercial transaction generated by the generating step process, a second acquisition control step for controlling acquisition of information relating to the commercial transaction provided by the information communication terminal during merchandise delivery, an authentication step for authenticating information relating to the commercial transaction having acquisition thereof controlled by the second acquisition control step using information relating to the commercial transaction having storage thereof controlled by the storage control step process, and a first providing control step for controlling providing of information relating to the information processing apparatus for generating information relating to user trustworthiness to the information communication terminal authenticated by the authentication step processing.

A second program of the present invention may be characterized by implementing a first acquisition control step of controlling the acquisition of information relating to trustworthiness of a target of the commercial transaction provided by a communication terminal of the commercial transaction target of the commercial transaction, a generating step for generating information relating to the commercial transaction during merchandise sales, a first providing control step for controlling providing of information relating to the commercial transaction generated by the generating step process to the information communication terminal, a storage control step for controlling storage of information relating to the commercial transaction generated by the generating step process, a second acquisition control step for controlling acquisition of information relating to the commercial transaction provided by the information communication terminal during merchandise delivery, an authentication step for authenticating information relating to the commercial transaction having acquisition thereof controlled by the second acquisition control step using information relating to the commercial transaction having storage thereof controlled by the storage control step process, and a first providing control step for controlling providing of information relating to the information processing apparatus for generating information relating to user trustworthiness to the information communication terminal authenticated by the authentication step processing on a computer.

A second information processing apparatus of the present invention is characterized by storage means for storing information relating to trustworthiness of the second user, providing means for providing information relating to trustworthiness of the second user stored by the storage means to the information communication terminal, acquiring means for acquiring information relating to the first user from the information communication terminal and information relating to a commercial transaction, updating means for updating information relating to the first user acquired by the acquiring means and information relating to trustworthiness of the second user stored by the storage means based on information relating to the commercial transaction acquired by the acquiring means, and providing means for providing information relating to trustworthiness of the first user updated by the updating means to the information communication terminal.

A second information processing method of the present invention is characterized by a storage control step of controlling storage of information relating to trustworthiness of the second user, a provision control step of controlling providing of information relating to trustworthiness of the second user, the storage thereof being controlled by processing of the storage control step, to the information communication terminal, an acquisition control step of controlling acquisition of information relating to the first user provided by the information communication terminal and information relating to a commercial transaction, an updating step for updating information relating to trustworthiness of the first user with the acquisition thereof controlled by the processing of the acquisition control step and information relating to trustworthiness of the second user with the storage thereof controlled by the processing of the storage control step based on information relating to the commercial transaction with acquisition thereof controlled by processing of the acquisition control step, and a provision control step of controlling providing of information relating to trustworthiness of the first user updated by processing of the updating step, to the information communication terminal.

A third recording medium program of the present invention is characterized by a storage control step of controlling storage of information relating to trustworthiness of the second user, a provision control step of controlling providing of information relating to trustworthiness of the second user, the storage thereof being controlled by processing of the storage control step, to the information communication terminal, an acquisition control step of controlling acquisition of information relating to the first user provided by the information communication terminal and information relating to a commercial transaction, an updating step for updating information relating to trustworthiness of the first user with the acquisition thereof controlled by the processing of the acquisition control step and information relating to trustworthiness of the second user with the storage thereof controlled by the processing of the storage control step based on information relating to the commercial transaction with acquisition thereof controlled by processing of the acquisition control step, and a provision control step of controlling providing of information relating to trustworthiness of the first user updated by processing of the updating step, to the information communication terminal.

A third recording program of the present invention is characterized by implementing a storage control step of controlling storage of information relating to trustworthiness of the second user, a provision control step of controlling providing of information relating to trustworthiness of the second user, the storage thereof being controlled by processing of the storage control step, to the information communication terminal, an acquisition control step of controlling acquisition of information relating to the first user provided by the information communication terminal and information relating to a commercial transaction, an updating step for updating information relating to trustworthiness of the first user with the acquisition thereof controlled by the processing of the acquisition control step and information relating to trustworthiness of the second user with the storage thereof controlled by the processing of the storage control step based on information relating to the commercial transaction with acquisition thereof controlled by processing of the acquisition control step, and a provision control step of controlling providing of information relating to trustworthiness of the first user updated by processing of the updating step, to the information communication terminal on a computer.

The first information processing system of the present invention is provided with an information communication terminal connected to a network, for holding information relating to a commercial transaction and an information processing apparatus connected to the network, for managing information relating to the commercial transaction. At the information communication terminal, information relating to the commercial transaction is acquired from the information processing apparatus during merchandise purchasing. Acquired information relating to the commercial transaction is then stored. Information relating to the stored commercial transaction is then provided to the information processing apparatus during receipt of the merchandise. At the information processing apparatus, information relating to the commercial transaction is provided to the information communication terminal during merchandise sales and stored. Information relating to the commercial transaction is then acquired from the information communication terminal during merchandise delivery. Information relating to the acquired commercial transaction is then authenticated using information relating to the stored commercial transaction.

A second information processing system of the present invention is characterized by: an information communication terminal connected to a network, for holding information relating to a commercial transaction; a first information processing apparatus connected to said network, for managing information relating to said commercial transaction; and a second information processing apparatus connected to said network, for managing information relating to trustworthiness of a first user constituting a user of said information communication terminal and information relating to trustworthiness of a second user constituting a user of said first information processing apparatus. At the information communication terminal, information relating to trustworthiness of the first user is stored, stored information relating to the trustworthiness of the first user is provided to the first information storage device, information relating to trustworthiness of the second user is acquired from the second information processing apparatus, information relating to a commercial transaction is acquired from the first information processing apparatus, the stored trustworthiness of the first user and acquired information relating to the commercial transaction are provided to the second processing device, and information relating to trustworthiness of the first user updated by the second information processing apparatus is acquired. At the first information processing apparatus, information relating to trustworthiness of the first user is acquired from the information communication terminal and information relating to the commercial transaction is provided to the information communication terminal. At the second information processing apparatus, information relating to the trustworthiness of the second user is stored, stored information relating to the trustworthiness of the second user is provided to the information communication terminal, information relating to the trustworthiness of the first user from the information communication terminal and information relating to the commercial transaction is acquired, information relating to the trustworthiness of the first user and information relating to the trustworthiness of the second user is updated based on the acquired information relating to the commercial transaction, and information relating to the updated first user trustworthiness is provided to the information communication terminal.

With the information communication terminal and method, and first program of the present invention, information relating to commercial transactions used in authentication of a user is acquired from the first information processing apparatus during merchandise purchasing, this acquired information relating to commercial transactions is stored, and the information relating to stored commercial transactions is provided to the first information processing apparatus when receiving merchandise.

With the first information processing apparatus and method and the second program of the present invention, information relating to trustworthiness of a commercial transaction target is acquired from the information communication terminal of the communication target of the commercial transaction, information relating to the commercial transaction is generated during sale of the merchandise, this generated information relating to the commercial transaction is provided to the information communication terminal and stored, information relating to the commercial transaction is acquired from the information communication terminal during handing over of the merchandise, the acquired information relating to the commercial transaction is authenticated using information relating to the stored commercial transaction, and information relating to the information processing apparatus for generating information relating to the trustworthiness of the user is provided to the authenticated information communication terminal.

In the second information processing apparatus and method, and third program of the present invention, information relating to the trustworthiness of the second user is stored, this stored information relating to the trustworthiness of the second user is provided to the information communication terminal, information relating to the trustworthiness of the first user from the information communication terminal and information relating to the commercial transaction is acquired, information relating to the trustworthiness of the first user and information relating to the trustworthiness of the second user is updated based on this acquired information relating to the commercial transaction, and this updated information relating to the trustworthiness of the first user is provided to the information communication terminal.

While it goes without saying that the information communication terminal, first information processing apparatus, and second information processing apparatus may be connected by wireless communication or by wired communication, it is also possible to have connection that is a combination of both wireless and wired communication, with wireless communication being carried out at a certain section, and wired communication being carried out at another section.

BRIEF DESCRIPTION OF DRAWINGS

FIG. 6 is a view showing an example of a specification for the non-contact IC card of FIG. 4.

FIG. 11A is a view showing an example of data held by the mobile telephone of FIG. 1.

FIG. 11B is a view showing an example of data held by the point-of-purchase server of FIG. 1.

FIG. 11C is a view showing an example of data held by the point-of-receipt server of FIG. 1.

FIG. 11D is a view showing an example of data held by the authentication server of FIG. 1.

FIG. 36 is a view showing another of a process flow relating to a sale of merchandise.

BEST MODE FOR CARRYING OUT THE INVENTION

Figure 1:
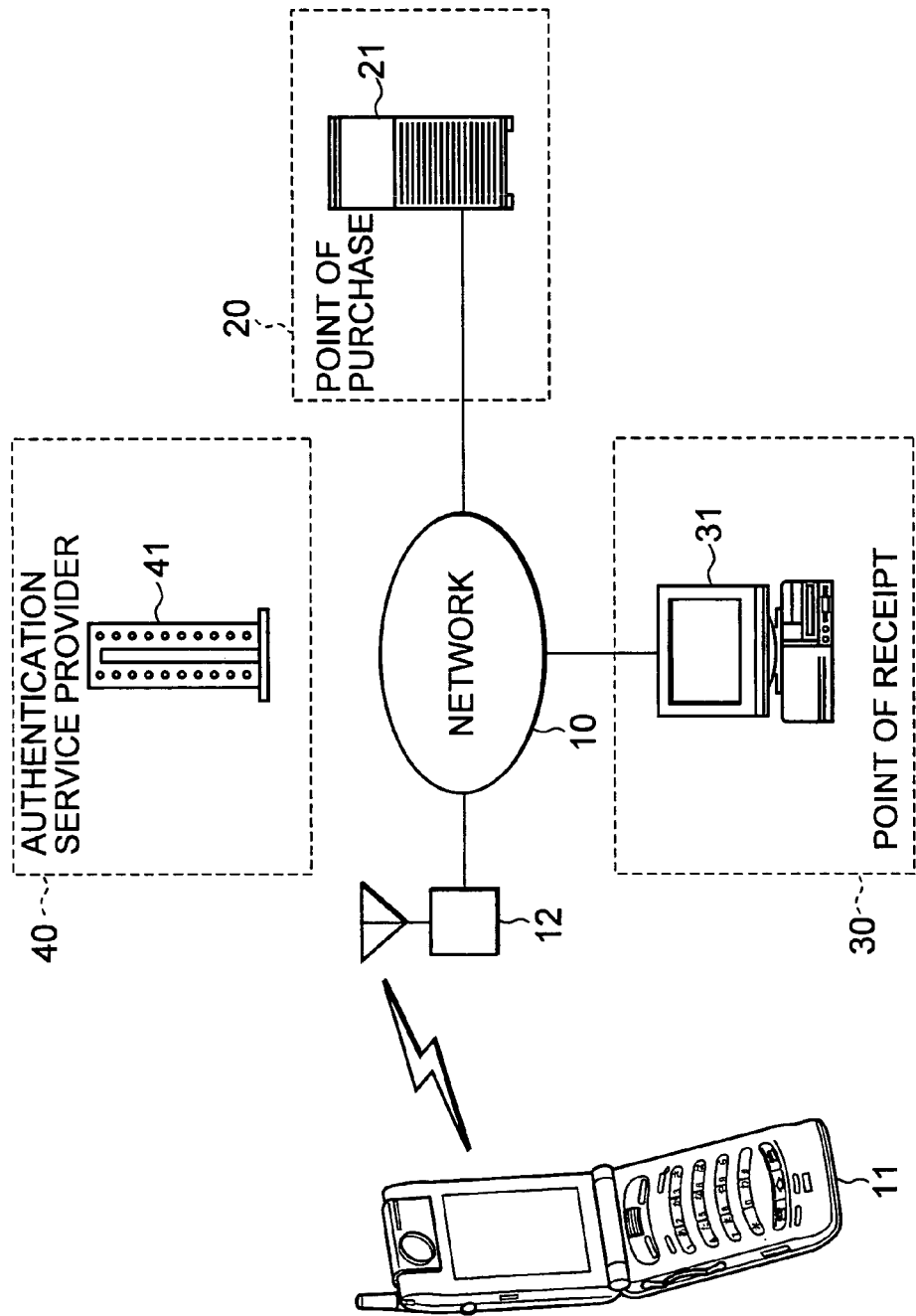
FIG. 1 is a view showing an example configuration for an electronic commercial transaction system to which the present invention is applied.

FIG. 1 is a view showing an example configuration for an electronic commercial transaction system to which the present invention is applied.

In FIG. 1, a mobile telephone 11 carries out wireless communication with and is connected to a nearest base station 12 so as to be connected to a network 10 to which the base station 12 is connected typified by, for example, the Internet, etc. Further, a point-of-purchase server 21 installed at a point-of-purchase 20 constituted by a store where a user of the mobile telephone 11 orders merchandise via the network 10, a point-of-receipt server 31 installed at a point of receipt 30 constituted by a store where the merchandise purchased by the user of the mobile telephone 11 is received, and an authentication server 41 providing basic services installed at an authentication service provider 40 for managing trustworthiness relating to commercial transactions between the user of the mobile telephone 11 and the store 20 using these basic services are connected to the network 10.

The mobile telephone 11 is operated by the user so as to carry out wireless communication with the nearest base station 12, access the point-of-purchase server 21 via the network 10, and carry out merchandise purchasing processing. The mobile telephone 11 is operated by the user so as to access the authentication server 41 of the authentication service provider 40, trustworthiness of the point-of-purchase 20 is acquired, and this is provided to the user to enable a determination to be made as to whether or not to purchase the merchandise (product).

The point-of-purchase server 21 the carries out sales processing for the merchandise requested by the mobile telephone 11, and charge processing is carried out with respect to the user of the mobile telephone 11. Purchase information for the requested merchandise is then provided to the point-of-receipt server 31 of the point of receipt 30 performing delivery of the merchandise.

The point-of-receipt server 31 compares information relating to the commercial transaction acquired from the point-of-purchase server 21 via the network 10 and information provided by the mobile telephone 11, and determines whether or not the user of the mobile telephone 11 is the legitimate purchaser of the merchandise.

The enterprise managing the point-of-purchase 20 and the enterprise managing the point of receipt 30 may be the same enterprise or may be enterprises working in cooperation, with merchandise sold at the point-of-purchase 20 being received at the point of receipt 30.

The user of the mobile telephone 11 purchasing the merchandise at the point-of-purchase 20 then visits the point of receipt 30 in order to receive the merchandise.

The authentication server 41 is installed at the authentication service provider 40 for providing the basic services and manages information for users of the mobile telephone 11 registered as users, for the point-of-purchase 20, and for the point of receipt 30.

Figure 2:
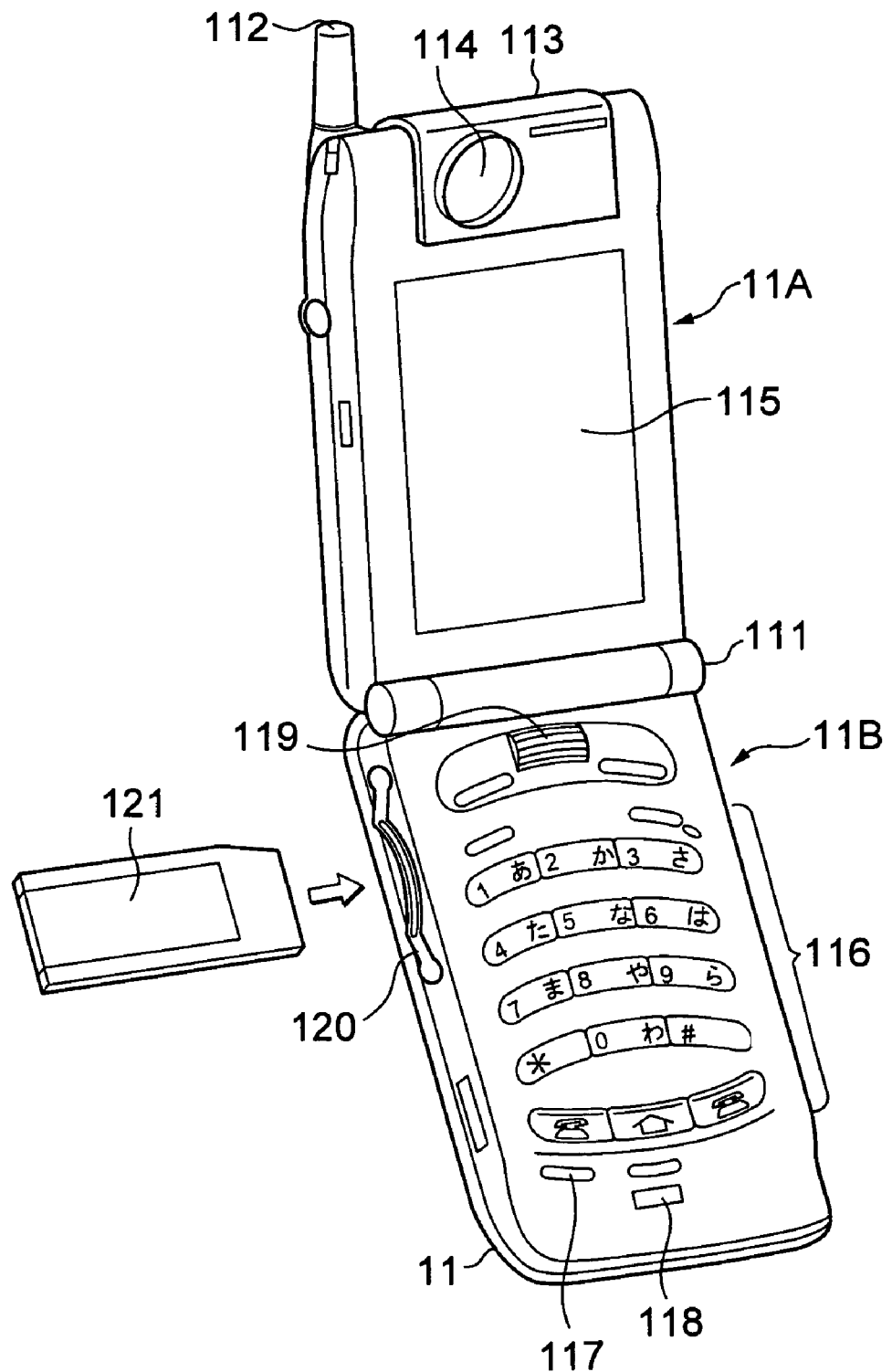
FIG. 2 is a view showing an example configuration for the external appearance of the mobile telephone of FIG. 1.

FIG. 2 is a view showing an example configuration for the external appearance of the mobile telephone 11 of FIG. 1.

As shown in FIG. 2, the mobile telephone 11 is constructed from a display unit 11A and main body 11B, capable of being folded up using a central hinge 111.

The display unit 11A has an antenna 112 for transmitting and receiving signals that is capable of being pulled out or stored provided at an upper part of a left end. The mobile telephone 11 transmits and receives electromagnetic waves to and from the base station 12 constituting a fixed wireless terminal via the antenna 112.

Further, the display unit 11A has a camera unit 113 capable of being freely rotated through an angle of substantially 180 degrees at the center of an upper end. The mobile telephone 11 can then take pictures of desired subjects using a camera 114 consisting of a CCD (Charge Coupled Device) or CMOS (Complementary Metal Oxide Semiconductor) etc. provided at the camera unit 113.

Figure 3:
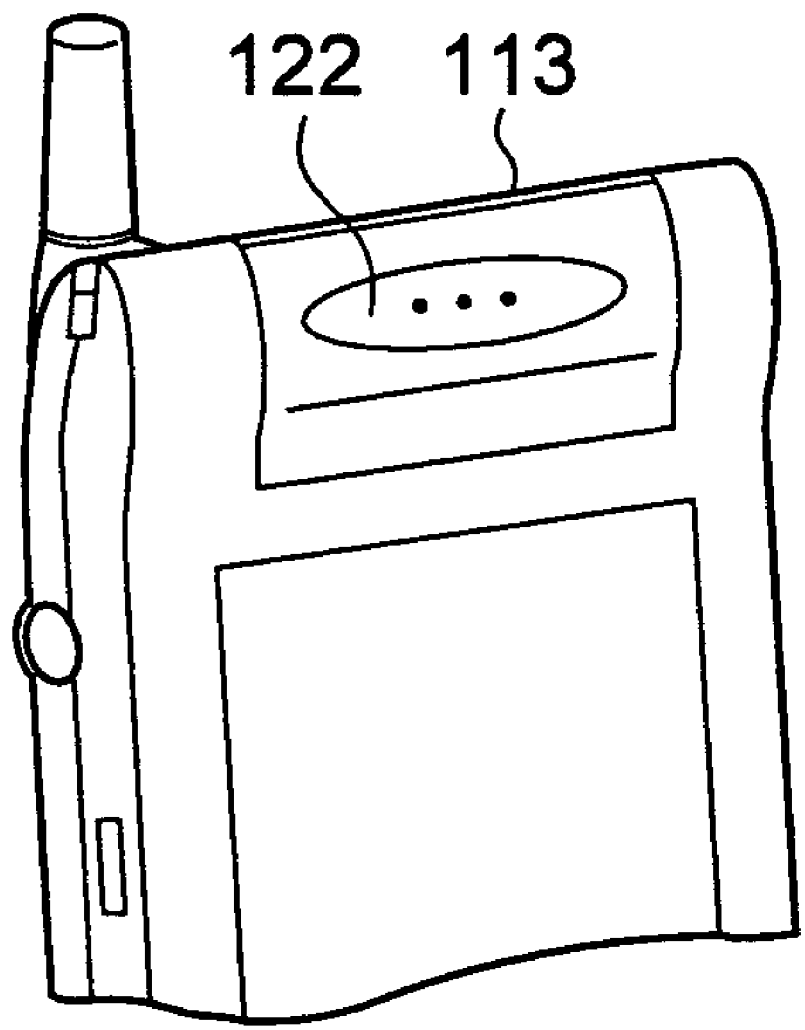
FIG. 3 is an enlarged view of part of that shown in FIG.

When the camera unit 113 is positioned by the user as a result of rotation through substantially 180 degrees, as shown in FIG. 3, the display unit 11A is such that a speaker 122 provided at substantially the center of the back of the camera unit 113 is positioned straight ahead. As a result, the mobile telephone 11 is switched over to a usual audio telephone call state.

Further, a liquid crystal display 115 is provided at the center of the display 11A. In addition to an electromagnetic wave receiving state, remaining battery, recipients names and telephone numbers registered as a telephone book, and call history etc., the liquid crystal display 115 displays the content of e-mails, simple homepages, and images taken using the camera 114 of the camera unit 113, etc.

On the other hand, operation keys 116 such as numeric keys 0 to 9, a call key, a redial key, a call complete key, a power key, a clear key and an e-mail key etc. are provided at the surface of the main body 11B. Each type of instruction corresponding to operation of the operation keys 116 is inputted at the mobile telephone 11.

Further, a memo button 117 and microphone 118 are provided below the operation keys 116 of the main body 11B. The mobile telephone 11 records speech of a person being called during a call when the memo button 117 is operated. The mobile telephone 11 picks-up speech of a user during a call using a microphone 118.

A freely rotatable jog dial 119 is provided above the operation keys 116 of the main body 11B so as to project slightly from the surface of the main body 11B. The mobile telephone 11 executes various operations such as scrolling through an address book or e-mails displayed at the liquid crystal display 115, a page rolling operation for a simple homepage, or an operation of transmitting an image according to rotation of the jog dial 119.

For example, at the main body 11B, a desired telephone number is selected from a plurality of telephone numbers in a telephone book list displayed at the liquid crystal display 115 in response to rotation of the jog dial 119 by the user, with a selected telephone number being finalized and call processing being carried out with respect to this telephone number when the jog dial 119 is pushed in a direction to within the body 11B.

A battery pack (not shown) is installed at the back side of the body 11B so that when a call end/power key is put on, electrical power is supplied to each circuit part from the battery pack so as to activate a state where operation is possible.

A memory stick slot 120 for installing a freely detachable memory stick (registered trademark) 121 is provided at an upper part of the left side of the main body 11B. When the memo button 117 is pressed down, the mobile telephone 11 records speech of the person being called in the installed memory stick 121. The mobile telephone 11 records e-mail, simple homepages and images taken using the camera 114 in the installed memory stick 131 according to user operations.

The memory stick 121 is a kind of flash memory card developed by the current applicant, Sony Corporation. This memory stick 121 is an item storing a type of EEPROM (Electrically Erasable and Programmable Read Only Memory) flash memory element constituted by non-volatile memory capable of being rewritten and erased electrically within a small, thin plastic case and is capable of reading and writing various types of data such as images, speech, and music etc. via ten pin terminals.

Because the mobile telephone 11 is configured so as to be capable of being installed with this kind of memory stick 121, it is possible to share data with other electronic equipment via the memory stick 121.

It is possible to extend the functions of the mobile telephone 11 still further by incorporating a module (chip) for extending prescribed functions into the memory stick 121 and installing this in the memory stick slot 120.

For example, as described in the following, by installing the memory stick 121 incorporating a non-contact IC (Integrated Circuit) card in the mobile telephone 11, it is possible to extend the functions so as to give the same electronic commercial transaction functions as for non-contact IC cards even when, for example, these modules are not built-into the mobile telephone 11.

Figure 4:
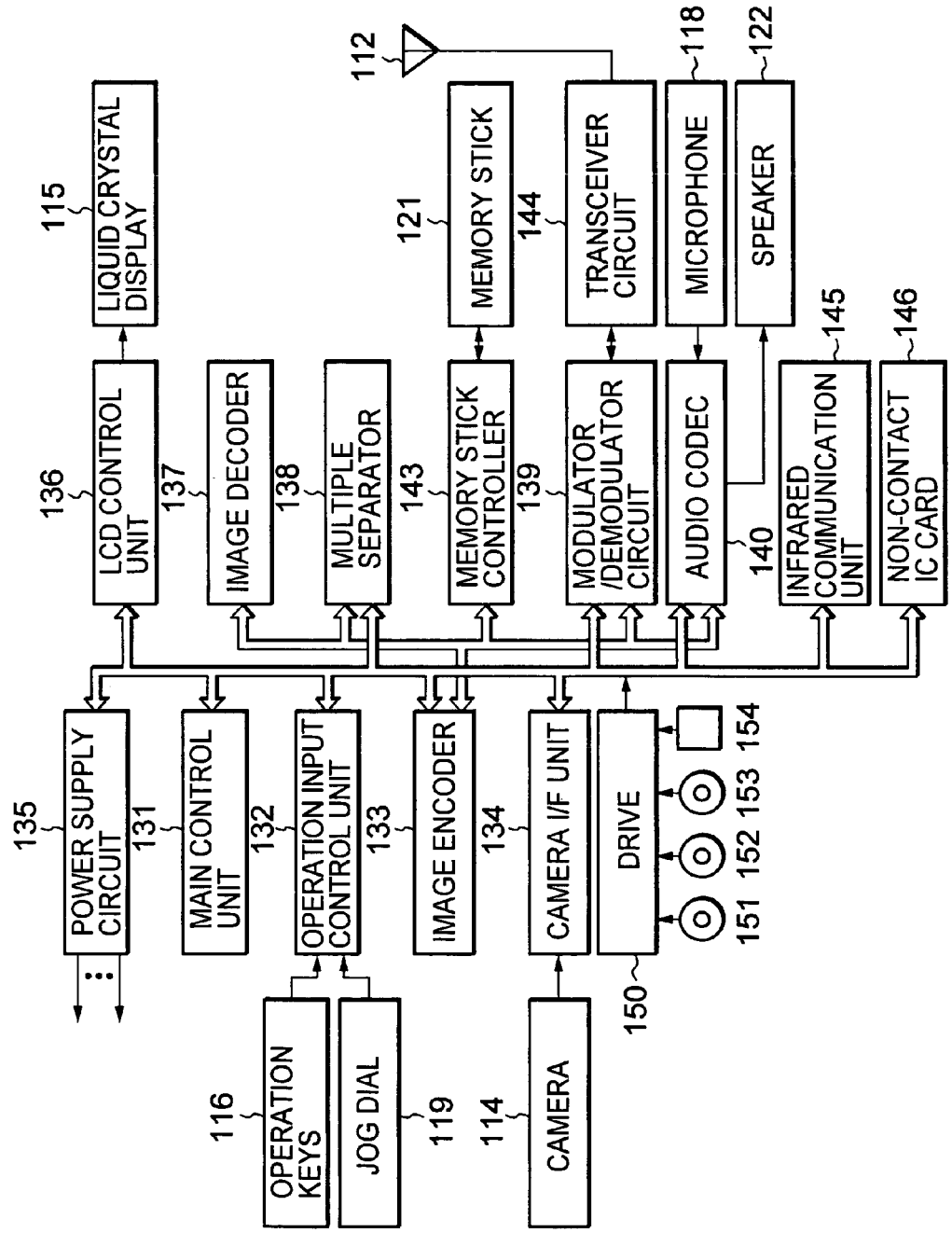
FIG. 4 is a block view showing an example configuration of the inside of a mobile telephone.

FIG. 4 shows an example configuration of the inside of the mobile telephone 11.

A power supply circuit 135, operation input control unit 132, image encoder 133, camera interface (I/F) unit 134, LCD control unit 136, multiple separator 138, modulator/demodulator circuit 139, audio codec 140, infrared communication unit 145 and non-contact IC card 146 (in this example, a dedicated non-contact IC card (Felica chip (registered trademark)) is provided but it is also possible to provide non-contact IC card functions in the memory stick 121) are connected to a main control unit 131 for providing overall control of each part of the display unit 11A and body 11B via a main bus 141, and the image encoder 133, image decoder 137, multiple separator 138, a memory stick controller 143, the modulator/demodulator circuit 139, and the audio codec 140 are connected via a synchronous bus 142.

When the call end/power key is put on by a user operation, the power supply circuit 135 activates each part of the mobile telephone 11 to a state where operation is possible as a result of electrical power being supplied from the battery pack to each of the parts.

The main control unit 131 constituted by a CPU (Central Processing Unit), ROM (Read Only Memory) and RAM (Random Access Memory) etc. converts an audio signal collected by the microphone 118 into a digital audio signal using the audio codec 140 at the time of audio call mode. The digital audio data is subjected to spectrum diffusion processing by the modulator/demodulator circuit 139, subjected to digital/analog conversion processing and frequency conversion processing by a transceiver circuit 144, and is transmitted via the antenna 112.

Further, at the time of audio call mode, a receive signal received by the antenna 112 is amplified, subjected to frequency conversion processing and analog/digital conversion processing, subjected to inverse spectrum diffusion processing by the modulator/demodulator circuit 139, and converted to an analog audio signal by the audio codec 140. Audio corresponding to an analog audio signal is then outputted from the speaker 122.

Further, at the time of the data communication mode, in the case of transmission of e-mail, text data inputted by operation of the operation keys 116 and the jog dial 119 is provided to the main control unit 131 via the operation input control unit 132.

The main control unit 131 then ensures that the text data is subjected to spectrum diffusion processing by the modulator/demodulator circuit 139, subjected to digital/analog conversion processing and frequency conversion processing by a transceiver circuit 144, and is then transmitted via the antenna 112 to the base station 12.

With regards to this, when e-mail is received at the time of data communication mode, the received signal received from the base station 12 via the antenna 112 is subjected to inverse spectrum diffusion processing by the modulator/demodulator circuit 139, and after the original text data has been restored, this is displayed as an e-mail at the liquid crystal display 115 via an LCD (Liquid Crystal Display) control unit 136.

An e-mail received in response to a user operation can also be recorded in the memory stick 121 via the memory stick controller 143.

When image data is transmitted in data communication mode, image data taken using the camera 114 is provided to the image encoder 133 via the camera interface unit 134.

In the case of the transmission of image data during the data communication mode, image data taken by the camera 114 can be directly displayed at the liquid crystal display 115 via the camera interface unit 134 and the LCD control unit 136.

The image encoder 133 converts image data provided by the camera 114 into encoded image data using compression encoding employing prescribed encoding methods such as MPEG (Moving Picture Experts Group) 2 or MPEG 4, etc. and sends this to the multiple separator 138.

At the same time as this, audio collected by the microphone 118 during photographing by the camera 114 is sent to the multiple separator 138 as digital audio data via the audio codec 140.

The multiple separator 138 then multiplexes encoded image data provided by the image encoder 133 and audio data provided by the audio codec 140 using a prescribed method. The multiplexed data obtained as a result is subjected to spectrum diffusion processing by the modulator/demodulator circuit 139, subjected to digital/analog conversion processing and frequency conversion processing by a transceiver circuit 144, and is transmitted via the antenna 112.

With regards to this, at the time of data communication mode, when, for example, data for a moving image file linked to at a simple homepage etc. is received, a signal received from a base station via the antenna 112 is subjected to inverse spectrum diffusion processing by the modulator/demodulator circuit 139 and multiplexed data obtained as a result is sent to the multiple separator 138.

The multiple separator 138 separates the multiplexed data into encoded image data and audio data and provides the encoded image data to an image decoder 137 and provides audio data to the audio codec 140 via the synchronous bus 142.

The image decoder 137 generates playback moving image data by decoding the encoded image data using a decoding method corresponding to a prescribed encoding method such as MPEG 2 or MPEG 4 and provides this to the liquid crystal display 115 via the LCD control unit 136. As a result, for example, images for moving image data contained in moving image files linked to at a simple homepage are displayed.

At the same time as this, after converting the audio signal to an analog audio signal, the audio codec 140 supplies this audio signal to the speaker 122. In this way, the mobile telephone 11, for example, plays back audio corresponding to audio data contained in the moving image file linked to at the simple homepage.

In this case also, as in the case of e-mail, it is possible to record data linked to at the received simple homepage etc. in the memory stick 121 via the memory stick controller 143 using user operations.

The non-contact IC card 146 may then be brought close to another information processing apparatus having an IC card reader/writer so that when electromagnetic waves radiated from the IC card reader/writer are received, various information is provided to the IC card reader/writer in response to this.

A drive 150 installed as necessary reads a program stored in a recording medium such as a magnetic disc 151 such as a floppy disc or hard disc etc., an optical disc 152 such as a CD-ROM (Compact Disk Read Only Memory) or a DVD (Digital Versatile Disc) etc., a magneto-optical disc 153 such as an MD (Mini Disk) (trademark) etc., or a semiconductor memory 154 and provides this program to RAM etc. of the main control unit 131 via the main bus 141.

Figure 5:
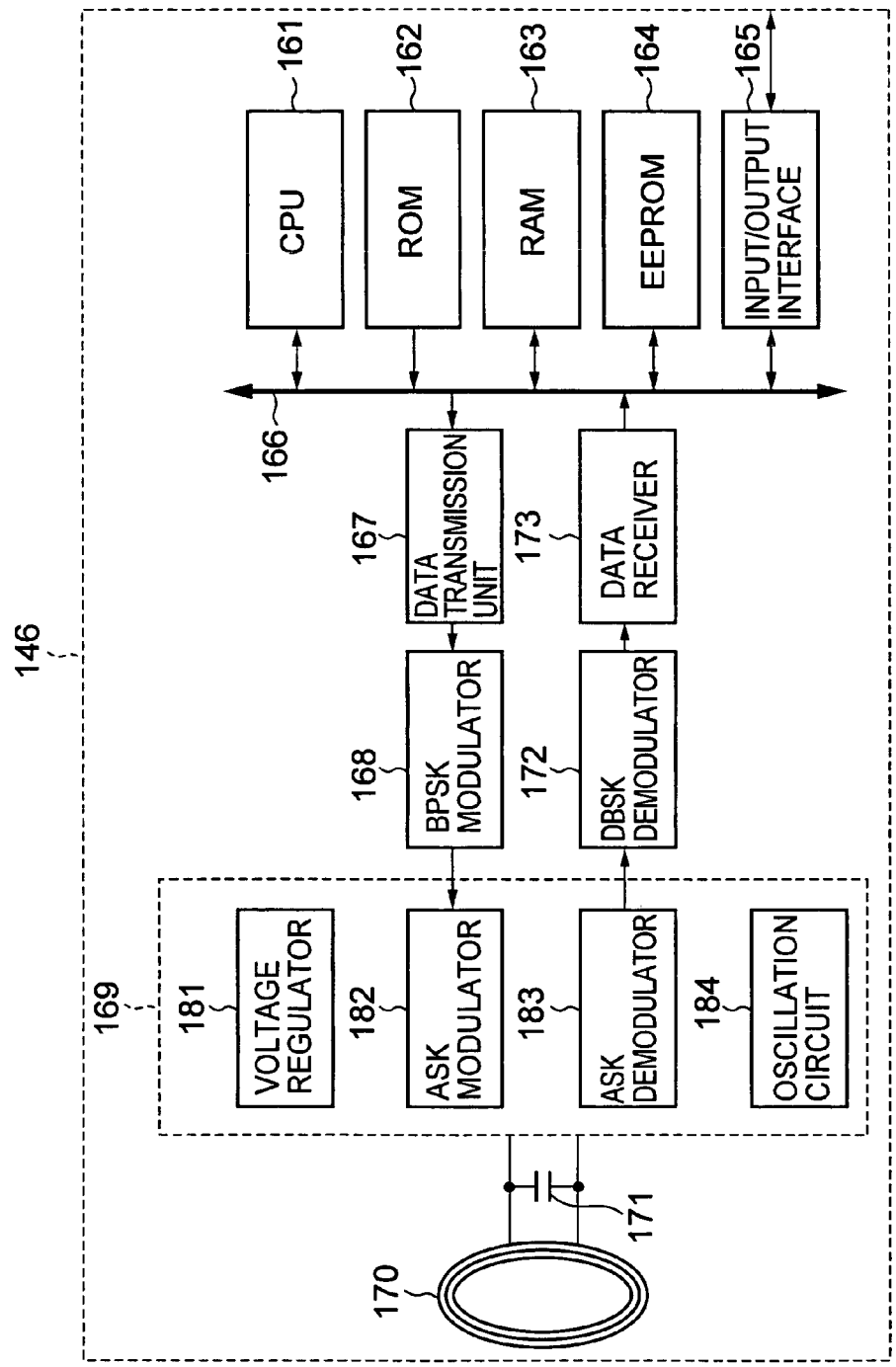
FIG. 5 is a block view showing a detailed example of a configuration for a non-contact IC card of FIG. 4.

FIG. 5 is a block view showing a detailed example of a configuration for the non-contact IC card 146.

The non-contact IC card 146 is comprised of, for example, an antenna (loop antenna) 170 and capacitor 171 shown in the drawing, and an IC storing other aspects of the configuration on one chip. The non-contact IC card 146 then communicates various types of data with an IC card reader/writer provided at another information processing apparatus in a half-duplex manner by utilizing electromagnetic induction, and does not by any means have to be card-shaped. Further, "IC card" is a name given for convenience of description, and is intended to mean functions described above or described in the following. Further, for example, a Felica chip (registered trademark) may also be given as a device providing substantially the same functions as the non-contact IC card 146.

A CPU 161 expands a control program stored in ROM 162 into RAM 163, and controls all of the operations of the non-contact IC card 146. For example, when electromagnetic waves radiated from the IC card reader/writer provided at another information processing apparatus are received by an antenna 170, the CPU 161 notifies the IC card reader/writer of a card identification number set at the non-contact IC card 146 in response to this, and processing relating to receiving merchandise is carried out.

An LC circuit configured from the antenna 170 and capacitor 171 resonates with electromagnetic waves of a prescribed frequency radiated from an IC card reader/writer provided at another information processing apparatus located in the vicinity. At an ASK (Amplitude Shift Keying) demodulator 183, an interface 169 demodulates a (ASK modulated wave) modulated wave received via the antenna 170 using envelope demodulation, and data for after demodulation is outputted to a BPSK (Binary Phase Shift Keying) demodulator 172.

At the interface 169, an alternating magnetic field excited at the antenna 170 is rectified by the ASK demodulator 183, and this is stabilized at a voltage regulator 181 and supplied to each part as a direct current power source. The electric power of electromagnetic waves radiated from the IC card reader/writer is regulated to as to generate an electric field covering the required electric power at the non-contact IC card as described in the following.

Further, an oscillation circuit 184 of the interface 169 has a PLL (Phase Locked Loop) circuit built-in so as to generate a clock signal that is the same as the received clock frequency.

In the case of the interface 169 sending, for example, balance information etc. to an IC card reader/writer provided on another information processing apparatus, for example, a prescribed switching element (not shown) is made to go on and off in a manner corresponding to data provided by a BPSK modulator 168, so as to cause the load of the antenna 170 to fluctuate by connecting a prescribed load in parallel with the antenna 170 only when the switching element is on.

An ASK modulator 182 AKS-modulates a modulated wave from the IC card reader/writer received at the antenna 170 by causing the load of the antenna 170 to fluctuate. This modulated component is then sent to the IC card reader/writer via the antenna 170 (the terminal voltage of the antenna of the IC card reader/writer is made to change) (load-switching method).

When data demodulated by the ASK demodulator 183 is BPSK-modulated, this data is demodulated by the BPSK demodulator 172 (decoding of Manchester code) based on a clock signal provided by a PLL circuit (not shown) and demodulated data is outputted to a data receiver 173. The data receiver 173 appropriately outputs the provided data to the CPU 161. The CPU 161 stores this data in the RAM 163 or in an EEPROM 164.

Data stored in the EEPROM 164 is read-out by the CPU 161, and supplied to a data transmission unit 167. The BPSK modulator 168 performs BPSK modulation (encoding to Manchester code) on data supplied by the data transmission unit 167 and outputs this to the ASK modulator 182.

An input/output interface 165 carries out interface processing with the main control unit 131.

Electronic money information is stored in the EEPROM 164. The user is then able to settle fees for purchased products and services etc. by utilizing this electronic money. The settlement history is also stored in an EEPROM 164.

FIG. 6 is a view showing an example of a specification for the non-contact IC card 146.

As described above, communication between the IC card reader/writer and the non-contact IC card 146 is carried out by half-duplex, and this communication speed is taken to be, for example, 211.875 kbps.

Further, as shown in FIG. 6, the center frequency of the frequency band used in electric power transmission to the non-contact IC card 146 from the IC card reader/writer, and data transmission, and data transmission to the IC card reader/writer from the non-contact IC card 146 is taken to be, for example, 13.56 MHz.

Output of electromagnetic waves outputted from the IC card reader/writer in order to transmit electric power is, for example, 350 mW, and the communication distance is, for example, approximately 10 cm, although this depends on aspects of the communication environment such as antenna characteristics etc.

As described above, data transfer from the IC card reader/writer to the non-contact IC card 146 is carried out by performing ASK modulation on data encoded using Manchester code, and this modulation (maximum amplitude of data signal/maximum amplitude of carrier wave) is taken to be, for example, approximately 0.1. Further, as described above, data transfer from the non-contact IC card 146 to the IC card reader/writer is carried out by converting data outputted using a load switching method to a transmission signal (causing the load of the antenna 170 to fluctuate by putting a switching element on and off in according to output data).

In the above, the non-contact IC card 146 is built-into the mobile telephone 1 but may also, for example, be installed into the mobile telephone 11 incorporated into the memory stick 121 so as to be controlled by the memory stick controller 143.

Figure 7:
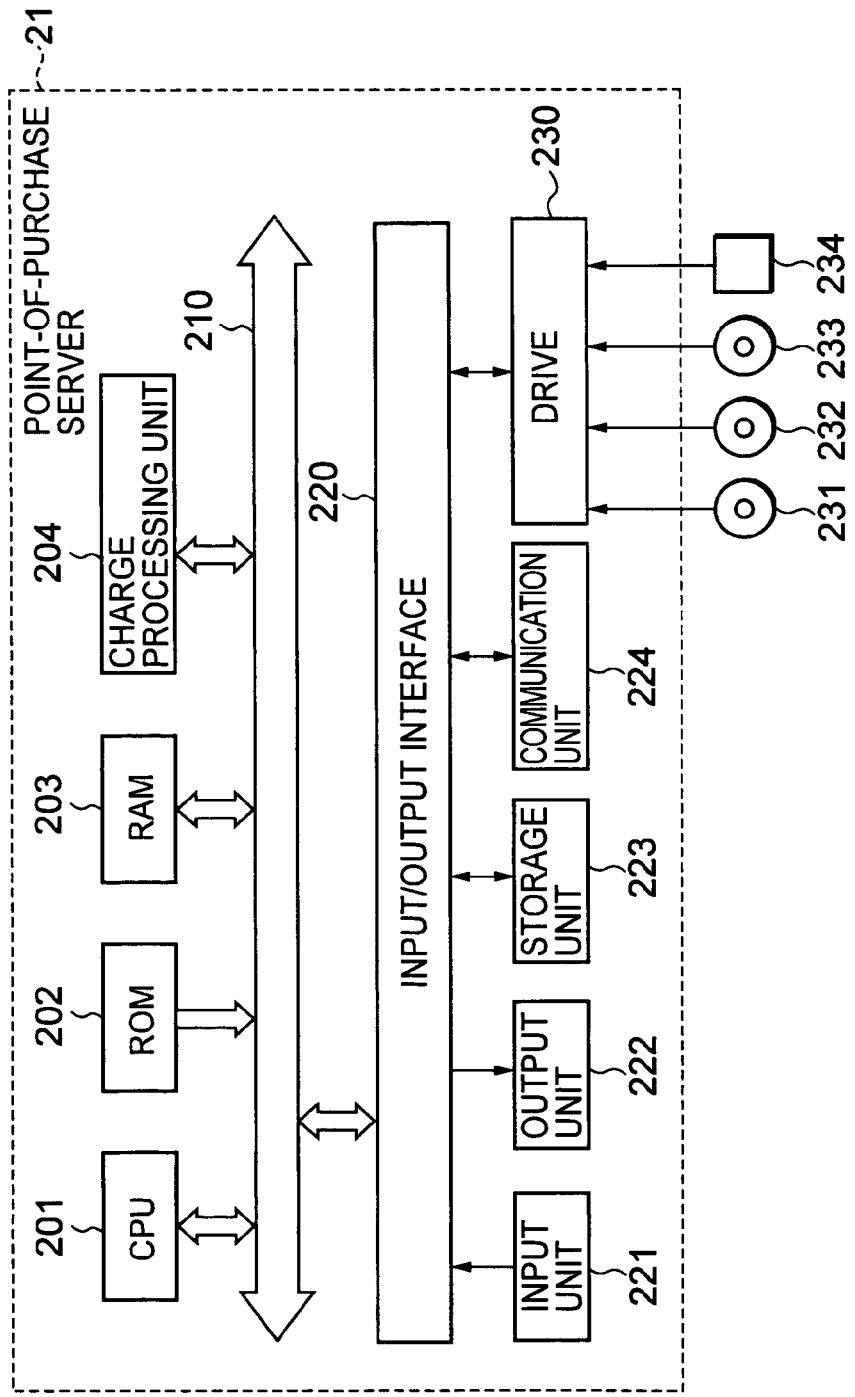
FIG. 7 is a block view showing an example configuration of the inside of the point-of-purchase server of FIG. 1.

FIG. 7 is a block view showing an example configuration of the inside of the point-of-purchase server 21 of FIG. 1.

In FIG. 7, a CPU 201 executes various processes such as the execution of charge processing at a charge processing unit 204 in accordance with a program stored in a ROM 202 and a program loaded into RAM 203 from a storage unit 223. Data etc. required for the CPU 201 to execute various processes is also appropriately stored in RAM 203.

The CPU 201, ROM 202, RAM 203 and charge processing unit 204 are connected together via a bus 210. An input/output interface 220 is also connected to this bus 210.

An input unit 221 comprised of a keyboard and mouse, etc., an output unit 222 comprised of a display consisting of a CRT (Cathode Ray Tube) and LCD (Liquid Crystal Display) etc. and speaker etc., a storage unit 223 comprised of a hard disc etc., and a communication unit 224 comprised of a modem and terminal adapter etc. are connected to the input/output interface 220.

As described in the following, purchase information constituted by information relating to commercial transactions and key information required to update information is stored in the storage unit 223.

Figure 10:
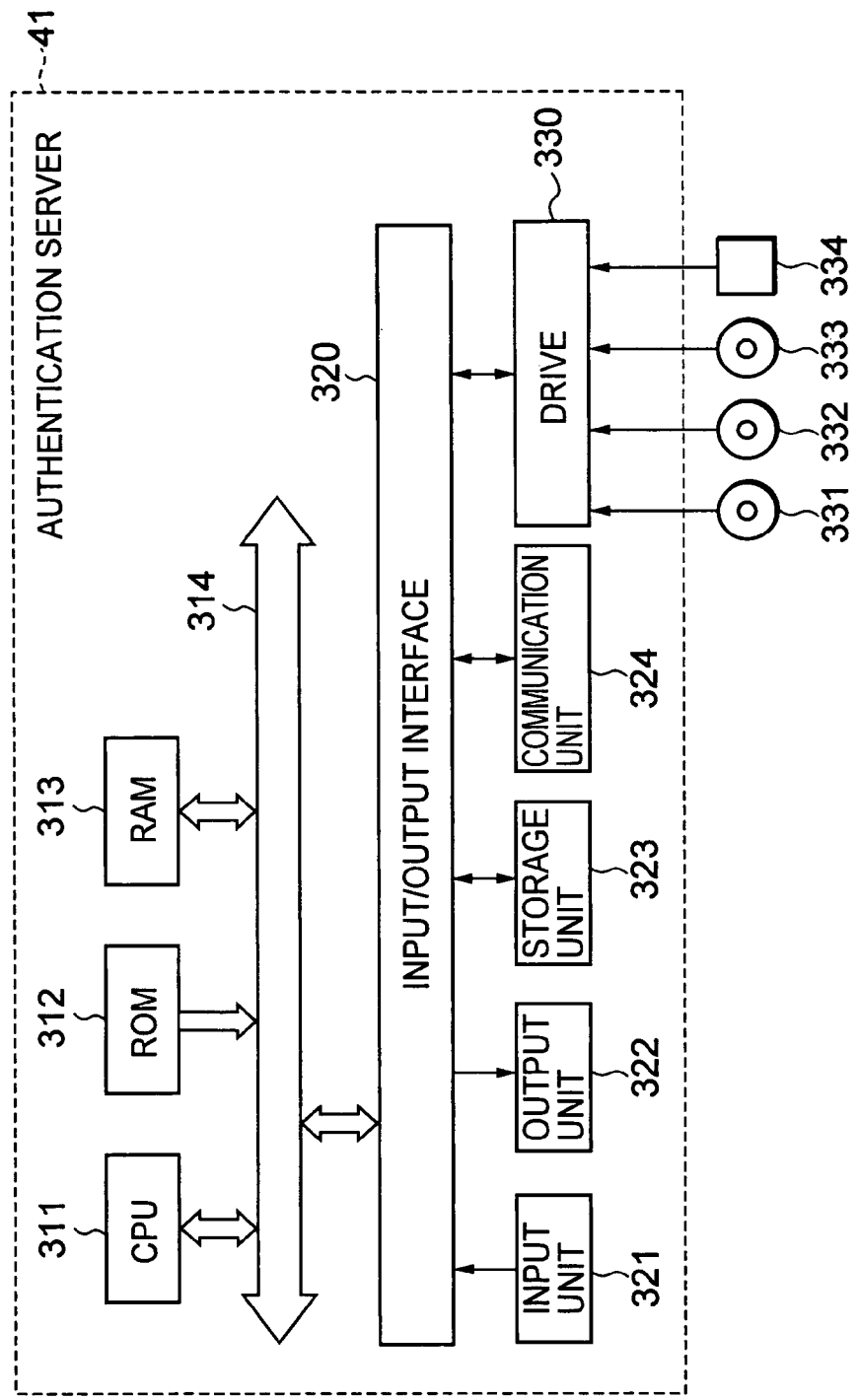
FIG. 10 is a block view showing an example configuration of the inside of the authentication server of FIG. 1.

The communication unit 224 carries out communication processing via the network 10 shown in FIG. 10. Further, the communication unit 224 distributes purchase information and key information etc. stored in the storage unit 223 via the Internet constituting the network 10 using, for example, a TCP/IP (Transmission Control Protocol/Internet Protocol) protocol.

A drive 230 is connected to the input/output interface 220 as necessary, and a magnetic disc 231, optical disc 232, magneto-optical disc 233, or semiconductor memory 234 etc. are installed as appropriate. Computer programs read from these media are then installed in the storage unit 223 as necessary.

Figure 8:
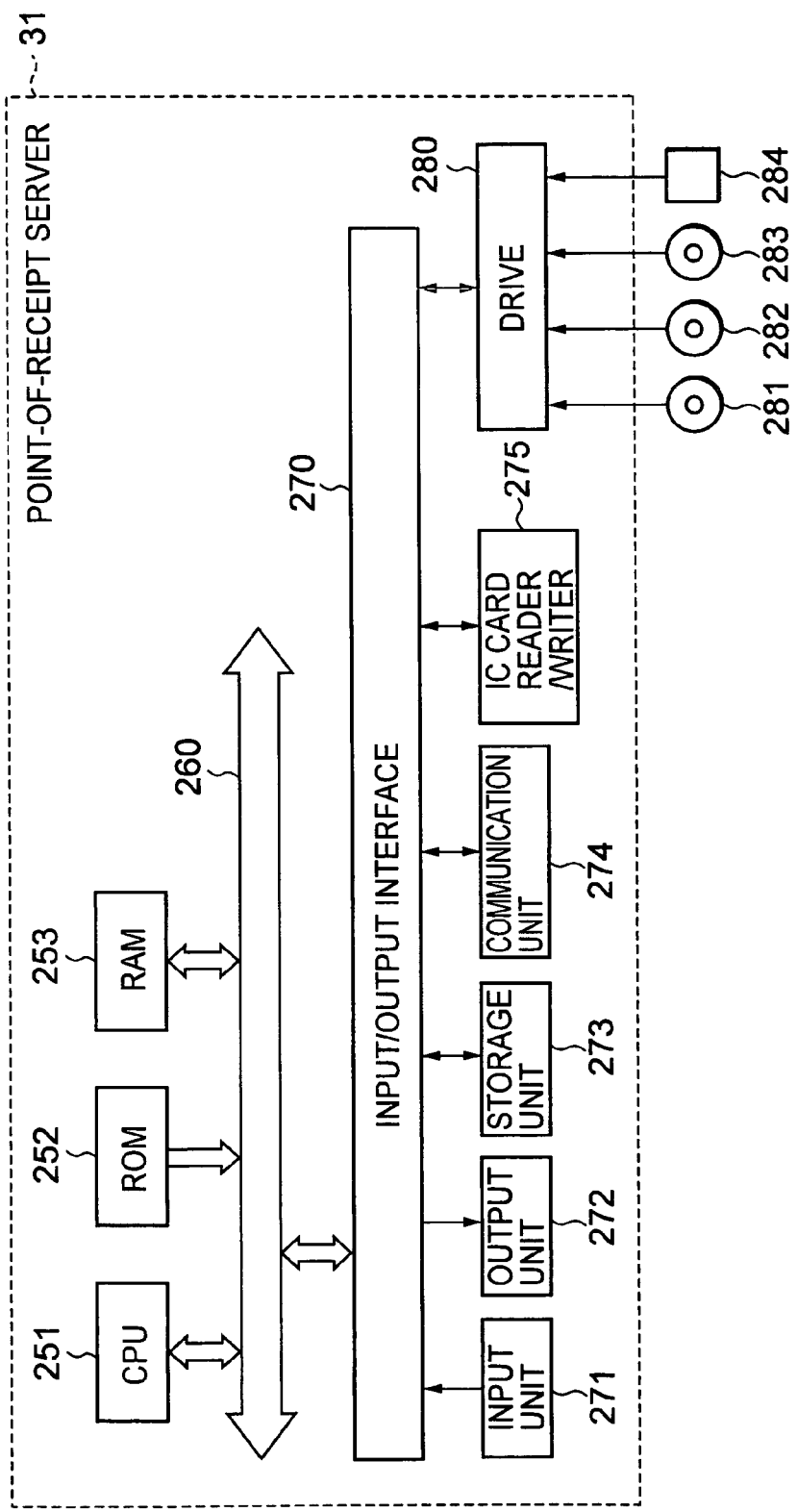
FIG. 8 is a block view showing an example configuration of the inside of the point-of-receipt server of FIG. 1.

FIG. 8 is a block view showing an example configuration of the inside of the point-of-receipt server 31 of FIG. 1.

The CPU 251 executes various processing in accordance with programs stored in the ROM 252 or the storage unit 273. Programs and data executed by the CPU 251 are appropriately stored in the RAM 253. The CPU 251, ROM 252, and RAM 253 are connected together via a bus 260.

An input/output interface 270 is connected at the bus 260, and an input unit 271 comprised of a keyboard and mouse etc., an output unit 272 comprised of a display consisting of a CRT or LCD etc. and a speaker etc., a storage unit 273 comprised of a hard disc etc., a communication unit 274 comprised of a modem or terminal adapter etc., and an IC card reader/writer 275 for carrying out wireless communication with a non-contact IC card in the vicinity are connected to the input/output interface 270.

A drive 280 is connected to the input/output interface 270 as necessary, and a magnetic disc 281, optical disc 282, magneto-optical disc 283, or semiconductor memory 284 etc. are installed as appropriate. Computer programs read from these media are then installed in the storage unit 273 as necessary.

Figure 9:
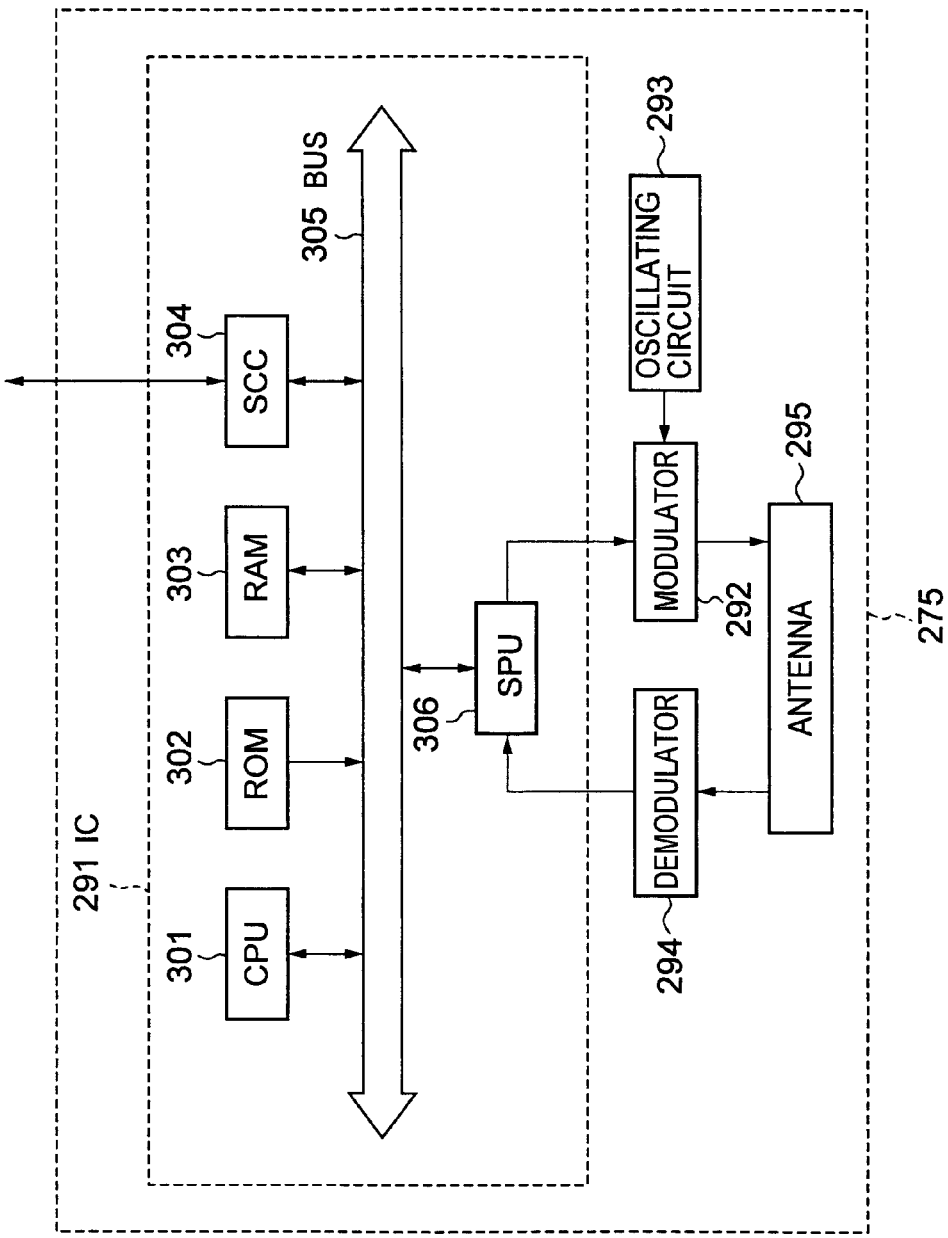
FIG. 9 is a block view showing a detailed example of a configuration for the IC card reader/writer of FIG. 8.

FIG. 9 is a block view showing a detailed example of a configuration for the IC card reader/writer 275 of FIG. 8.

IC 291 is comprised of a CPU 301, ROM 302, RAM 303, SCC (Serial Communication Controller) 304, SPU (Signal Processing Unit) 306, and bus 305 mutually connecting the CPU 301 through to the SPU 306 together.

The CPU 301 opens a control program stored in the ROM 302 up into the RAM 303, so as to execute various processing based on, for example, response data transmitted from the non-contact IC card 146 and control signals provided from the CPU 251 of FIG. 8. For example, the CPU 301 generates a command transmitted to the non-contact IC card 146 so that this is outputted to the SPU 306 via the bus 305, or so that authentication processing etc. is carried out for data sent from the non-contact IC card 146.

The SCC 304 supplies data supplied from the CPU 1251 of FIG. 8 to the CPU 301 via the bus 305, and outputs data supplied by the CPU 301 via the bus 305 to the CPU 251.

When response data from the non-contact IC card 146 is supplied from the demodulation unit 294, the SPU 306 subjects this data to, for example, BPSK demodulation (decoding of Manchester code) etc., and provides the acquired data to the CPU 301. Further, when a command sent to the non-contact IC card 146 is provided via the bus 305, the SPU 306 subjects this command to BPSK modulation (encoding to Manchester code), and the acquired data is outputted to the modulator 292.

The modulator 292 ASK modulates a carrier wave of a prescribed frequency (for example, 13.56 MHz) supplied by an oscillating circuit (OSC) 293 based on data supplied by the SPU 306, and outputs the generated modulated wave from an antenna 295 as electromagnetic radiation. On the other hand, the demodulator 294 demodulates a modulated wave (ASK modulated wave) acquired via the antenna 295 and outputs the demodulated data to the SPU 296.

The antenna 295 radiates prescribed electromagnetic radiation, and detects whether or not the non-contact IC card 146 is nearby based on changes in load with respect to this. Then, for example, when the non-contact IC card 146 is in the vicinity, the antenna 295 transmits and receives various data to and from the non-contact IC card 146.

FIG. 10 is a block view showing an example configuration of the inside of the authentication server 41 of FIG. 1.

In FIG. 10, the CPU 311 executes various processing in accordance with programs stored in the ROM 312 and programs loaded into the RAM 313 from the storage unit 323. Data etc. required for the CPU 311 to execute various processes is also appropriately stored in RAM 313.

The CPU 311, ROM 312, and RAM 313 are connected together via a bus 314. An input/output interface 320 is also connected to this bus 314.

An input unit 321 comprised of a keyboard and mouse etc., a display comprised of a CRT or LCD etc., an output unit 322 comprised of a speaker etc., a storage unit 323 comprised of a hard disc etc., and a communication unit 324 comprised of a modem or terminal adapter etc. are connected to the input/output interface 320.

A drive 330 is connected to the input/output interface 320 as necessary, and a magnetic disc 331, optical disc 332, magneto-optical disc 333, or semiconductor memory 334 etc. are installed as appropriate. Computer programs read from these media are then installed in the storage unit 323 as necessary.

Next, a description is given with reference to FIG. 11A to FIG. 11D of data held in the mobile telephone 11, point-of-purchase server 21, point-of-receipt server 31, and authentication server 41 respectively in a state before the user of the mobile telephone 11 of FIG. 1 purchases merchandise.

The mobile telephone 11 shown in FIG. 11A holds information for a card identification number 351 and user trustworthiness 352 in the built-in non-contact IC card 146.

The card identification number 351 is a number assigned in advance to the non-contact IC card 146 and is a number for identifying the non-contact IC card 146. This card identification number 351 is provided by the authentication service provider 40 when the user of the mobile telephone 11 is registered as a purchaser of merchandise with this service. During this time, the card identification number 351 may be provided via the network 10 by the authentication server 41 or may be provided by the authentication service provider 40 using a separate method.

The user trustworthiness 352 is information relating to trustworthiness of the user of the mobile telephone 11 with regards to electronic commercial transactions using this service and is referenced by the point-of-purchase 20 constituting the target of the commercial transaction. As described in the following, the user trustworthiness 352 is decided by the authentication server 41 based on past experience of the user of the mobile telephone 11.

The point-of-purchase server 21 shown in FIG. 11B stores purchasing information 353 constituting information relating to electronic purchases employing this service and a purchasing information rewriting key 361 constituting key information necessary in the making, editing and deleting of this purchasing information 353 in the storage unit 223.

As described in the following, the purchasing information 353 is information relating to purchasing of merchandise by the user of the mobile telephone 11 etc., with the point-of-receipt server 31 carrying out authentication processing of the user of the mobile telephone 11 based on this information.

Further, as described in the following, the purchasing information 353 is supplied to the IC card 146 of the mobile telephone 11 and the point-of-receipt server 31 etc. Therefore, in order to prevent illegal duplication and falsification, it is not possible to make, edit or delete the purchasing information 353 without using the purchasing information rewriting key 361.

The purchasing information rewriting key 361 is key information for making, editing and deleting etc. the purchasing information 353. The purchasing information rewriting key 361 is a kind of one-time password and is supplied to the mobile telephone 11 etc. while the point-of-purchase server 21 and the point of receipt server 31 generating the purchasing information rewriting key 361 update the purchasing information 353. When the purchasing information 353 is updated using the purchasing information rewriting key 361 provided, the mobile telephone 11 deletes the purchasing information rewriting key 361 used. The point-of-purchase server 21 and the point of receipt server 31 generating the purchasing information rewriting key 361 can supply purchasing information rewriting keys 361 to the mobile telephone 11 any number of times.

The point-of-receipt server 31 shown in FIG. 11C stores the purchasing information rewriting key 361 described above and a temporary commercial transaction information rewriting key 362 constituting key information required in making, editing and deleting of temporary commercial transaction information described in the following in the storage unit 273.

The temporary commercial transaction information rewriting keys 362 are distributed in advance by the authentication service provider 40 and is key information for making, editing and deleting etc. temporary commercial transaction information described in the following. Therefore, in order to prevent illegal duplication and falsification, it is not possible to make, edit or delete the temporary commercial transaction information without using the temporary commercial transaction information rewriting key 362.

The temporary commercial transaction information rewriting key 362 is key information for making, editing and deleting etc. temporary commercial transaction information. The temporary commercial transaction information rewriting key 362 is a kind of one-time password and is supplied to the mobile telephone 11 etc. while the point-of-receipt server 31 authentication server 41 generating the temporary commercial transaction information rewriting key 362 update the temporary commercial transaction information. When the temporary commercial transaction information is updated using the temporary commercial transaction information rewriting key 362 provided, the mobile telephone 11 deletes the temporary commercial transaction information rewriting key 362 used. The point of receipt server 31 and the authentication server 41 generating the temporary commercial transaction information rewriting key 362 can supply temporary commercial transaction information rewriting keys 362 to the mobile telephone 11 any number of times.

The authentication server 41 shown in FIG. 11D stores the temporary commercial transaction information rewriting key 362, a user trustworthiness rewriting key 363 constituting key information required to update the user trustworthiness described above, and store trustworthiness 354 constituting information relating to the trustworthiness of the store 20 is stored in the storage unit 323.

The user trustworthiness rewriting key 363 is key information for updating the user trustworthiness 352 stored in the non-contact IC card 146 of the mobile telephone 11. Therefore, in order to prevent illegal duplication and falsification, it is not possible to make, edit or delete the user trustworthiness 352 without using the user trustworthiness rewriting key 363.

The user trustworthiness rewriting key 363 is key information for making, editing and deleting etc. user trustworthiness. The user trustworthiness rewriting key 363 is a kind of one-time password, and is supplied to the mobile telephone 11 etc. while the authentication server 41 generating the user trustworthiness rewriting key 363 is instructing updating of the user reliability. When user trustworthiness is updated using the user trustworthiness rewriting key 363 provided, the mobile telephone 11 deletes the user trustworthiness rewriting key 363 used. The authentication server 41 generating the user trustworthiness rewriting key 363 can supply the user trustworthiness rewriting key 363 to the mobile telephone 11 etc. any number of times.

The store trustworthiness 354 is information relating to trustworthiness of a store 20 with regards to electronic commercial transactions using this service and is referenced by the user of the mobile telephone 11 constituting the target of the commercial transaction. This store trustworthiness 354 is decided by the authentication server 41 based on past experience of the store 20.

Figure 12:
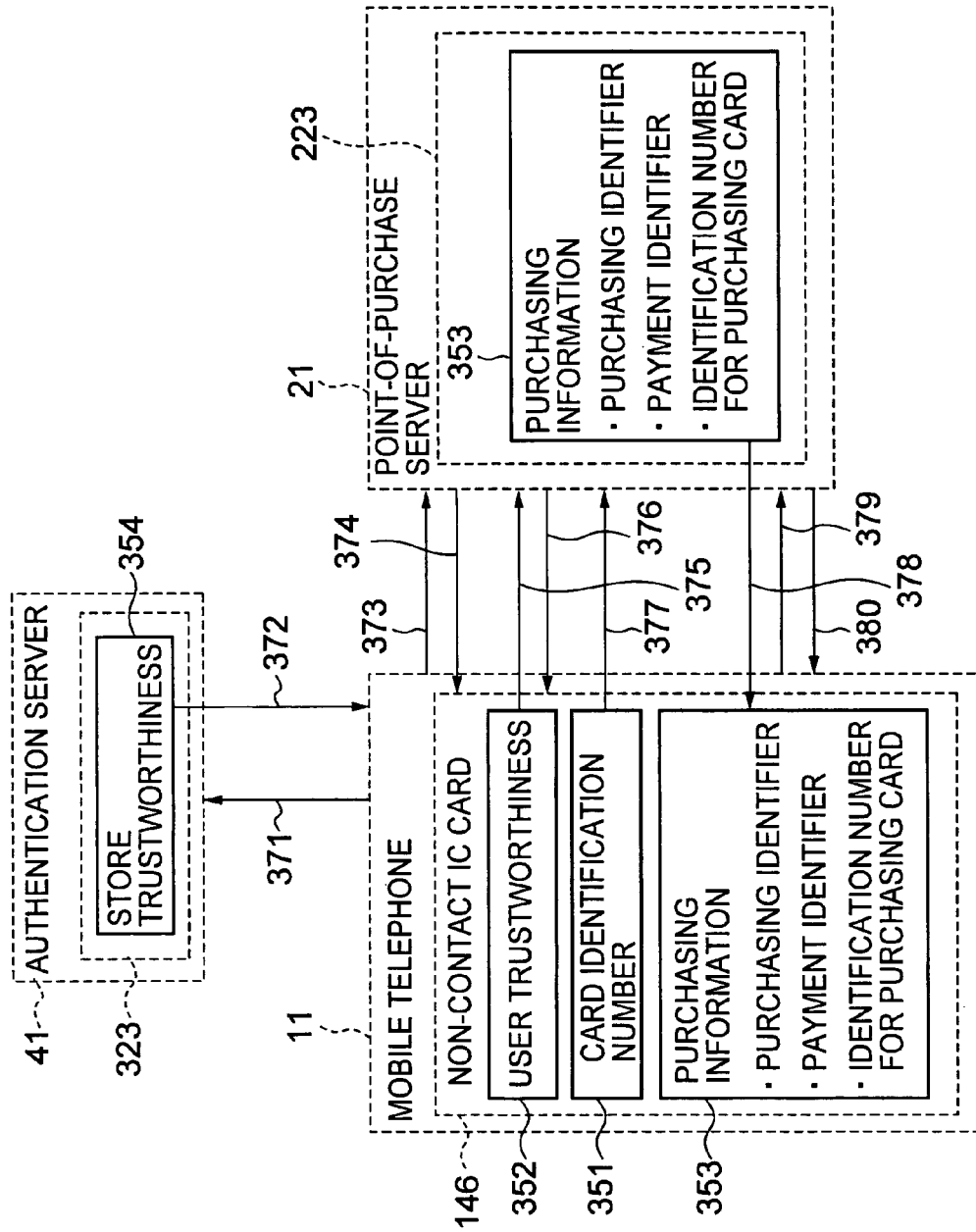
FIG. 12 is a view showing an example of a process flow relating to a sale of merchandise.

Next, a description is given of the flow of processing of the mobile telephone 11, point-of-purchase server 21 and authentication server 41 relating to the sale of merchandise in the electronic commercial transaction system of FIG. 1, as shown in FIG. 12.

The user of the mobile telephone 11 then operates the mobile telephone 11, acquires GUI information from the point-of-purchase server 21, and displays information relating to the merchandise. The user then decides whether or not to purchase the merchandise by looking at the displayed merchandise information. During this time, the user operates the mobile telephone 11 so as to acquire information (store trustworthiness 354) relating to trustworthiness of the point-of-purchase 20 from the authentication server 41 in order to confirm whether or not the point-of-purchase 20 where a commercial transaction is to be made is trustworthy (arrows 371 and 372).

When the store trustworthiness 354 is obtained and displayed using the mobile telephone 11, the user decides whether or not to purchase the merchandise based on this information.

The mobile telephone 11 operated by the user that has decided to purchase the merchandise then makes a request to the point-of-purchase server 21 to purchase the merchandise (arrow 373).

With respect to this, the point-of-purchase server 21 makes a request to the mobile telephone 11 for the user trustworthiness 352 in order to confirm whether or not the user of the mobile telephone 11 is trustworthy as a person with which to make a commercial transaction (arrow 374), and the mobile telephone 11 then provides the user trustworthiness 352 in response to this request (arrow 375).

The point-of-purchase server 21 that has acquired the user trustworthiness 352 and confirmed that the user of the mobile telephone 11 is trustworthy then makes a request to the mobile telephone 11 for the card identification number 351 allotted to the non-contact IC card 146 (arrow 376). The mobile telephone 11 then provides the card identification number 351 in response to this request.

The point-of-purchase server 21 that has acquired the card identification number 351 then carries out processing relating to purchasing and charging, and sells the merchandise. The point-of-purchase server 21 then generates purchasing information 353 constituting information relating to the current commercial transaction and provides this to the mobile telephone 11 together with the purchasing information rewriting key 361 (arrow 378).

As shown in FIG. 12, the purchasing information 353 is comprised of a purchasing identifier for identifying the corresponding commercial transaction, a payment identifier for identifying whether or not payment for the sale of the merchandise has been made, and a purchasing card identification number constituted by the card identification number 351 allotted to the non-contact IC card 146 in the possession of the user purchasing the merchandise.

The mobile telephone 11 provided with the purchasing information 353 and the purchasing information rewriting key 361 then records the purchasing information 353 in the non-contact IC card 146 using the purchasing information rewriting key 361. When this writing is complete, the mobile telephone 11 deletes the purchasing information rewriting key 361 and provides notification of completion of writing to the point-of-purchase server 21 (arrow 379).

When notification of completion of writing is acquired, the point-of-purchase server 21 provides notification of completion of processing to the mobile telephone 11 (arrow 380) and processing relating to purchase of the merchandise is complete. When the provided notification of completion of processing is acquired, the mobile telephone 11 ends processing relating to purchase of the merchandise.

Figure 13:
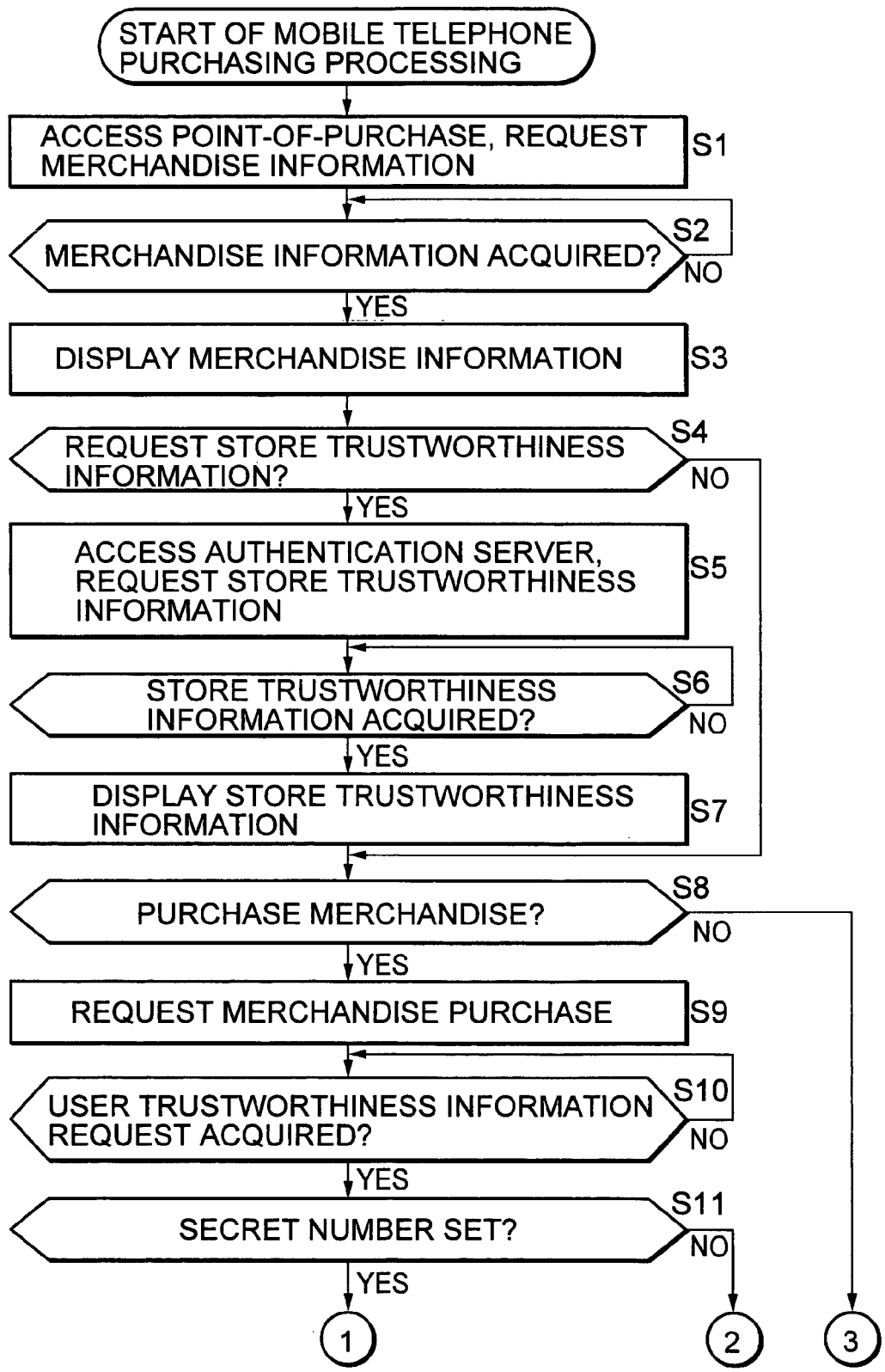
FIG. 13 is a flowchart illustrating purchasing processing by a mobile telephone.
Figure 14:
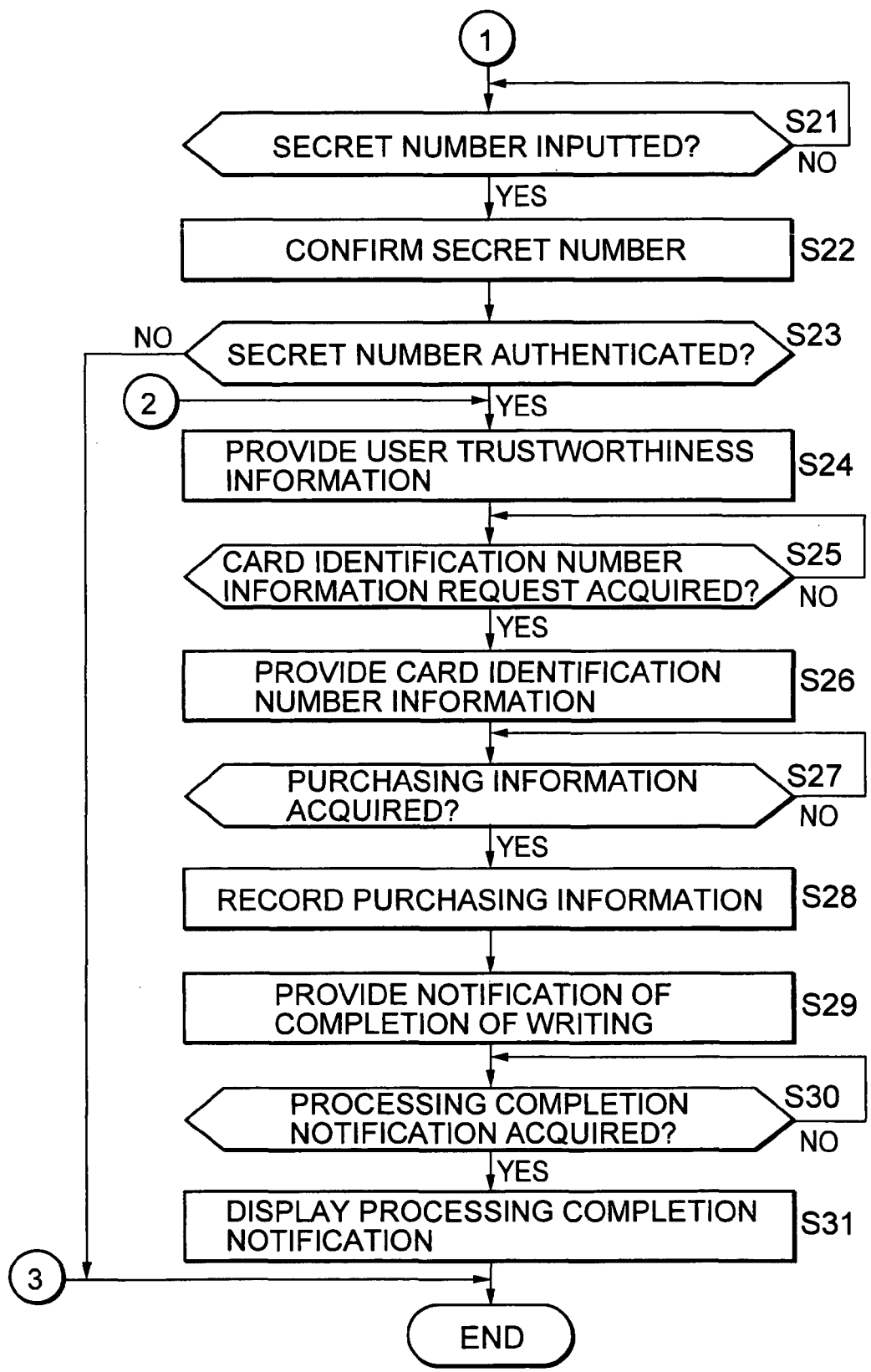
FIG. 14 is a flowchart continuing on from the flowchart of FIG. 13 illustrating purchasing processing by a mobile telephone.

The following is a description with reference to the flow-charts of FIG. 13 and FIG. 14 of purchasing processing of the mobile telephone 11.

First, in step S1, the main control unit 131 of the mobile telephone 11 carries out wireless communication with the nearest base station 12 via the antenna 112, accesses the point-of-purchase server 21 via the network 10, and requests purchasing information. The point-of-purchase server 21 that has acquired this request then provides the requested purchasing information to the mobile telephone 11 as described in the following.

In step S2, the main control unit 131 determines whether or not the requested merchandise information has been acquired, and waits until it is determined that acquisition has taken place.

When it is determined that the merchandise information has been acquired, the main control unit 131 advances the processing to step S3 and controls the LCD control unit 136 so that a screen corresponding to the acquired merchandise information is displayed at the liquid crystal display 115. The user then decides whether or not to purchase the merchandise based on the displayed screen. Further, during this time, the user makes a request to the authentication server 41 for the store trustworthiness 354 to use this to determine the trustworthiness of the point-of-purchase 20.

In step S4, the main control unit 131 controls the operation input control unit 132 so as to monitor for user operation inputs, and determines whether or not to request store trustworthiness information based on instructions inputted by the user.

When it is determined to request the store trustworthiness information, the main control unit 131 advances the processing to step S5, carries out wireless communication with the closest base station 12 via the antenna 112, accesses the authentication server 41 via the network 10, and requests store trustworthiness information containing the store trustworthiness 354. This processing corresponds to the processing of arrow 371 of FIG. 12. As described in the following, the authentication server 41 generates trustworthiness information containing the store trustworthiness 354 recorded in the storage unit 323 based on this request, and provides this to the mobile telephone 11 via the network 10.

In step S6, the main control unit 131 determines whether or not the requested store trustworthiness information has been acquired, and waits until it is determined that acquisition has taken place.

When it is determined that the requested store trustworthiness information has been acquired, the main control unit 131 advances the processing to step S7, controls the LCD control unit 136, displays a screen corresponding to the acquired store trustworthiness information at the liquid crystal display 115, and advances the processing to step S8. The user then decides upon the reliability of the point-of-purchase 20 and upon whether or not to purchase the merchandise based on the displayed screen.

Further, when it is determined based on user instruction in step S4 that store trustworthiness information has not been requested, the main control unit 131 omits the processing from step S5 to step S7 described above and advances the processing to step S8.

In step S8, the main control unit 131 determines whether or not to purchase merchandise based on user instruction. When it is determined that merchandise is to be purchased based on instructions inputted by a user as a result of operating the operation keys 116 or the jog dial 119, the main control unit 131 advances the processing to step S9 and makes a request to the point-of-purchase server 21 for purchasing information via the network 10. This processing corresponds to the processing of arrow 373 of FIG. 12.

The point-of-purchase server 21 that has acquired this merchandise purchase request then requests the user trustworthiness 352 of the mobile telephone 11 as described in the following. In step S10, the main control unit 131 determines whether or not a request for user trustworthiness information has been acquired, and waits until it is determined that acquisition has taken place.

When it is determined the user trustworthiness information has been acquired, the main control unit 131 advances processing to step S11, and a determination is made as to whether or not a password is set.

The user trustworthiness 352 is personal information for the user of the mobile telephone 11, and there are therefore cases where this recalls uncertainty in the user in providing this to the store for the user trustworthiness 352. In this case, the mobile telephone 11 can be set up in such a manner that input of a password is required when reading this user trustworthiness 352.

When it is determined in step S11 that a password is set up, then input of the password is necessary to read the user trustworthiness 352. The main control unit 131 therefore advances the processing to step S21 of FIG. 14, controls the operation input control unit 132, determines whether or not the password has been inputted, and waits until input is determined.

When input of the password is determined, the main control unit 131 advances processing to step S22, the inputted password is set in advance, and is confirmed through comparison with a password stored in RAM etc. built-into the main control unit 131.

Then, in step S23, the main control unit 131 determines whether or not the inputted password has been authenticated based on the processing results of step S22. When it is determined that the password has been authenticated, the main control unit 131 advances the processing to step S24.

Further, when it is determined in step S11 of FIG. 13 that a password is not set, the main control unit 131 advances processing to step S24 of FIG. 14.

In step S24, the main control unit 131 acquires the user trustworthiness 352 stored in the non-contact IC card 146, and provides user trustworthiness information containing this user trustworthiness 352 to the point-of-purchase server 21 via the network 10. This processing corresponds to the processing of arrow 375 of FIG. 12.

The point-of-purchase server 21 that has acquired the user trustworthiness information then determines whether or not the user of the mobile telephone 11 is trustworthy. When the user is determined to be trustworthy, a request is made to the mobile telephone 11 for card identification number information containing the card identification number 351 allotted to the non-contact IC card 146.

In step S25, the main control unit 131 determines whether or not a request for this card identification number information has been acquired, and waits until it is determined that acquisition has taken place. When it is determined that a card identification number information request has been acquired, the main control unit 131 advances processing to step S26, the card identification number 351 is acquired from the non-contact IC card 146, and card identification number information containing this card identification number 351 is provided to the point-of-purchase server 21 via the network 10. This processing corresponds to the processing of arrow 377 of FIG. 12.

After carrying out processing relating to sale of and charging for the merchandise, the point-of-purchase server 21 that has acquired the card identification number information generates the purchasing information 353 described above and provides this to the mobile telephone 11.

In step S27, the main control unit 131 determines whether or not the purchasing information 353 has been acquired, and waits until it is determined that acquisition has taken place. When it is determined that the purchasing information 353 has been acquired, the processing advances to step S28, and the acquired purchasing information 353 is recorded in the non-contact IC card 146.

When recording of the purchasing information 353 is complete, the main control unit 131 advances the processing to step S29, and notification of completion of writing is provided to the point-of-purchase server 21 via the network 10. This processing corresponds to the processing of arrow 379 of FIG. 12.

The point-of-purchase server 21 that has acquired the notification of completion of writing then provides notification of completion of processing to the mobile telephone 11.

In step S30, the main control unit 131 determines whether or not notification of completion of processing has been acquired, and waits until it is determined that acquisition has taken place. When it is determined that notification of completion of processing has been acquired, in step S31, the main control unit 131 controls the LCD control unit 136 so as to display a screen corresponding to the acquired notification of completion of processing at the liquid crystal display 115. The user then confirms the processing is complete by looking at the screen corresponding to this notification of completion of processing.

The main control unit 131 displaying the screen corresponding to the notification of completion of processing then ends the purchasing processing.

In step S8 of FIG. 13, when it is determined that the merchandise is not to be purchased, the main control unit 131 ends purchasing processing. Further, in step S23, when the inputted password is not authenticated (when passwords inputted by the user a plurality of times are all not authenticated), the main control unit 131 ends purchasing processing.

Figure 15:
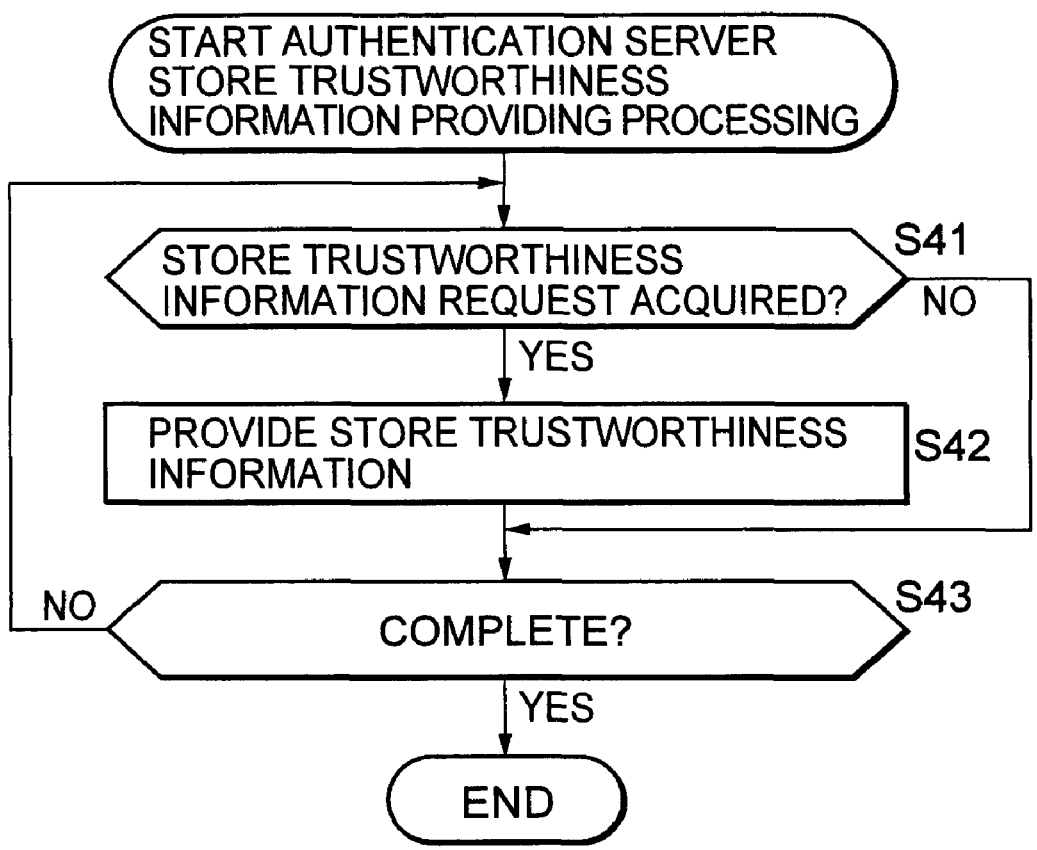
FIG. 15 is a flowchart illustrating processing of store reliability in providing information performed by the authentication server.

Next, store trustworthiness information providing processing by the authentication server 41 executed so as to correspond to the processing of step S4 to step S7 of the purchasing processing of the mobile telephone 11 described above is now described with reference to the flowchart of FIG. 15.

First, in step S41, the CPU 311 of the authentication server 41 determines whether or not a request for store trustworthiness information provided by the mobile telephone 11 has been acquired in the processing of step S5 of FIG. 13.

When it is determined that a request for store trustworthiness information has been acquired, the CPU 311 advances processing to step S42, store trustworthiness 354 of the point-of-purchase 20 stored in the storage unit 323 is acquired, store trustworthiness information containing the store trustworthiness 354 is generated, and the generated store trustworthiness information is provided to the mobile telephone 11 via the network 10 by controlling the communication unit 324. This processing corresponds to the arrow 372 of FIG. 12.

The CPU 311 providing the store trustworthiness information then advances the processing to step S43.

In step S41, when it is determined that a request for store trustworthiness information has not been acquired, the CPU 311 omits the processing of step S42, and processing advances to step S43.

In step S43, the CPU 311 determines whether or not store trustworthiness information providing processing is finished.

When it is determined that the processing is not finished, the CPU 311 returns to step S41 and processing from there onwards is repeated. Further, when it is determined that the sales processing has finished, the store trustworthiness information providing processing ends.

Next, processing by the point-of-purchase server 21 executed corresponding to purchasing processing by the mobile telephone 11 as described above is described with reference to the flowcharts of FIG. 16 and FIG. 17.

First, in step S61, the CPU 201 of the point-of-purchase server 21 controls the communication unit 224 and determines whether or not a request for merchandise information has been acquired. When it is determined that a request for merchandise information has been acquired (when merchandise information is requested by the mobile telephone 11), the CPU 201 advances processing to step S62, the requested merchandise information stored in the storage unit 223 is acquired, and is provided to the mobile telephone 11 via the network 10 by controlling the communication unit 224.

The CPU 201 provided with the merchandise information then advances the processing to step S63. Further, in step S61, when it is determined that a request for merchandise information has not been acquired, the CPU 201 omits the processing of step S62, and processing advances to step S63.

In step S63, the CPU 201 controls the communication unit 224 and determines whether or not a request for purchasing information provided by the processing of step S9 of FIG. 13 has been acquired.

The CPU 201 determining that a request for merchandise information has been acquired then controls the communication unit 224 in step S64 and makes a request to the mobile telephone 11 for user trustworthiness information. This processing corresponds to the processing of arrow 374 of FIG. 12.

To conform with this request, in step S24 of FIG. 14, the mobile telephone 11 supplies user trustworthiness information containing the user trustworthiness 352 to the point-of-purchase server 21.

In step S65, the CPU 201 controls the communication unit 224 so as to determine whether or not requested user trustworthiness information 352 has been acquired, and waits until it is determined that acquisition has taken place.

When it is determined that user trustworthiness information has been acquired, the CPU 201 advances the processing to step S66, extracts user trustworthiness 352 from the acquired user trustworthiness information, and determines trustworthiness of the user of the mobile telephone 11.

Figure 17:
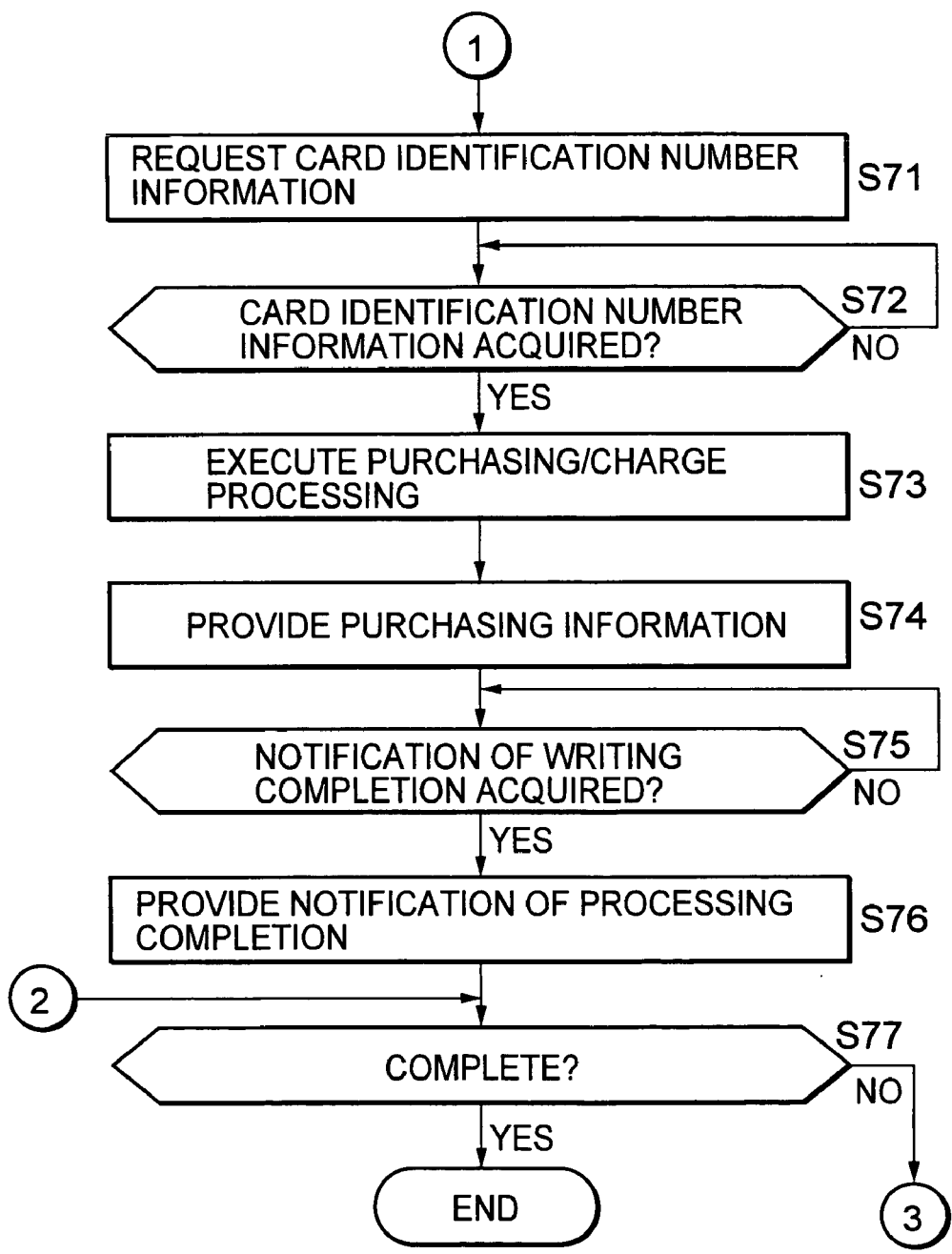
FIG. 17 is a flowchart continuing on from the flowchart of FIG. 16 illustrating sales processing performed by a point-of-purchase server 21.

In step S67, a determination is made as to whether or not to make a sale of the merchandise to the user of the mobile telephone 11, and when it is determined to make a sale, processing advances to step S71 of FIG. 17.

In step S71 of FIG. 17, the CPU 201 controls the communication unit 224 so as to make a request for card identification number information of the non-contact IC card 146 built-into the mobile telephone 11. This processing corresponds to the processing of arrow 376 of FIG. 12.

To conform with this request, in step S26 of FIG. 14, the main control unit 131 of the mobile telephone 11 supplies card identification number information to the point-of-purchase server 21.

In step S72, the CPU 201 controls the communication unit 224 so as to determine whether or not card identification number information provided by the mobile telephone 11 has been acquired, and waits until it is determined that acquisition has taken place.

When it is determined that the card identification number information has been acquired, the CPU 201 advances processing to step S73, and executes purchasing/charging processing constituting processing relating to the sale of merchandise.

When purchasing/charging processing is complete, in step S74, the CPU 201 generates purchasing information relating to sale of merchandise on this occasion, and controls the communication unit 224 so that this generated purchasing information is provided to the mobile telephone 11 via the network 10 so as to be stored in the non-contact IC card 146. This processing corresponds to the processing of arrow 378 of FIG. 12.

In step S75, the CPU 201 provided with the purchasing information controls the communication unit 224 so as to determine whether or not notification of completion of writing of the purchasing information provided to the mobile telephone 11 has been acquired, and waits until it is determined that acquisition has taken place.

When it is determined that notification of completion of writing has been acquired, in step S76, the CPU 201 generates notification of completion of processing, and controls the communication unit 224 so as to provide this notification of completion of processing to the mobile telephone 11 via the network 10. This processing corresponds to the processing of arrow 380 of FIG. 12.

The CPU 201 to which the notification of completion of processing is supplied then advances to step S77.

Figure 16:
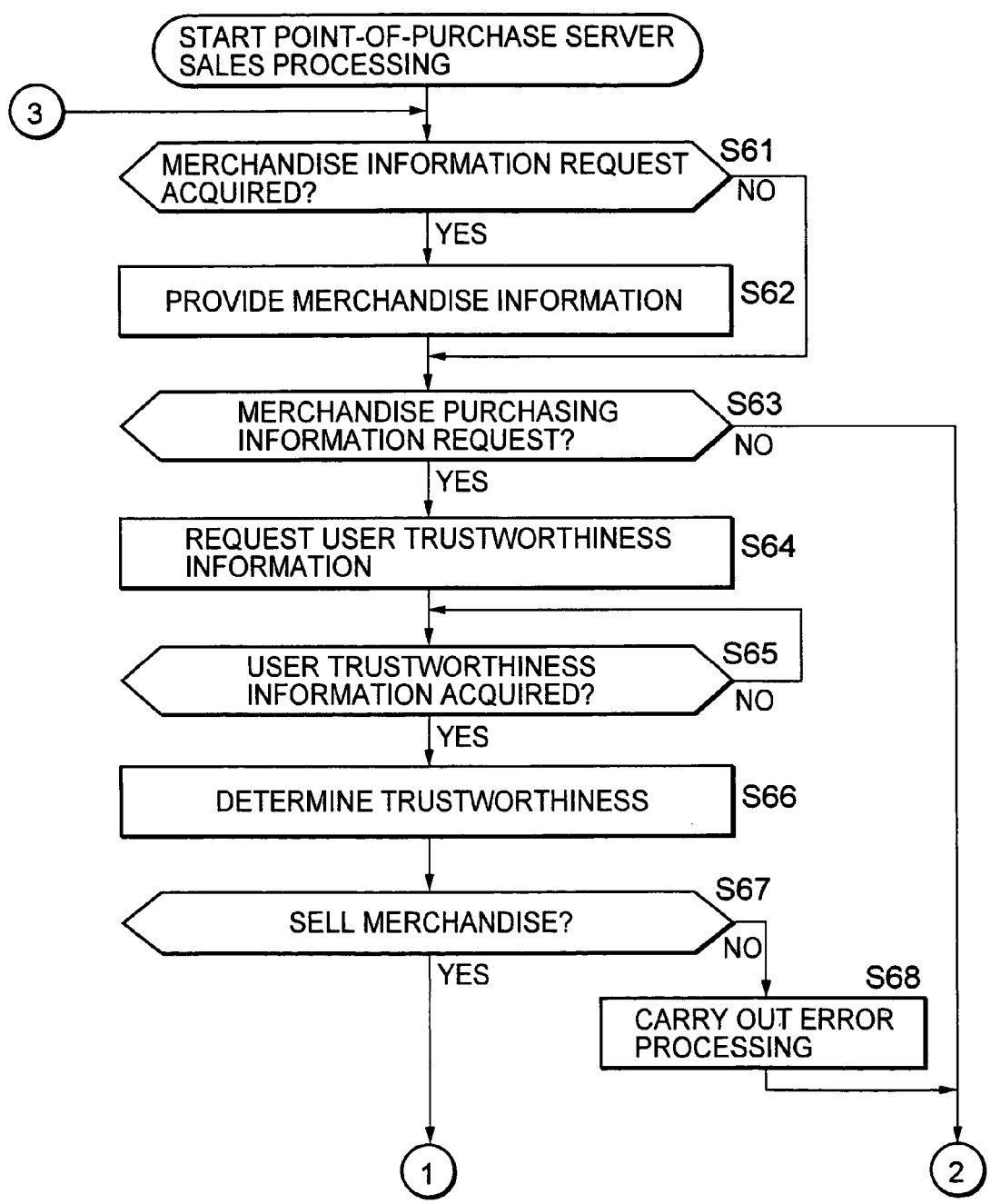
FIG. 16 is a flowchart illustrating sales processing performed by a point-of-purchase server 21.

In the processing, of step S67 of FIG. 16, when it is determined that merchandise is not to be sold, after carrying out error processing in step S68 of FIG. 16, the CPU 201 advances the processing to step S77 of FIG. 17.

In step S77, the CPU 201 determines whether or not sales processing is finished. When it is determined that the processing is not finished, the processing of step S61 of FIG. 16 is returned to and processing from there onwards is repeated.

Further, when it is determined that the sales processing has finished, the CPU 201 ends the sales processing.

In the above manner, the user of the mobile telephone 11 purchases the intended merchandise from the point-of-purchase 20.

Figure 18:
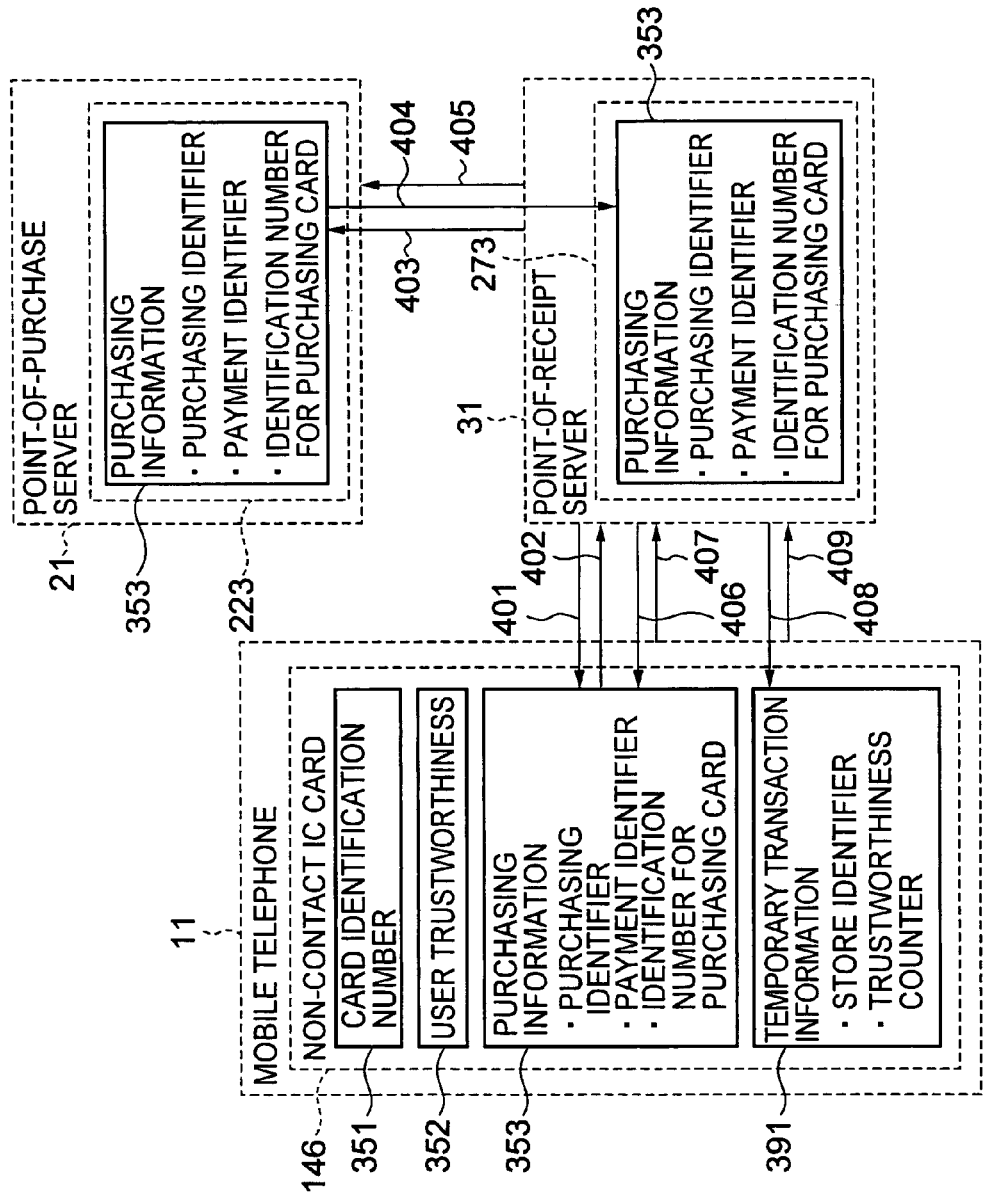
FIG. 18 is a view illustrating the flow of processing relating to handing over of merchandise.

Next, a description is given with reference to FIG. 18 of the flow of processing of the mobile telephone 11, point-of-purchase server 21 and point-of-receipt server 31 while a user of the mobile telephone 11 purchasing merchandise is receiving the purchased merchandise.

In order to receive the purchased merchandise, the user of the mobile telephone 11 that has purchased the merchandise as described above goes to either the nearest point of receipt 30 or to a point of receipt 30 designated in advance by the point-of-purchase 20. The user then positions the mobile telephone 11 in the vicinity of the IC card reader/writer 275 of the point-of-receipt server 31 installed at the point of receipt 30, and positions the non-contact IC card 146 built-into the mobile telephone 11 in the vicinity of the IC card reader/writer 275.

When the non-contact IC card 146 is positioned within communication range, the point-of-receipt server 31 acquires purchasing information 353 and card identification number information (card identification number 351) stored in the non-contact IC card 146 of the mobile telephone 11 via the IC reader/writer 275 (arrow 401 and arrow 402).

The point-of-receipt server 31 that has acquired the purchasing information 353 and the card identification number information (card identification number 351) acquires purchasing information 353 (i.e. purchasing information for which the contained purchasing identifier is the same) corresponding to the acquired purchasing information 353 from the point-of-purchase server 21 (arrow 403 and arrow 404).

The point-of-receipt server 31 then compares the purchasing information 353 and the card identification number 351 acquired from the mobile telephone 11 and the purchasing information 353 acquired from the point-of-purchase server 21, and authenticates the user of the mobile telephone 11.

When the user is determined to be the purchaser of the merchandise, the point-of-receipt server 31 notifies the point-of-purchase server 21 that confirmation processing is complete (arrow 405).

The point-of-receipt server 31 then provides the purchasing information rewriting key 361 to the mobile telephone 11 (arrow 406), and purchasing information 353 stored in the non-contact IC card 146 is deleted at the mobile telephone 11.

The mobile telephone 11 then deletes the purchasing information 353 using the acquired purchasing information rewriting key 361 and when this deletion is complete, the purchasing information rewriting key 361 is deleted, and notification of completion of deletion is provided to the point-of-receipt server 31 (arrow 407).

The point-of-receipt server 31 that has acquired the deletion completion notification then generates temporary commercial transaction information 391 constituting information for trustworthiness of the point-of-purchase 20 and provides this to the mobile telephone 11 together with the temporary commercial transaction information rewriting key 362 (arrow 408).

The temporary commercial transaction information 391 is comprised of a store identifier for identifying the point-of-purchase 20 constituting the store where the user of the mobile telephone 11 purchased the merchandise and a trustworthiness counter constituting a fluctuation portion fluctuating with the commercial transaction for this time for the reliability of the point-of-purchase 20.

The mobile telephone 11 then records the provided temporary commercial transaction information 391 in the non-contact IC card 146 using the acquired temporary commercial transaction information rewriting key 362. When recording is complete, the mobile telephone 11 deletes the temporary commercial transaction information rewriting key 362, and provides the notification of completion of writing to the point-of-receipt server 31 (arrow 409) so as to complete processing relating to handing over of the merchandise.

The point-of-receipt server 31 that has acquired the notification of completion of writing then ends processing relating to handing over of the merchandise.

When processing related to handing over of the merchandise is complete, the user of the mobile telephone 11 receives the purchased merchandise from the store of the point of receipt 30.

Figure 19:
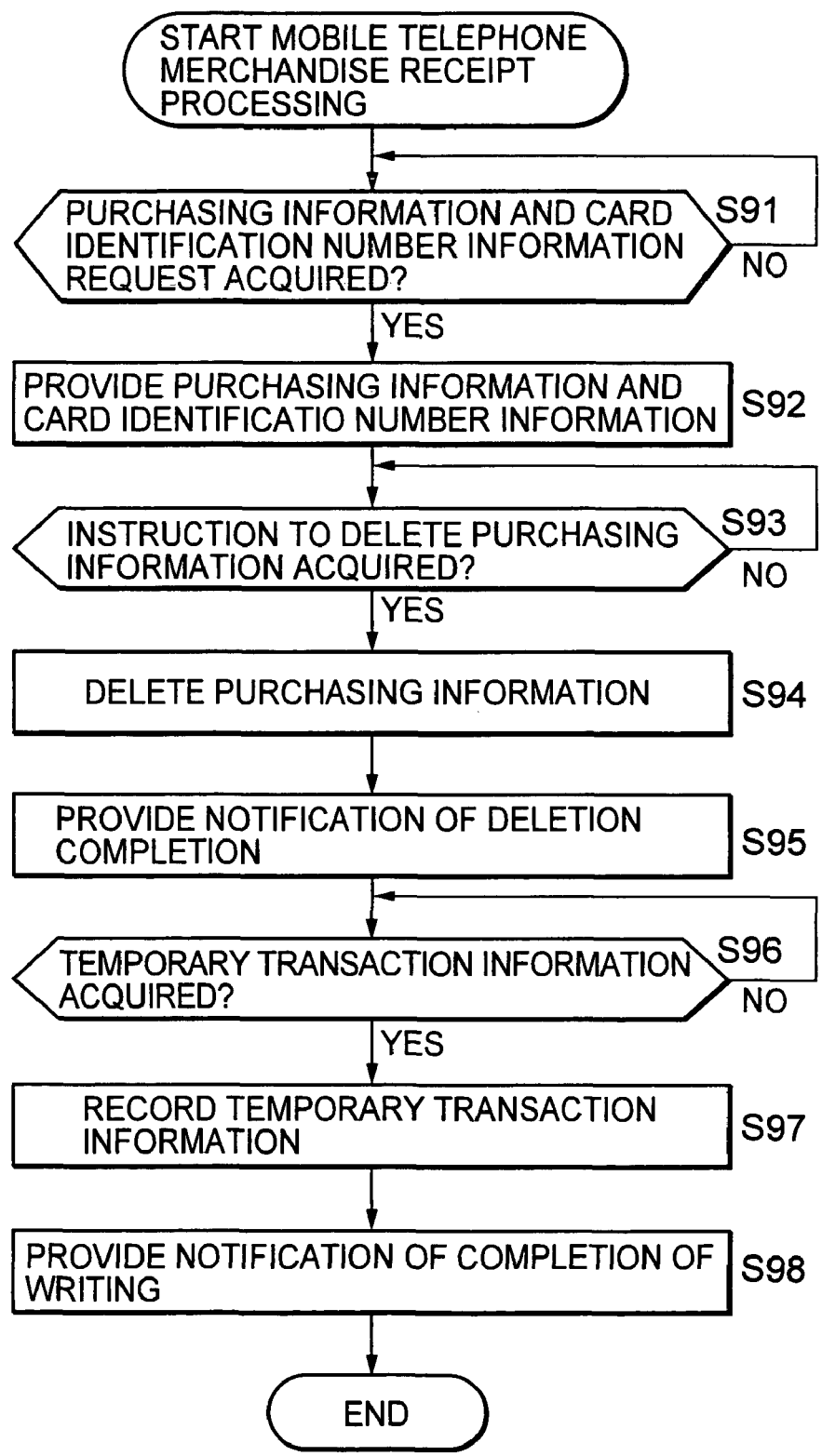
FIG. 19 is a flowchart illustrating merchandise receipt processing carried out by a mobile telephone.

The following is a description with reference to the flowchart of FIG. 19 of merchandise receipt processing of the mobile telephone 11.

First, in step S91, the main control unit 131 of the mobile telephone 11 makes a determination as to whether or not a request for the purchasing information 353 and the card identification number information has been acquired via the non-contact IC card 146 in the vicinity of the IC card reader/writer 275, and waits until it is determined that acquisition has taken place.

When it is determined that a request for the purchasing information 353 and the card identification number information has been acquired, the main control unit 131 advances processing to step S92, controls the CPU 161 of the non-contact IC card 146, and provides card identification number information containing the requested purchasing information 353, and card identification number 351 to the point-of-receipt server 31. This processing corresponds to the processing of arrow 402 of FIG. 18.

The point-of-receipt server 31 that has acquired the purchasing information 353 and the card identification number information the carries out authentication processing on the user of the mobile telephone 11. When authentication is complete, instruction is given to delete the purchasing information from the mobile telephone 11.

In step S93, the main control unit 131 controls the CPU 161 of the non-contact IC card 146 so as to determine whether or not an instruction to delete the purchasing information rewriting key 361 from the point-of-receipt server 31 and the purchasing information has been acquired, and waits until it is determined that acquisition has taken place.

When it is determined that an instruction to delete the purchasing information has been acquired from short range wireless communication via the antenna 170, the main control unit 131 advances processing to step S94, controls the CPU 161 of the non-contact IC card 146, and deletes purchasing information 353 using the purchasing information rewriting key 361 acquired at the same time.

When deletion is complete, the main control unit 131 controls the CPU 161 of the non-contact IC card 146, erases the purchasing information rewriting key 361 used in the deletion, and provides deletion completion notification to the point-of-receipt server 31 via the antenna 170. This processing corresponds to the processing of arrow 407 of FIG. 18.

The point-of-receipt server 31 that has received the deletion completion notification then generates the aforementioned temporary commercial transaction information 391 and provides this to the mobile telephone 11 together with the temporary commercial transaction information rewriting key 362.

In step S96, the main control unit 131 controls the CPU 161 of the non-contact IC card 146 so as to determine whether or not the temporary commercial transaction information 391 and the temporary commercial transaction information rewriting key 362 have been acquired via the antenna 170, and waits until it is determined that acquisition has taken place.

When it is determined that the temporary commercial transaction information 391 and the temporary commercial transaction information rewriting key 362 have been acquired, the main control unit 131 advances processing to step S97, and controls the CPU 161 of the non-contact IC card 146 so as to record the temporary commercial transaction information 391 using the acquired temporary commercial transaction information rewriting key 362.

When recording is complete, the main control unit 131 controls the CPU 161 of the non-contact IC card 146, erases the temporary commercial transaction information rewriting key 362, and provides writing completion notification to the point-of-receipt server 31 via the antenna 170. This processing corresponds to the processing of arrow 409 of FIG. 18. The main control unit 131 provided with notification of completion of writing then ends the merchandise receipt processing.

Figure 20:
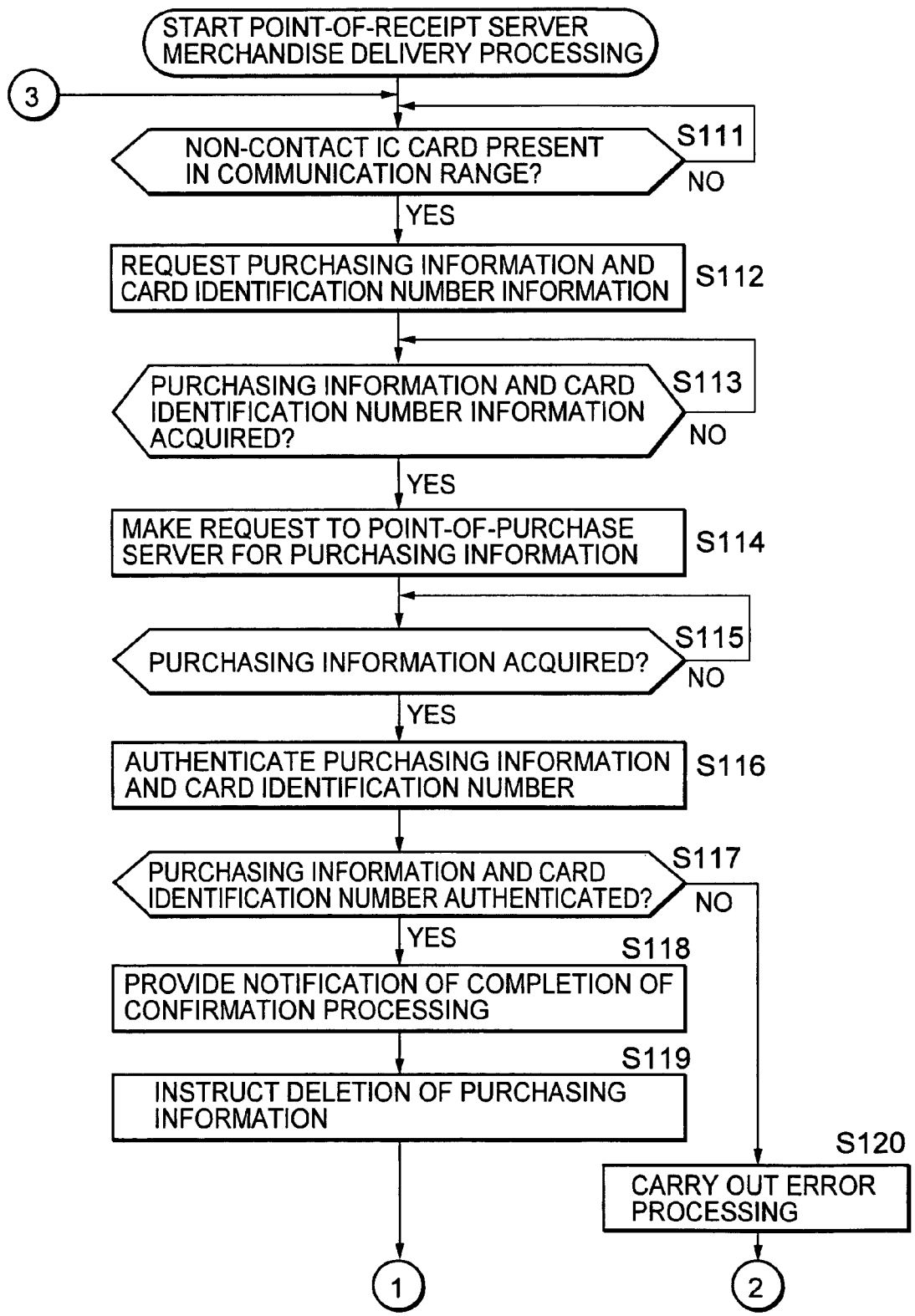
FIG. 20 is a flowchart illustrating merchandise delivery processing carried out by the point-of-receipt server.
Figure 21:
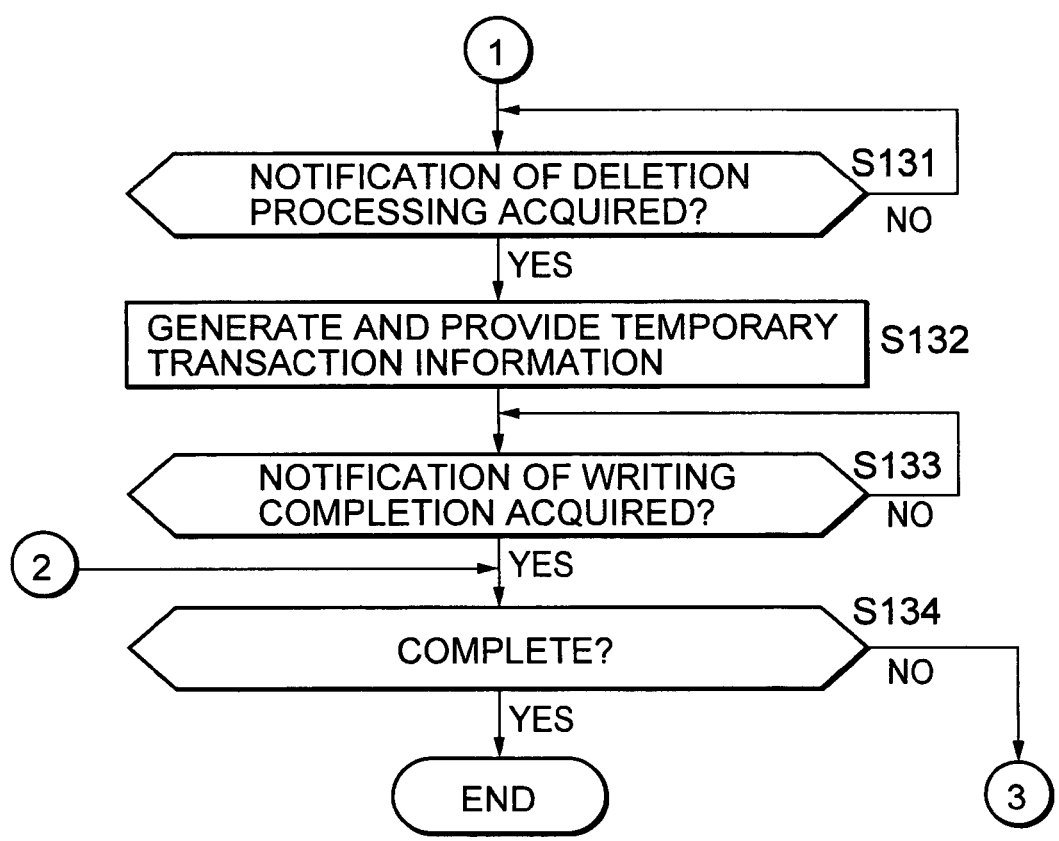
FIG. 21 is a continuation of the flowchart of FIG. 20 and is a flowchart illustrating merchandise delivery processing carried out by the point-of-receipt server.

Next, a description is given of merchandise delivery processing performed by the point-of-receipt server 31 with reference to the flowcharts of FIG. 20 and FIG. 21.

In step S111 of FIG. 20, the CPU 251 of the point-of-receipt server 31 controls the CPU 301 of the IC card reader/writer 275, determines whether or not the non-contact IC card 146 is present within communication range, and waits until this is determined to be the case.

When the non-contact IC card 146 is determined to be in communication range, the CPU 251 advances processing to step S112, controls the CPU 301 of the IC card reader/writer 275, and makes a request to the non-contact IC card 146 of the mobile telephone 11 in the vicinity for the purchasing information 353 and the card identification number information. This processing corresponds to the processing of arrow 401 of FIG. 18.

In step S113, the CPU 251 then controls the CPU 301 of the IC card reader/writer 275, makes a determination as to whether or not the purchasing information 353 and card identification number information provided by the non-contact IC card 146 of the mobile telephone 11 in the processing in step S92 of FIG. 19 has been acquired, and waits until it is determined that acquisition has taken place.

When it is determined that the purchasing information 353 and the card identification number information have been acquired, the CPU 251 advances processing to step S114, controls the communication unit 274, and makes a request to the point-of-purchase server 21 for purchasing information 353 (for which the purchasing identifier is the same) corresponding to the purchasing information 353 acquired from the non-contact IC card 146. This processing corresponds to the processing of arrow 403 of FIG. 18.

When a request for the purchasing information 353 is acquired from the point-of-receipt server 31, the point-of-purchase server 21 searches for the requested purchasing information 353 and provides this information to the point-of-receipt server 31.

In step S115, the CPU 251 controls the communication unit 274, determines whether or not purchasing information 353 has been acquired from the point-of-purchase server 21 in response to the request, and waits until it is determined that acquisition has taken place.

When it is determined that the purchasing information 353 has been acquired, the CPU 251 advances processing to step S116, and carries out authentication processing for the purchasing information 353 acquired from the non-contact IC card 146 and the card identification number 351 contained in the card identification number information using the purchasing information 353 acquired from the point of purchase server 31.

In step S117 the CPU 251 then determines whether or not the purchasing information 353 and the card identification number 351 acquired from the non-contact IC card 146 are authentic based on the results of this processing.

When it is determined that the purchasing information 353 and the card identification number 351 acquired from the non-contact IC card 146 have been authenticated, the CPU 251 advances the processing to step S118, controls the communication unit 274, and provides notification of completion of processing to the point-of-purchase server 21. This processing corresponds to the processing of arrow 405 of FIG. 18.

In step S119, the CPU 251 controls the IC card reader/writer 275, provides the purchasing information rewriting key 361 to the mobile telephone 11, and instructs the deletion of the purchasing information 353 stored in the non-contact IC card 146. This processing corresponds to the processing of arrow 406 of FIG. 18.

In step S131 of FIG. 21, the CPU 251 controls the IC card reader/writer 275, determines whether or not deletion completion notification has been acquired from the non-contact IC card 146 of the mobile telephone 11 for which the purchasing information has been deleted, and waits until it is determined that acquisition has taken place.

When it is determined that deletion completion notification has been acquired, the CPU 251 advances processing to step S132, generates temporary commercial transaction information 391 corresponding to the commercial transaction for this time using the temporary commercial transaction information rewriting key 362, controls the IC card reader/writer 275, and provides the temporary commercial transaction information 391 to the non-contact IC card 146 of the mobile telephone 11. This processing corresponds to the processing of arrow 408 of FIG. 18.

In step S133, the CPU 251 controls the IC card reader/writer 275, determines whether or not notification of completion of writing has been acquired, and waits until it is determined that acquisition has taken place.

When notification of completion of writing is outputted from the non-contact IC card 146 of the mobile telephone 11 and it is determined that this notification of completion of writing has been acquired, the CPU 251 advances processing to step S134.

However, when it is determined in the processing of step S117 of FIG. 20 that the purchasing information or card identification number provided by the non-contact IC card 146 of the mobile telephone 11 does not correspond with the purchasing information provided by the point-of-purchase 20 so that the authentication processing fails, the CPU 251 advances processing to step S120, executes error processing, and then advances to the processing of step S134 of FIG. 21.

In step S134, the CPU 251 determines whether or not the merchandise delivery processing is complete. When it is determined that commercial transaction processing is not complete, the CPU 251 returns to the processing of step S111 of FIG. 20, and processing from there onwards is repeated.

Further, when completion is determined in step S134, the CPU 251 ends merchandise delivery processing.

Next, purchasing information providing processing performed by the point-of-purchase server 21 and executed in a manner corresponding with the merchandise delivery processing described above is described with reference to the flowchart of FIG. 22.

In step S151, the CPU 201 of the point-of-purchase server 21 controls the communication unit 224 so as to determine whether or not a request for the purchasing information 353 provided in step S114 of FIG. 20 has been acquired, and waits until it is determined that acquisition has taken place.

When it is determined that a request for purchasing information has been acquired, the CPU 201 advances processing to step S152, the requested purchasing information 353 is read from the storage unit 223, the communication unit 224 is controlled, and this purchasing information 353 is supplied to the point-of-receipt server 31. This processing corresponds to the processing of arrow 404 of FIG. 18.

In step S153, the CPU 201 provided with the purchasing information 353 controls the communication unit 224 so as to determine whether or not notification of completion of processing provided in step S118 of FIG. 20 has been acquired, and waits until it is determined that acquisition has taken place.

When it is determined that notification of completion of processing has been acquired, the CPU 201 advances processing to step S154, and a determination is made as to whether or not purchasing information providing processing is complete.

When it is determined that purchasing information providing processing is not complete, the CPU 201 returns the processing to step S151, and the processing from there onwards is repeated.

Further, when it is determined in step S154 that purchasing division providing processing is complete, the CPU 201 ends purchasing information providing processing.

In the above, the user of the mobile telephone 11 authenticates that they are the purchaser of the merchandise at the point of receipt 30 at the point-of-receipt server 31, and then receives the purchased merchandise.

Therefore, in the electronic commercial transaction system described above, illegal duplication is prevented by the purchasing information rewriting key 361. However, even in cases where the purchasing information rewriting key 361 is illegally obtained etc. by some method so that the purchasing information 353 of the mobile telephone 11 is illegally duplicated, the point-of-receipt server 31 is capable of confirming whether or not the user coming to pick-up the merchandise is the rightful purchaser of the merchandise.

Figure 23:
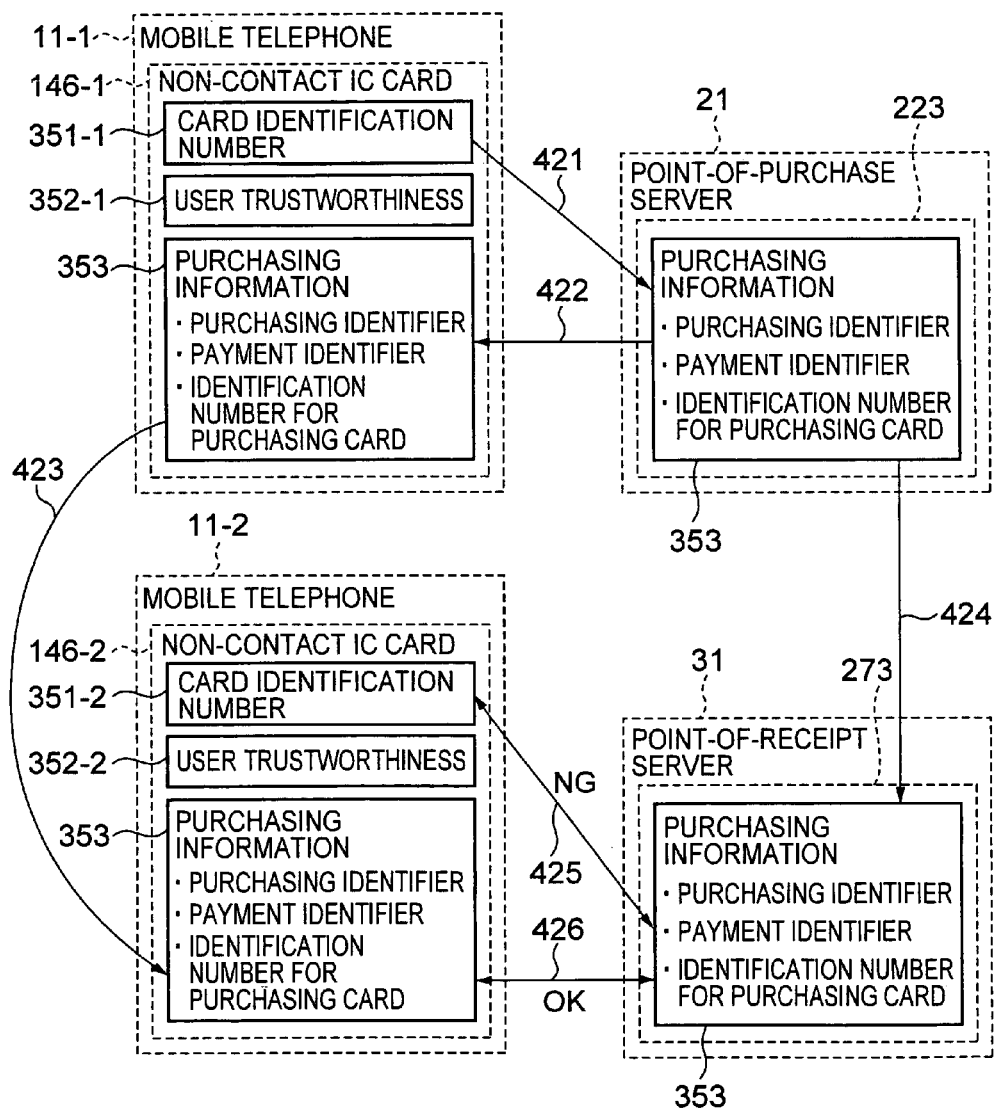
FIG. 23 is a view illustrating an example mechanism for authentication processing to which the present invention is applied.

For example, as shown in FIG. 23, when a user of a mobile telephone 11-1 purchases merchandise from the point-of-purchase 20, the point-of-purchase server 21 generates purchasing information 353 (arrow 421) using a card identification number 351-1 allotted to the non-contact IC card 146-1 of the mobile telephone 11-1 and provides this to the non-contact IC card 146 (arrow 422).

Even if a mobile telephone 11 with purchasing information 353 of the non-contact IC card 146-1 that has been illegally duplicated (arrow 423) is used when receiving the merchandise, the point-of-receipt server 31 acquires the purchasing information 353 from the point-of-purchase server 21 and confirms a card identification number 351-2 allotted to the non-contact IC card 146-2 of the mobile telephone 11-2 and an identification number (i.e. the card identification number 351-1 allotted to the non-contact IC card 146-1) of the purchasing card contained in the purchasing information 353 using the identification number (i.e. the card identification number 351-1 allotted to the non-contact IC card 146-1) of the purchasing card contained in this purchasing information 353 (arrow 425 and arrow 426) It can therefore be known that the purchasing information 353 of the mobile telephone 11-2 has been illegally duplicated.

The point-of-receipt server 31 described above is capable of identifying the rightful purchaser of merchandise in a more accurate manner.

Figure 24:
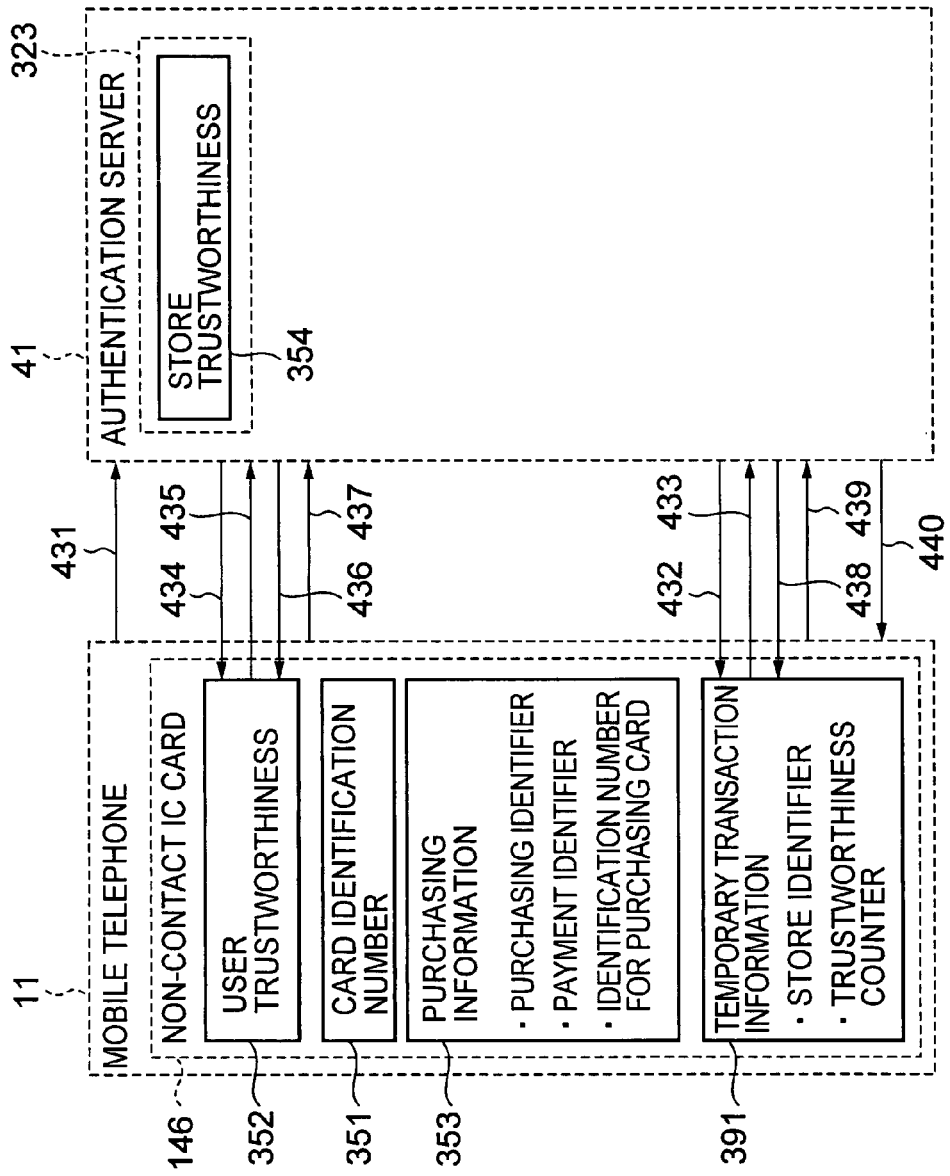
FIG. 24 is a view showing an example of flow of processing for reflecting commercial transaction results in user trustworthiness and store trustworthiness.

Next, a description is given with reference to FIG. 24 of the flow of processing at the mobile telephone 11 and authentication server 41 while reflecting the results of commercial transactions carried out in the above manner in the user trustworthiness stored in the non-contact IC card 146 of the mobile telephone 11 and the store trustworthiness managed by the authentication server 41.

First, the user operates the mobile telephone 11 so as to access the server 41 (arrow 431). The authentication server 41 that has accessed the mobile telephone 11 then makes a request to the mobile telephone 11 for the temporary commercial transaction information 391 (arrow 432). The mobile telephone 11 then provides temporary commercial transaction information 391 to the authentication server 41 based on this request (arrow 433).

The authentication server 41 then updates store trustworthiness based on the acquired temporary commercial transaction information 391. Next, the authentication server 41 makes a request to the mobile telephone 11 for the user trustworthiness 352, and acquires the user trustworthiness 352 (arrow 434 and arrow 435). After the acquired user trustworthiness 352 is updated, this updated user trustworthiness 352 is provided to the mobile telephone 11 together with the user trustworthiness rewriting key 363, and the user trustworthiness 352 held in the mobile telephone 11 is updated (arrow 436).

The mobile telephone 11 then updates the stored user information 352 using the acquired user information rewriting key 363. When updating is complete, the mobile telephone 11 erases the user information rewriting key 363 and gives notification of completion of rewriting to the authentication server 41 (arrow 437).

The authentication server 41 that has been notified of completion of the rewriting then provides the temporary commercial transaction information rewriting key 362 to the mobile telephone 11, and the temporary commercial transaction information 391 for which processing is complete is deleted (arrow 438).

The mobile telephone 11 then deletes the temporary commercial transaction information 391 using the acquired temporary commercial transaction information rewriting key 362 and notifies the authentication server 41 when this is complete (arrow 439). The authentication server 41 notified of deletion of the temporary commercial transaction information 391 then provides notification of processing completion to the mobile telephone 11 (arrow 440) and ends processing relating to updating of the trustworthiness information.

Further, when notification of completion of processing is acquired, the mobile telephone 11 ends processing relating to updating of trustworthiness information.

Figure 25:
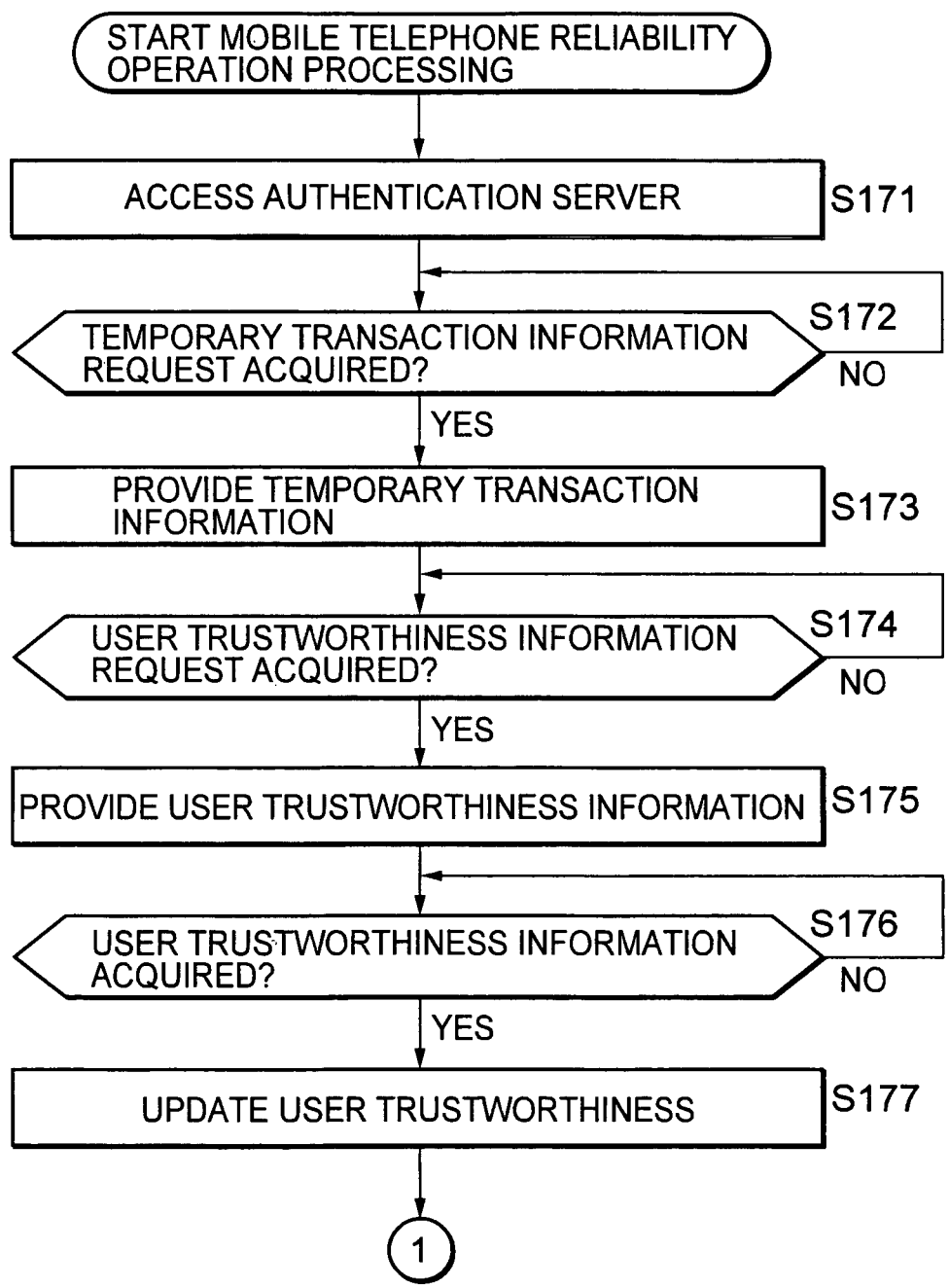
FIG. 25 is a flowchart illustrating trustworthiness operation processing carried out by a mobile telephone.
Figure 26:
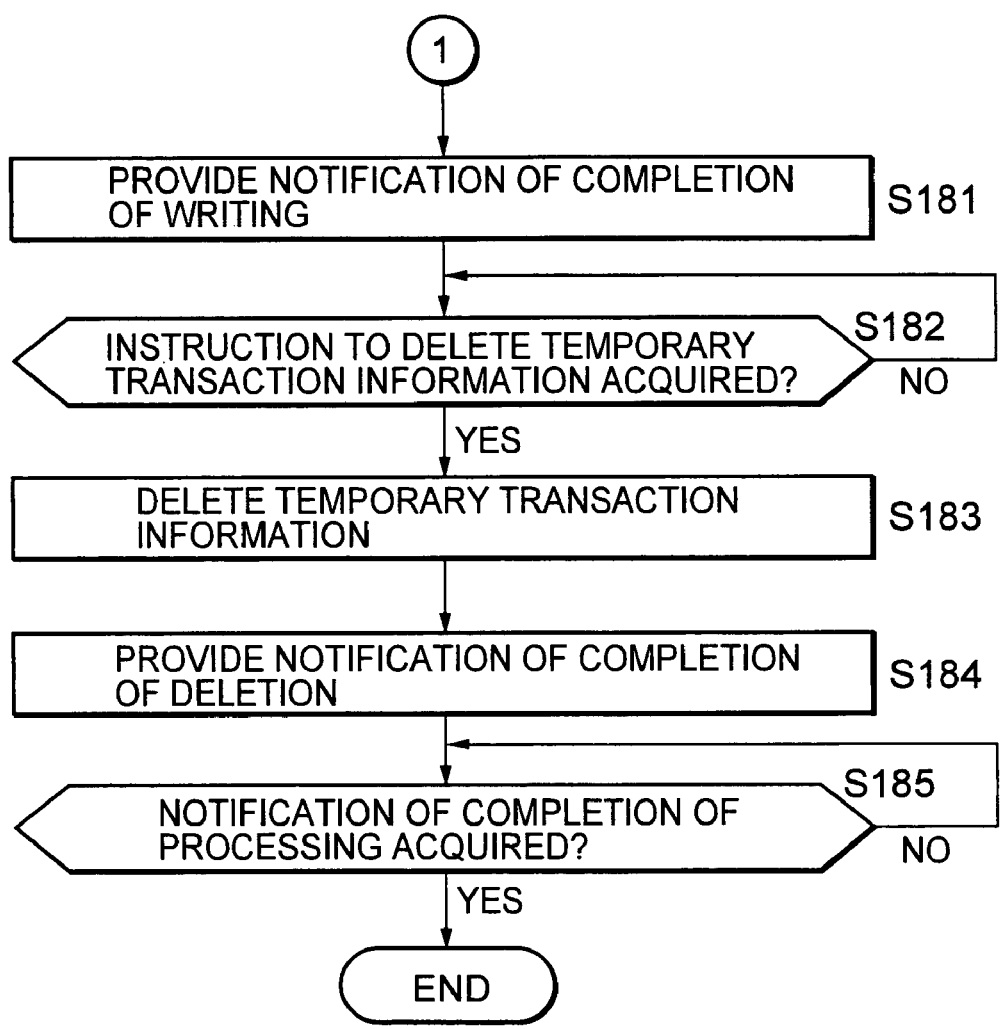
FIG. 26 is a continuation of the flowchart in FIG. 25 and is a flowchart illustrating trustworthiness operation processing carried out by a mobile telephone.

The following is a description with reference to the flowcharts of FIG. 25 and FIG. 26 of trustworthiness operation processing of the mobile telephone 11.

First, in step S171 of FIG. 25, the main control unit 131 of the mobile telephone 11 is operated by the user so as to access the authentication server 41. This processing corresponds to the processing of arrow 431 of FIG. 24.

The authentication server 41 that has accessed the mobile telephone 11 then, as described in the following, requests temporary commercial transaction information 391 stored in the non-contact IC card 146 of the mobile telephone 11.

In step S172, the main control unit 131 determines whether or not a request for temporary commercial transaction information made via the antenna 112 has been acquired, and waits until it is determined that acquisition has taken place.

When it is determined that a request for temporary commercial transaction information has been acquired, the main control unit 131 advances to step S173, acquires temporary commercial transaction information 391 stored in the non-contact IC card 146, and provides this to the authentication server 41 via the antenna 112. This processing corresponds to the arrow 433 of FIG. 24.

As described in the following, after updating the store trustworthiness 354, the authentication server 41 that has acquired the temporary commercial transaction information 391 makes a request to the mobile telephone 11 for the user trustworthiness 352.

In step S174, the main control unit 131 determines whether or not a request for user trustworthiness information has been acquired via the antenna 112, and waits until it is determined that acquisition has taken place.

When it is determined that a request for user trustworthiness information has been acquired, the main control unit 131 advances to step S175, acquires user trustworthiness 352 stored in the non-contact IC card 146, and provides user trustworthiness information containing this user trustworthiness 352 to the authentication server 41 via the antenna 112. This processing corresponds to the arrow 435 of FIG. 24.

As described in the following, the authentication server 41 that has acquired the user trustworthiness information updates the user trustworthiness 352 and provides user trustworthiness information containing the updated user trustworthiness 352 and user trustworthiness rewriting key 363 to the mobile telephone 11.

In step S176, the main control unit 131 determines whether or not a request for user trustworthiness information containing the updated user trustworthiness 352 and the user trustworthiness rewriting key 363 has been acquired via the antenna 112, and waits until it is determined that acquisition has taken place.

When it is determined that the user trustworthiness information has been acquired, the main control unit 131 advances the processing to step S177, and the user trustworthiness 352 stored in the non-contact IC card 146 is overwritten with the updated user trustworthiness 352 using the user trustworthiness rewriting key 363 contained in the acquired information.

The main control unit 131 updated with user trustworthiness 352 stored in the non-contact IC card 146 then advances processing to step S181 of FIG. 26, deletes the user trustworthiness rewriting key 363, and provides notification of completion of writing to the authentication server 41. This processing corresponds to the arrow 437 of FIG. 24.

As described in the following, the authentication server 41 that has acquired the notification of completion of writing provides a temporary commercial transaction information rewriting key 362 to the mobile telephone 11, and instructs the deletion of the temporary commercial transaction information 391 stored in the non-contact IC card 146.

In step S182, the main control unit 131 determines whether or not an instruction to delete the temporary commercial transaction information has been acquired via the antenna 112, and waits until it is determined that acquisition has taken place.

When it is determined that a temporary commercial transaction information deletion instruction has been acquired (the temporary commercial transaction information rewriting key 362 has been acquired), the main control unit 131 advances the processing to step S183, and the temporary commercial transaction information 391 stored in the non-contact IC card 146 is deleted using the acquired temporary commercial transaction information rewriting key 362.

The main control unit 131 that has deleted the temporary commercial transaction information 391 stored in the non-contact IC card 146 then advances processing to step S184, deletes the temporary commercial transaction information rewriting key 362, and provides deletion completion notification to the authentication server 41. This processing corresponds to the arrow 439 of FIG. 24.

As described in the following, the authentication server 41 that has acquired the deletion completion notification then provides notification of completion of processing to the mobile telephone 11.

In step S185, the main control unit 131 determines whether or not notification of completion of processing has been acquired via the antenna 112, and waits until it is determined that acquisition has taken place.

When it is determined that notification of completion of processing has been acquired, the main control unit 131 completes the trustworthiness operation processing.

Figure 27:
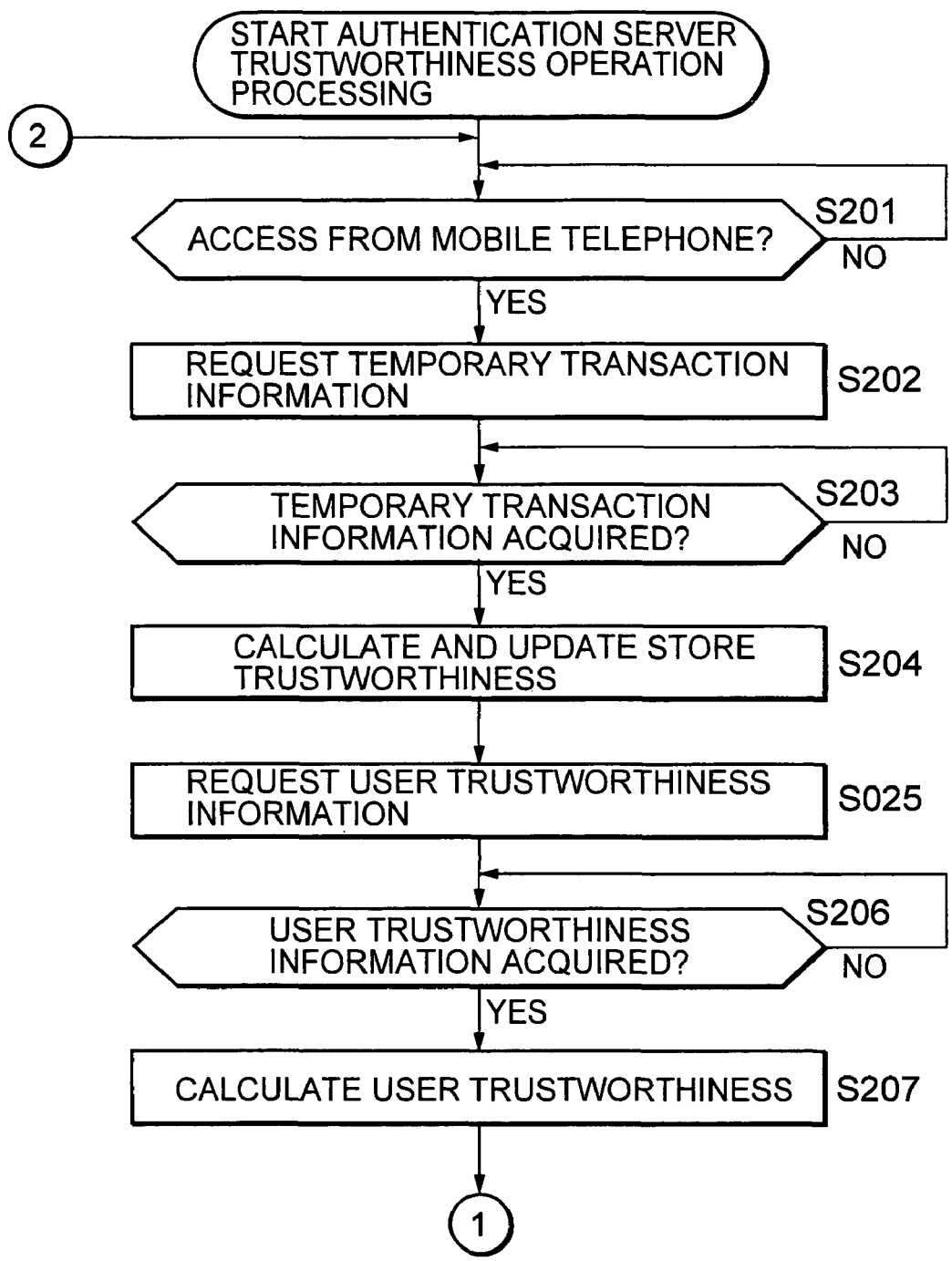
FIG. 27 is a flowchart illustrating trustworthiness operation processing carried out by the authentication server.
Figure 28:
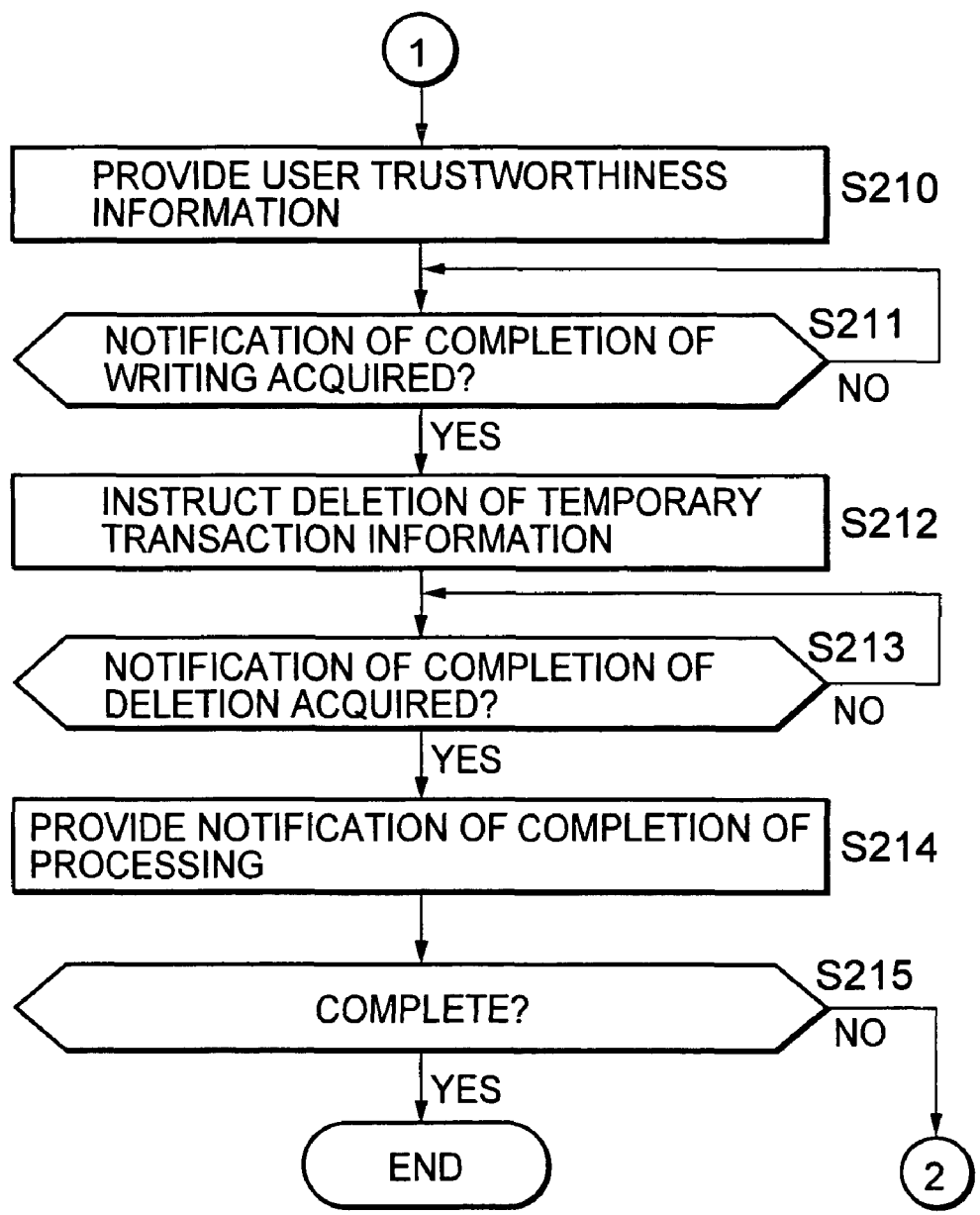
FIG. 28 is a continuation of the flowchart in FIG. 27 and is a flowchart illustrating trustworthiness operation processing carried out by an authentication server.

Next, a description is given with reference to flowcharts of FIG. 27 and FIG. 28 of trustworthiness operation processing of the authentication server 41 carried out in such a manner as to correspond with trustworthiness operation processing of the mobile telephone 11 described above.

First, in step S201 of FIG. 27, the CPU 311 of the authentication server 41 controls the communication unit 324, it is determined whether or not there has been an access by the mobile telephone 11 using the processing of step S171 of FIG. 25, and determination that an access has been made is awaited.

When it is determined that there has been an access by the mobile telephone 11, the CPU 311 advances the processing to step S202, and a request is made to the mobile telephone 11 for the temporary commercial transaction information 391 stored in the non-contact IC card 146. This processing corresponds to the processing of arrow 432 of FIG. 24.

The main control unit 131 of the mobile telephone 11 that requested the temporary commercial transaction information 391 then provides the requested temporary commercial transaction information 391 to the authentication server 41 using the processing of step S173 of FIG. 25.

In step S203 the CPU 311 controls the communication unit 324, determines whether or not temporary commercial transaction information 391 has been acquired, and waits until it is determined that acquisition has taken place.

When it is determined that the temporary commercial transaction information 391 has been acquired, the CPU 311 advances processing to step S204, calculates store trustworthiness 354 using a prescribed method based on the acquired temporary commercial transaction information 391, and updates the store trustworthiness 354 stored in the storage unit 323.

The CPU 311 with the updated store trustworthiness 354 then controls the communication unit 324 in step S205 and makes a request to the mobile telephone 11 for user trustworthiness information. This processing corresponds to the processing of arrow 434 of FIG. 24.

The main control unit 131 of the mobile telephone 11 that has acquired the user trustworthiness information request then provides user trustworthiness information corresponding to the request using the processing of step S175 in FIG. 25.

In step S206, the CPU 311 controls the communication unit 324 so as to determine whether or not user trustworthiness information has been acquired, and waits until it is determined that acquisition has taken place.

When it is determined that user trustworthiness information has been acquired, the CPU 311 advances the processing to step S207, and calculates and updates the user trustworthiness 352 using a prescribed method based on the acquired user trustworthiness information.

The CPU 311 that has updated the user trustworthiness 352 then advances processing to step S210 of FIG. 28, controls the communication unit 324, and provides user trustworthiness information containing the updated user trustworthiness 352 and the user trustworthiness rewriting key 363 to the mobile telephone 11. This processing corresponds to the processing of arrow 436 of FIG. 24.

The main control unit 131 of the mobile telephone 11 that has acquired the user trustworthiness information then updates the user trustworthiness 352 stored in the non-contact IC card 146 and provides this to the authentication server 41 using the processing of step S181 of FIG. 26.

In step S211, the CPU 311 controls the communication unit 324 so as to determine whether or not notification of completion of writing has been acquired, and waits until it is determined that acquisition has taken place.

When it is determined that notification of completion of writing has been acquired, the CPU 311 advances processing to step S212, controls the communication unit 324, provides the temporary commercial transaction information rewriting key 362 to the mobile telephone 11, and instructs the mobile telephone 11 to delete the temporary commercial transaction information 391 stored in the non-contact IC card 146. This processing corresponds to the processing of arrow 438 of FIG. 24.

When the main control unit 131 of the mobile telephone 11 deletes the temporary commercial transaction information 391 using the acquired temporary commercial transaction information rewriting key 362 based on the instruction from the authentication server 41, the processing advances to step S184 of FIG. 26, and deletion completion notification is provided to the authentication server 41.

In step S213, the CPU 311 controls the communication unit 324 so as to determine whether or not deletion completion notification has been acquired, and waits until it is determined that acquisition has taken place.

When it is determined that deletion completion notification has been acquired, the CPU 311 advances processing to step S214, controls the communication unit 324, and provides notification of completion of processing to the mobile telephone 11. This processing corresponds to the processing of arrow 440 of FIG. 24.

When the CPU 311 provides notification of completion of processing, in step S215, a determination is made as to whether or not trustworthiness operation processing is complete. When it is determined not to be complete, the CPU 311 returns processing to step S201 of FIG. 27, and the process from there onwards is repeated.

Further, when it is determined that the trustworthiness operation processing is complete, the CPU 311 ends the trustworthiness operation processing.

In the above, the mobile telephone 11 and the authentication server 41 update the values of the user trustworthiness 352 and the store trustworthiness 354 and reflect the results of the commercial transaction on this occasion in each trustworthiness. The updated user trustworthiness 352 and store trustworthiness 354 are then used during the next commercial transaction.

As in the above, it is possible to easily carry out safer electronic commercial transaction by identifying purchasers of merchandise using purchasing information 353 that is information the point-of-receipt server 31 of the point of receipt 30 where the merchandise is delivered cannot update without using a specific key and the card identification number 351 allotted to the non-contact IC card 146 storing the purchasing information 353.

Further, it is possible to carry out safer electronic commercial transaction by calculating trustworthiness of a user registered for a service and a store.

Moreover, safer electronic commercial transactions can be carried out by setting information such as user trustworthiness in such a manner that this information cannot be read out without using a password etc.

In the above, as shown in FIG. 23, a description is given where illegal duplication of the purchasing information 353 stored in the non-contact IC card 146 is not possible, but it is also possible to ensure that it is possible to change a purchaser (i.e. transfer purchasing information 353 to another device) providing the permission of the point-of-purchase 20 is received.

Figure 29:
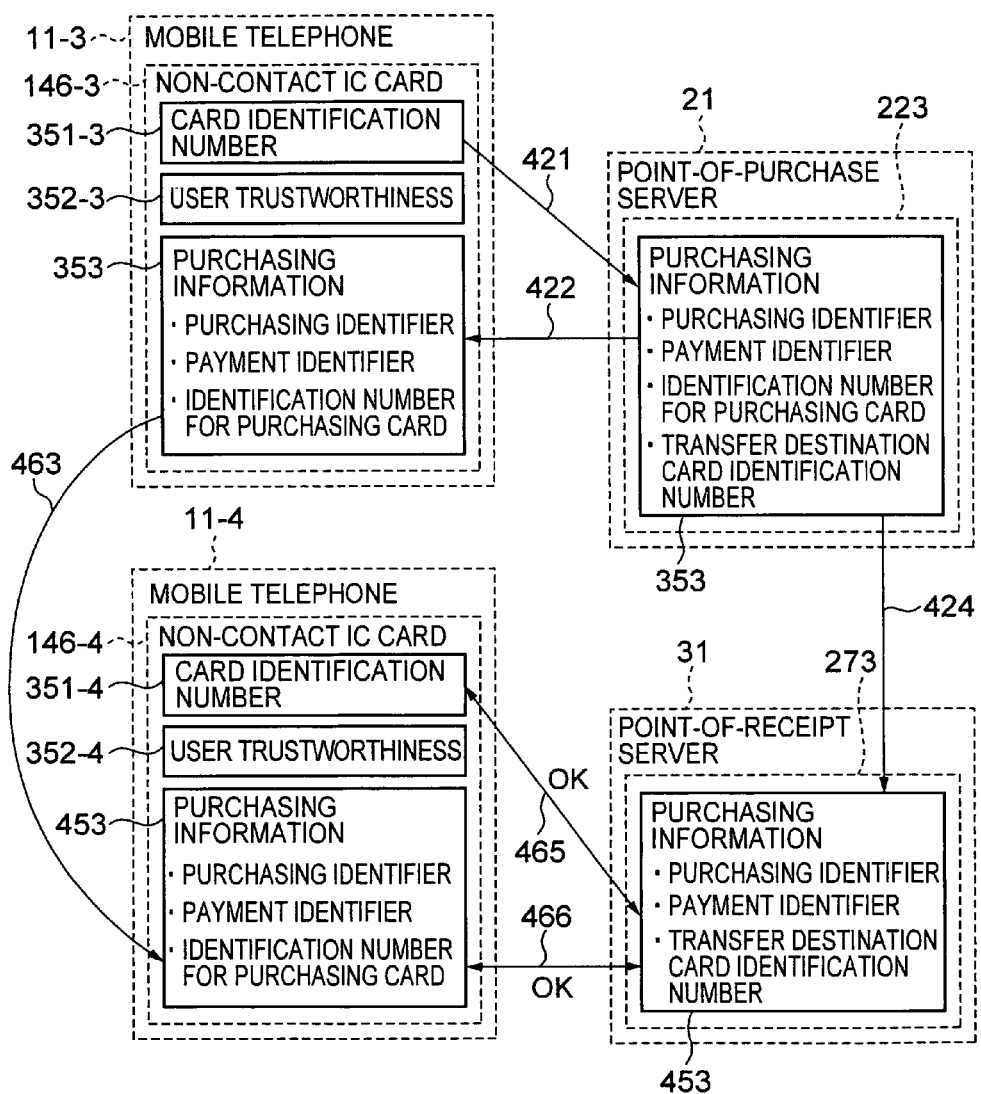
FIG. 29 is a view illustrating a further example mechanism for authentication processing to which the present invention is applied.

For example, as shown in FIG. 29, when a purchaser mobile telephone 11-3 constituting a mobile telephone used when purchasing merchandise transfers purchasing information 353 stored in a non-contact IC card 146-3 to a transfer destination mobile telephone 11-4, a transfer destination card identification number (i.e. card identification number 351-4) is overwritten (taken to be purchasing information 453) with a purchasing card identification number 353 (i.e. card identification number 351-3) contained in the purchasing information 353, and stored in a non-contact IC card 146-4 of the transfer destination mobile telephone 11-4 (arrow 463).

The point-of-purchase server 21 then manages both the purchasing card identification number (i.e. card identification number 351-3) and the transfer destination card identification number (i.e. card identification number 351-4), and provides purchasing information 453 containing the purchasing card identification number (i.e. card identification number 351-4) when a request is made to the point-of-receipt server 31 for purchasing information.

The user of the transfer destination mobile telephone 11-4 is then authenticated as the rightful purchaser of the merchandise (arrow 465 and arrow 466) as a result of the point-of-receipt server 31 confirming the card identification number 351-4 of the non-contact IC card 146-4 of the transfer destination mobile telephone 11-4 and the purchasing information 453 using the purchasing information 453.

Figure 30:
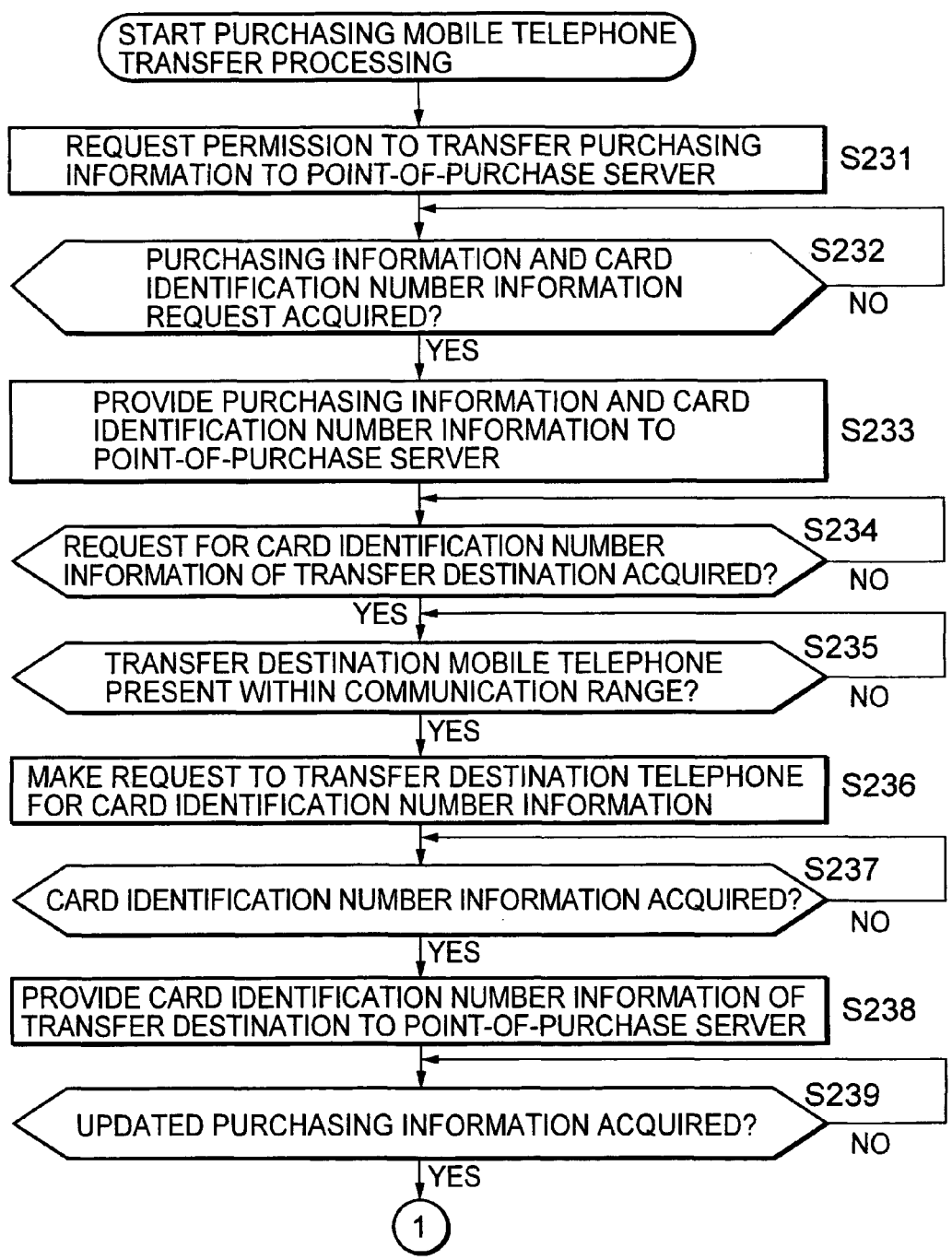
FIG. 30 is a flowchart illustrating handover processing by a purchasing mobile telephone.
Figure 31:
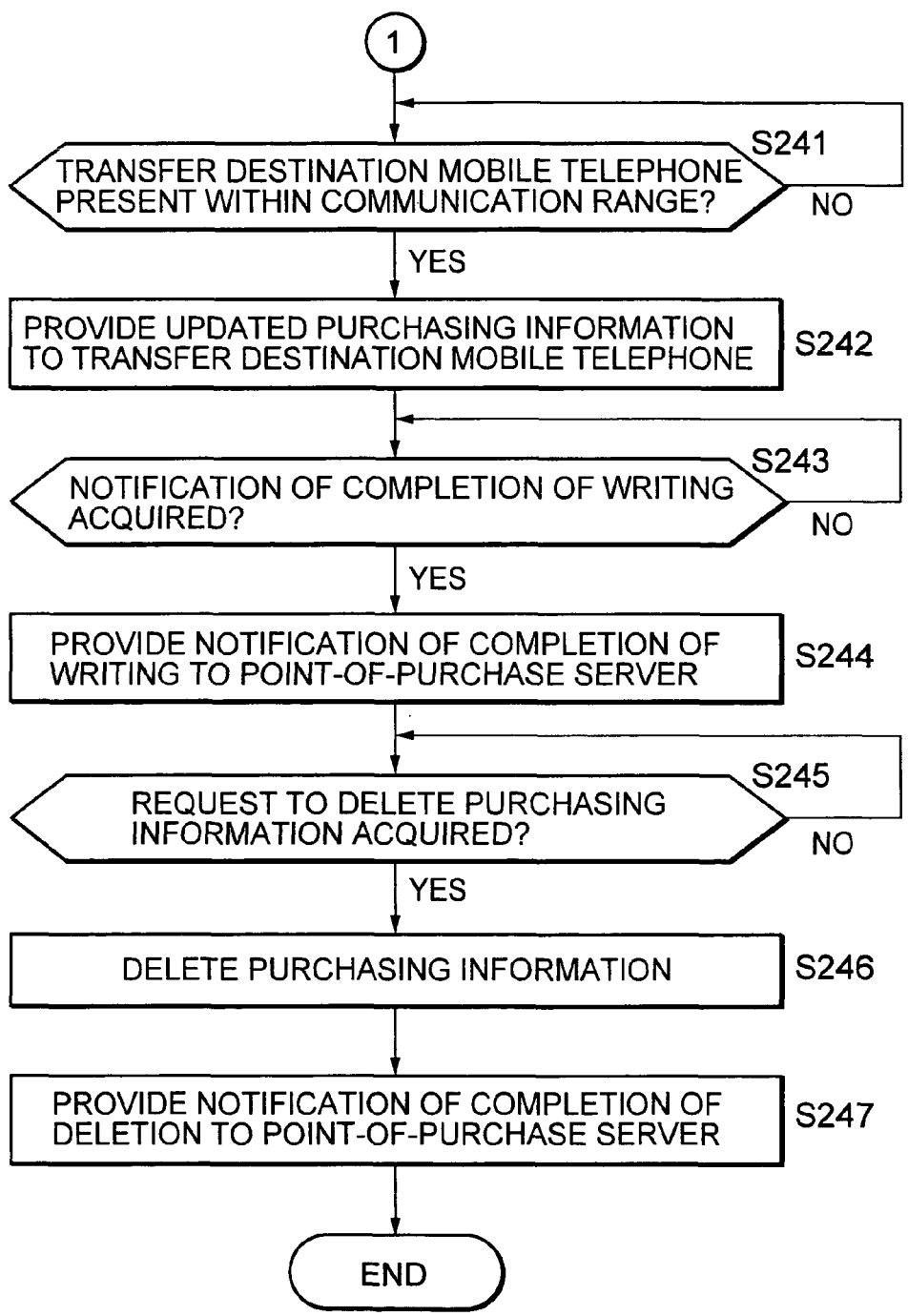
FIG. 31 is a flowchart continuing on from the flowchart of FIG. 30 illustrating handover processing by a purchasing mobile telephone.

Next, a description is given of transfer processing by the purchaser mobile telephone 11-3 of FIG. 29 with reference to the flowcharts of FIG. 30 and FIG. 31. In the following, the configuration of the purchaser mobile telephone 11-3 and the transfer destination mobile telephone 11-4 is the same as the configuration of the mobile telephone 11 and FIG. 2 to FIG. 6 may also be cited for the configuration of the purchaser mobile telephone 11-3 and the transfer destination mobile telephone 11-4.

First, in step S231, the main control unit 131 of the purchaser mobile telephone 11-3 makes a request to the point-of-purchase server 21 via the network 10 for permission to transfer the purchasing information 353.

As described in the following, the point-of-purchase server 21 that has acquired the transfer permission requests the purchasing information 353 stored in the non-contact IC card 146-3 of the purchaser mobile telephone 11-3 and card identification number information containing the card identification number 351-3.

In step S232, the main control unit 131 of the purchaser mobile telephone 11-3 determines whether or not a request for this purchasing information 353 and card identification number information has been acquired, and waits until it is determined that acquisition has taken place.

When it is determined that a request for the purchasing information 353 and card identification number information has been acquired, in step S233 the main control unit 131 provides the purchasing information 353 and card identification number information to the point-of-purchase server 21 via the network 10.

As described in the following, when the point-of-purchase server 21 that has acquired the purchasing information 353 and card identification number information has carried out authentication of the acquired purchasing information 353 using the card identification number 351-3 contained in the acquired card identification number information so as to authenticate the purchasing information 353, card identification number information containing the card identification number 351-4 of the transfer destination of the purchasing information 353 is requested.

In step S234, the main control unit 131 of the purchaser mobile telephone 11-3 determines whether or not a request for this card identification number information of the transfer destination has been acquired, and waits until it is determined that acquisition has taken place.

When it is determined that a request for the card identification number information of the transfer destination has been acquired, the main control unit 131 advances processing to step S235, a determination is made as to whether or not the transfer destination mobile telephone 11-4 is within communication range of short-range wireless communication by the non-contact IC card 146-3, and determination that this is the case is awaited.

When the purchaser mobile telephone 11-3 and the transfer destination mobile telephone 11-4 are close to each other so that the non-contact IC card 146-4 is positioned within the communication range of the non-contact IC card 146-3, the CPU 161 of the non-contact IC card 146-3 detects the non-contact IC card 146-4 and notifies the main control unit 131 via antenna 170.

When the main control unit 131 of the purchaser mobile telephone 11-3 determines that the transfer destination mobile telephone 11-4 is present within the communication range of short-range wireless communication by the non-contact IC card 146-3 based on information provided by the CPU 161, the main control unit 131 advances the processing to step S236, controls the non-contact IC card 146-3, and makes a request to the transfer destination mobile telephone 11-4 for card identification number information containing the card identification number 351-4 using short-range wireless communication.

The transfer destination mobile telephone 11-4 that has been requested for the card identification number information, as described in the following, provides the requested card identification number information to the purchaser mobile telephone 11-3 using short-range wireless communication.

In step S237, the main control unit 131 of the purchaser mobile telephone 11-3 controls the non-contact IC card 146-3 so as to determine whether or not the card identification number information of the transfer destination has been acquired, and waits until it is determined that acquisition has taken place.

When it is determined that card identification number information for the transfer destination has been acquired, the main control unit 131 advances processing to step S238, and the card identification number information acquired for the transfer destination is provided to the point-of-purchase server 21 via the network 10.

As described in the following, the point-of-purchase server 21 that has acquired the card identification number information of the transfer destination updates the purchasing information 353 using the card identification number 351-4 contained in the acquired card identification number information, generates purchasing information 453 containing the card identification number 351-4, and provides this to the purchaser mobile telephone 11-3 together with the purchasing information rewriting key 361.

In step S239, the main control unit 131 of the purchaser mobile telephone 11-3 determines whether or not the updated purchasing information 453 and purchasing information rewriting key 361 have been acquired, and waits until it is determined that acquisition has taken place.

When it is determined that the updated purchasing information 453 and purchasing information rewriting key 361 have been acquired, the main control unit 131 advances processing to step S241 of FIG. 31, a determination is made as to whether or not the transfer destination mobile telephone 11-4 is within communication range of short-range wireless communication by the non-contact IC card 146-3, and determination that this is the case is awaited.

When it is determined that the transfer destination mobile telephone 11-4 is within communication range, the main control unit 131 advances processing to step S242, controls the non-contact IC card 146-4, and provides the updated purchasing information 453 and purchasing information rewriting key 361 to the transfer destination mobile telephone 11-4 using short-range wireless communication.

As described in the following, the transfer destination mobile telephone 11-4 provided with the purchasing information 453 and the purchasing information rewriting key 361 records the updated purchasing information 453 in the non-contact IC card 146-4 using the acquired purchasing information rewriting key 361. When recording is complete, the purchasing information rewriting key 361 is deleted, and completion of writing is provided to the purchaser mobile telephone 11-3.

In step S243, the main control unit 131 of the purchaser mobile telephone 11-3 controls the non-contact IC card 146-3 so as to determine whether or not notification of completion of writing has been acquired, and waits until it is determined that acquisition has taken place.

When it is determined that notification of completion of writing has been acquired, the main control unit 131 advances processing to step S244 and provides the acquired notification of completion of writing to the point-of-purchase server 21.

The point-of-purchase server 21 that has acquired the notification of completion of writing provides the purchasing information rewriting key 361 to the purchaser mobile telephone 11-3 and requests deletion of the purchasing information 353.

In step S245, the main control unit 131 of the purchaser mobile telephone 11-3 determines whether or not a request for deletion of the purchasing information has been acquired from the point-of-purchase server 21, and waits until it is determined that acquisition has taken place.

When it is determined that a request to delete purchasing information has been acquired, the main control unit 131 advances processing to step S246 and deletes the purchasing information 353 stored in the non-contact IC card 146-3 using the purchasing information rewriting key 361.

When deletion is complete, in step S247, the main control unit 131 provides deletion completion notification to the point-of-purchase server 21, and transfer processing is complete.

Next, transfer processing by the point-of-purchase server 21 executed corresponding to transfer processing by the mobile telephone 11-3 as described above is described with reference to the flowcharts of FIG. 32 and FIG. 33.

In step S261, the CPU 201 of the point-of-purchase server 21 controls the communication unit 224 so as to determine whether or not a transfer permission request has been acquired from the purchaser mobile telephone 11-3, and waits until it is determined that acquisition has taken place.

When it is determined that a transfer permission request has been acquired, the CPU 201 advances the processing to step S262, and a request is made to the purchaser mobile telephone 11-3 for the purchasing information 353 and the card identification number information containing the card identification number 351-3.

In step S233 of FIG. 3, the purchaser mobile telephone 11-3 requested for the purchasing information 363 and the card identification number information then provides the requested purchasing information 353 and card identification number information.

In step S263, the CPU 201 controls the communication unit 224 so as to determine whether or not the purchasing information 353 and card identification number information has been acquired, and waits until it is determined that acquisition has taken place.

When it is determined that the purchasing information 353 and the card identification number information, the CPU 201 advances processing to step S264, purchasing information 353 corresponding to (having the same purchasing identifier as) the acquired purchasing information is retrieved from the storage unit 223, and the purchasing information 353 provided by the purchaser mobile telephone 11-3 and card identification number 351-3 contained in the card identification number information are authenticated using the retrieved purchasing information 353.

In step S65, the CPU 201 determines whether or not the purchasing information 353 and card identification number 351-3 are authenticated.

When it is determined that the individual information 353 is authenticated, the CPU 201 advances processing to step S266, controls the communication unit 224, and makes a request to the purchaser mobile telephone 11-3 for card identification number information containing the card identification number 351-4 of the transfer destination.

In step S238 of FIG. 30, the purchaser mobile telephone 11-3 provides the requested card identification number information of the transfer destination to the point-of-purchase server 21.

In step S267, the CPU 201 controls the communication unit 224 so as to determine whether or not card identification number information of the transfer destination has been acquired, and waits until it is determined that acquisition has taken place.

Figure 33:
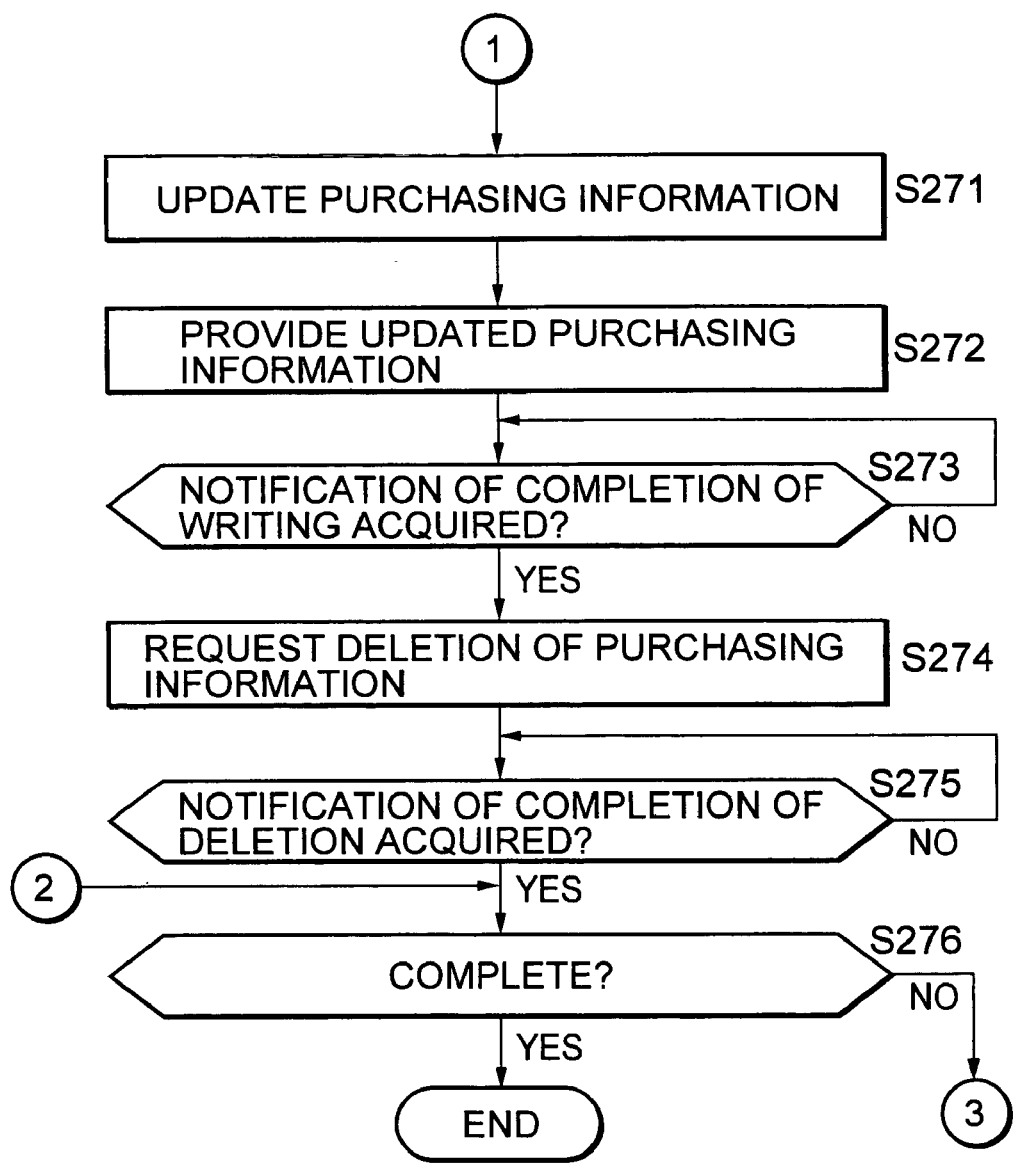
FIG. 33 is a flowchart continuing on from the flowchart of FIG. 32 illustrating handover processing performed by a point-of-purchase server.

When it is determined that card identification number information of the transfer destination has been acquired, the CPU 201 advances processing to step S271 of FIG. 33, and the purchasing information 353 is updated using the card identification number 351-4 contained in the acquired card identification number information of the transfer destination using the purchasing information rewriting key 361. Specifically, the CPU 201 overwrites the transfer destination card identification number (card identification number 351-4) with the identification number of the purchasing card contained in the purchasing information 353 so as to generated updated purchasing information 453.

Then, in step S272, the CPU 201 provides the updated purchasing information 453 to the purchaser mobile telephone 11-3 together with the purchasing information rewriting key 361.

The purchaser mobile telephone 11-3 that has acquired the updated purchasing information 453 and the purchasing information rewriting key 361 then provides the updated purchasing information 453 and the purchasing information rewriting key 361 to the transfer destination mobile telephone 11-4 for recording.

When notification of completion of writing is acquired by the transfer destination mobile telephone 11-4, in step S244 of FIG. 31, the purchaser mobile telephone 11-3 provides the notification of completion of writing.

In step S273, the CPU 201 controls the communication unit 224 so as to determine whether or not notification of completion of writing has been acquired, and waits until it is determined that acquisition has taken place.

When it is determined that notification of completion of writing has been acquired, the CPU 201 advances processing to step S274, the purchasing information rewriting key 361 is provided to the purchaser mobile telephone 11-3, and a request for deletion of the purchasing information 353 is made to the purchaser mobile telephone 11-3.

After the purchasing information 353 is deleted, in step S247 of FIG. 31, the purchaser mobile telephone 11-3 provides deletion completion notification to the point-of-purchase server 21.

In step S275, the CPU 201 controls the communication unit 224 so as to determine whether or not deletion completion notification has been acquired, and waits until it is determined that acquisition has taken place.

When it is determined that deletion completion notification has been acquired, the CPU 201 advances processing to step S276 of FIG. 33.

Figure 32:
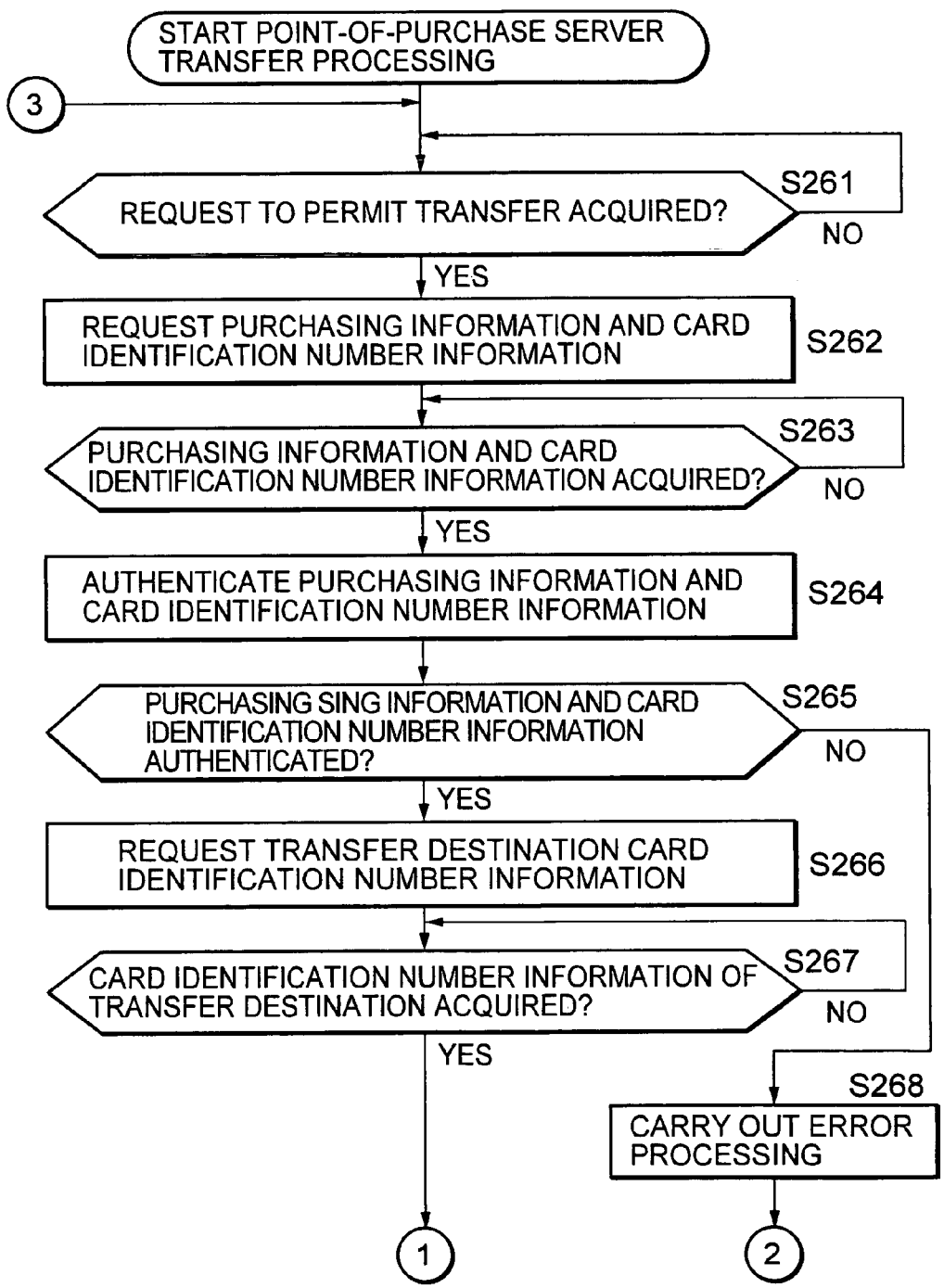
FIG. 32 is a flowchart illustrating handover processing performed by a point-of-purchase server.

When it is determined in step S265 of FIG. 32 that purchasing information is not authenticated, the CPU 201 advances processing to step S268, and processing of step S276 is proceeded to after carrying out prescribed error processing.

In step S276, the CPU 201 determines whether or not the transfer processing is complete. When it is determined not to be complete, the CPU 201 returns processing to step S261 of FIG. 32, and the process from there onwards is repeated.

Further, when completion of the transfer processing is determined in step S276, the CPU 201 ends transfer processing.

Figure 34:
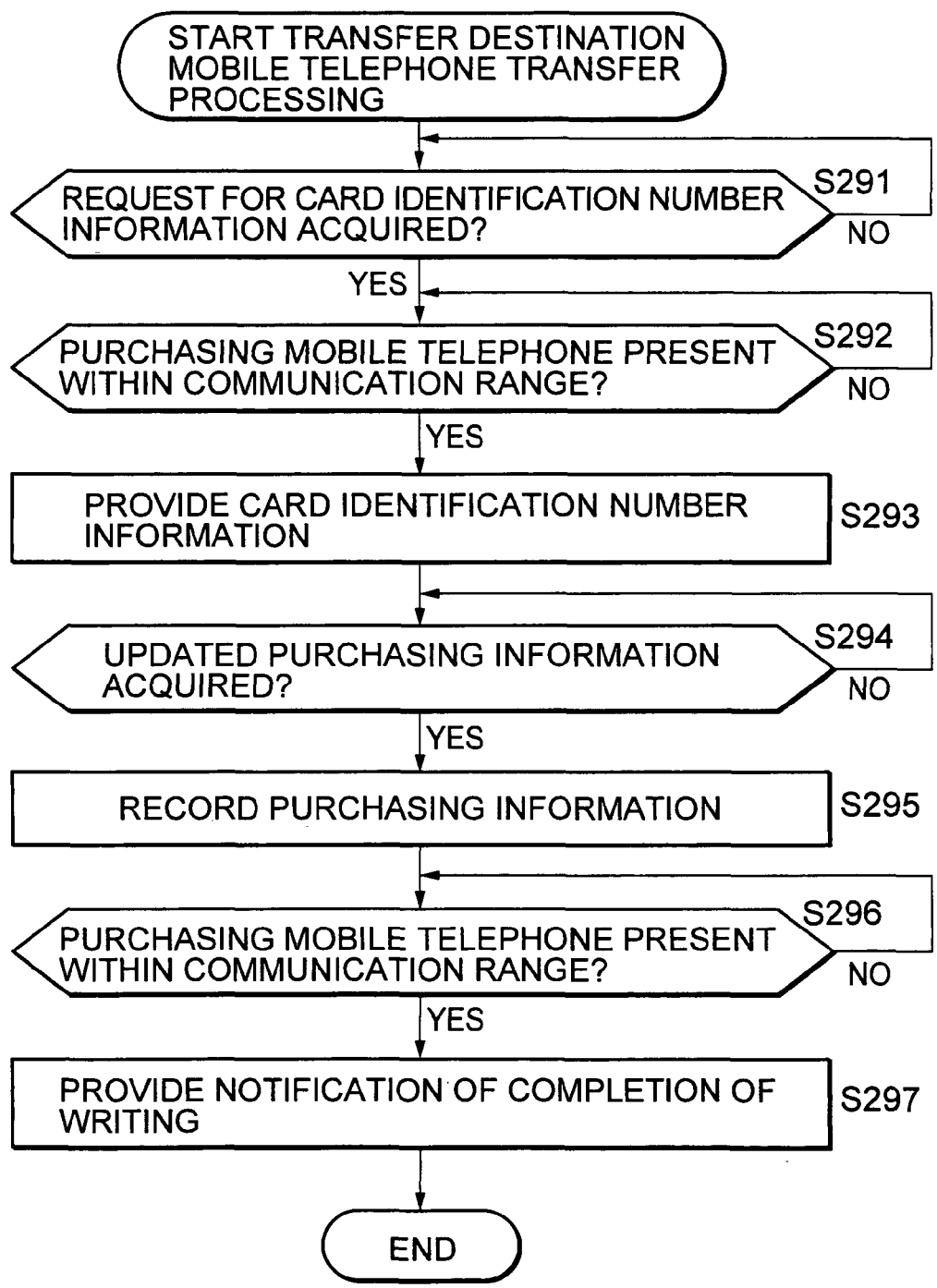
FIG. 34 is a flowchart illustrating handover processing by a purchasing mobile telephone.

Next, a description is given with reference to the flowchart of FIG. 34 of transfer processing by the purchaser mobile telephone 11-3 and transfer processing by the transfer destination mobile telephone 11-4 executed to correspond to the transfer processing by the point-of-purchase server 21.

First, in step S291, the main control unit 131 of the transfer destination mobile telephone 11-4 controls the non-contact IC card 146-4 so that, as a result of the processing of step S236 of FIG. 30, a determination is made as to whether or not a request for card identification number information has been acquired from the purchaser mobile telephone 11-3, with a determination this has been acquired then being awaited.

When it is determined that a request for the card identification number information has been acquired, the main control unit 131 advances processing to step S292, controls the non-contact IC card 146-4, makes a determination as to whether or not the purchaser mobile telephone 11-3 is within communication range of short-range wireless communication by the non-contact IC card 146-4, and awaits a determination that this is the case.

When the purchaser mobile telephone 11-3 and the transfer destination mobile telephone 11-4 are close to each other so that the non-contact IC card 146-3 is positioned within the communication range of the non-contact IC card 146-4, the CPU 161 of the non-contact IC card 146-4 detects the non-contact IC card 146-3 and notifies the main control unit 131 via the antenna 170.

When it is determined that the purchaser mobile telephone 11-3 is within communication range based on information provided by the CPU 161, the main control unit 131 of the transfer destination mobile telephone 11-4 advances processing to step S293, and card identification number information containing the requested card identification number 351-4 is provided to the purchaser mobile telephone 11-3 using short-range wireless communication by the non-contact IC card 146-4.

In step S242 of FIG. 31, the purchaser mobile telephone 11-3 provides the updated purchasing information 453 and purchasing information rewriting key 361 provided by the point-of-purchase server 21 to the transfer destination mobile telephone 11-4.

In step S294, the main control unit 131 of the transfer destination mobile telephone 11-4 determines whether or not the purchasing information 453 updated by the purchaser mobile telephone 11-3 and purchasing information rewriting key 361 have been acquired, and waits until it is determined that acquisition has taken place.

When it is determined that the updated purchasing information 453 and the purchasing information rewriting key 361 have been acquired, the main control unit 131 advances the processing to step S295 and records the updated purchasing information 453 using the acquired purchasing information rewriting key 361.

The main control unit 131 advances the processing to step S296, controls the non-contact IC card 146-4, makes a determination as to whether or not the purchaser mobile telephone 11-3 is within communication range of short-range wireless communication by the non-contact IC card 146-4, and awaits a determination that this is the case.

When it is determined that the purchaser mobile telephone 11-3 is within communication range, the main control unit 131 advances processing to step S287, provides notification of completion of writing to the purchaser mobile telephone 11-3 after deleting the purchasing information rewriting key 361, and ends transfer processing.

As described in the above, it is possible to transfer purchasing information from the purchaser mobile telephone 11-3 to the transfer destination mobile telephone 11-4 by having the point-of-purchase server 21 permit transfer.

In the above, a description is given where the point-of-receipt server 31 of the point of receipt 30 holds the purchasing information rewriting key 361, with the purchasing information 353 stored in the non-contact IC card 146 being deleted after delivery of the merchandise. However, the present invention is by no means limited in this respect, and this electronic commercial transaction system may be simplified by not having the point-of-receipt server 31 delete the purchasing information.

FIG. 35A to FIG. 35D are views showing examples of data held in the mobile telephone 11, point-of-purchase server 21, point-of-receipt server 31, and authentication server 41 respectively in a state before the user of the mobile telephone 11 of FIG. 1 purchases merchandise.

Figure 35B:
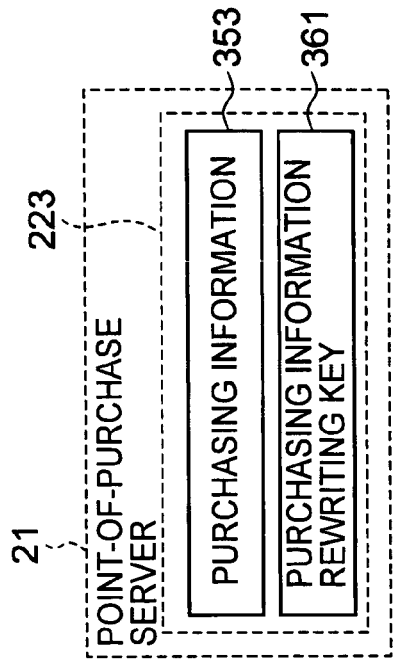
FIG. 35B is a view showing another example of data held by the point-of-purchase server of FIG. 1.
Figure 35D:
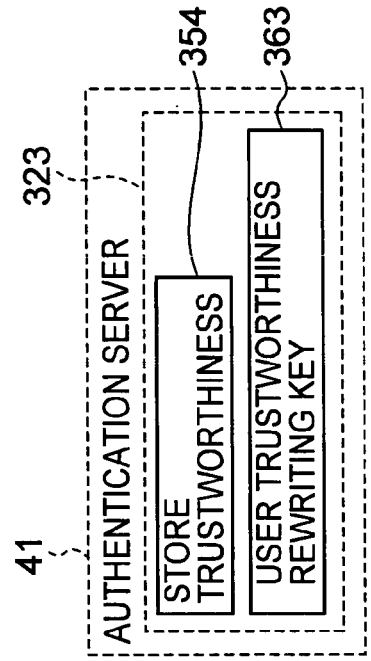
FIG. 35D is a view showing a still further example of data held by the authentication server of FIG. 1.
Figure 35A:
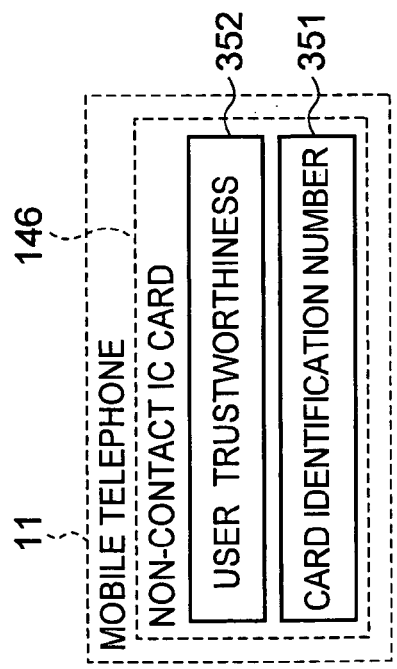
FIG. 35A is a view showing a further example of data held by the mobile telephone of FIG. 1.

Comparing with the case of FIG. 11A to FIG. 11D, the mobile telephone 11 shown in FIG. 35A is the same as the mobile telephone 11 of FIG. 11A, a rewriting key is not held, and the point-of-purchase server 21 of FIG. 35B is the same as the point-of-purchase server 21 of FIG. 11B, and a purchasing information rewriting key 361 is held.

Figure 35C:
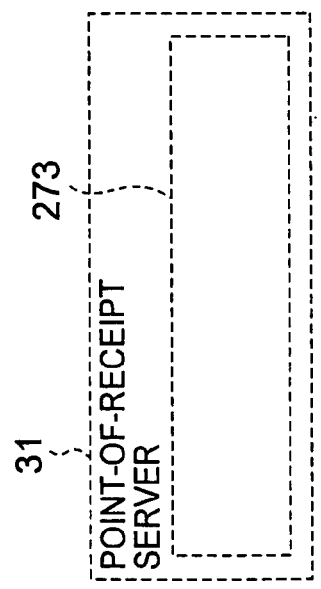
FIG. 35C is a view showing a further example of data held by the point-of-receipt server of FIG. 1.

The point-of-receipt server 31 of FIG. 35C is different from the case of FIG. 11C in that the purchasing information rewriting key 361 is not held. In this case, as described in the following, the temporary commercial transaction information 391 is also not used and the point-of-receipt server 31 also does not hold the temporary commercial transaction information rewriting key 362.

Similarly, the authentication server 41 of FIG. 35D holds the user trustworthiness rewriting key 363 but differs from the case in FIG. 11D in that a temporary commercial transaction information rewriting key 362 is not held.

Next, a description is given of a further example of the flow of processing of the mobile telephone 11, point-of-purchase server 21 and authentication server 41 relating to the sale of merchandise in the electronic commercial transaction system of FIG. 1, as shown in FIG. 36.

In the case of FIG. 36 also, the flow of processing relating to the sale of merchandise is substantially the same as for the case shown in FIG. 12.

Namely, the mobile telephone 11 acquires store trustworthiness of the point-of-purchase 20 from the authentication server 41 (arrow 481 and arrow 482) and an order for the merchandise is placed with the point-of-purchase server 21 (arrow 483) after confirming whether or not the point-of-purchase 20 can be trusted. The user trustworthiness 352 is then supplied to the point-of-purchase server 21 based on this request (arrow 484 and arrow 485), the card identification number 351 is provided to the point-of-purchase server 21 (arrow 486 and arrow 487), and purchasing information 353 corresponding to the commercial transaction for this time is acquired (arrow 488).

However, after this, differing from the case of FIG. 12, the point-of-purchase server 21 provides the purchasing information rewriting key 361 to the mobile telephone 11 an instructs the deletion of the purchasing information 353 (old purchasing information 353 that is no longer of use) corresponding to the previous commercial transaction (arrow 489).

The mobile telephone 11 then deletes the purchasing information 353 corresponding to the previous commercial transaction based on this instruction, and provides deletion completion notification to the point-of-purchase server 21 (arrow 490). The point-of-purchase server 21 receives this, provides notification of completion of processing to the mobile telephone 11 (arrow 491) and completes processing related to sales.

Figure 37:
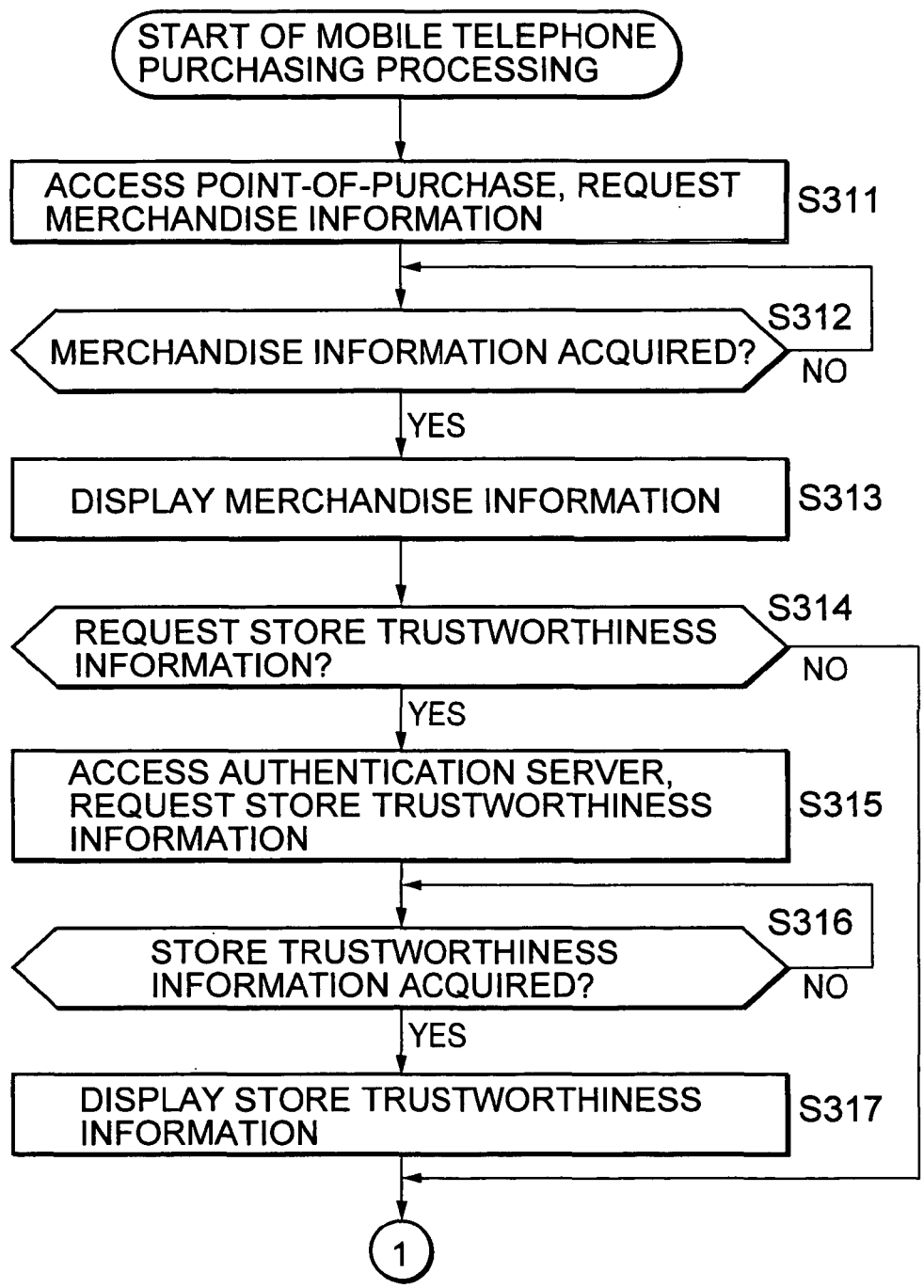
FIG. 37 is a flowchart illustrating purchasing processing by a mobile telephone.
Figure 38:
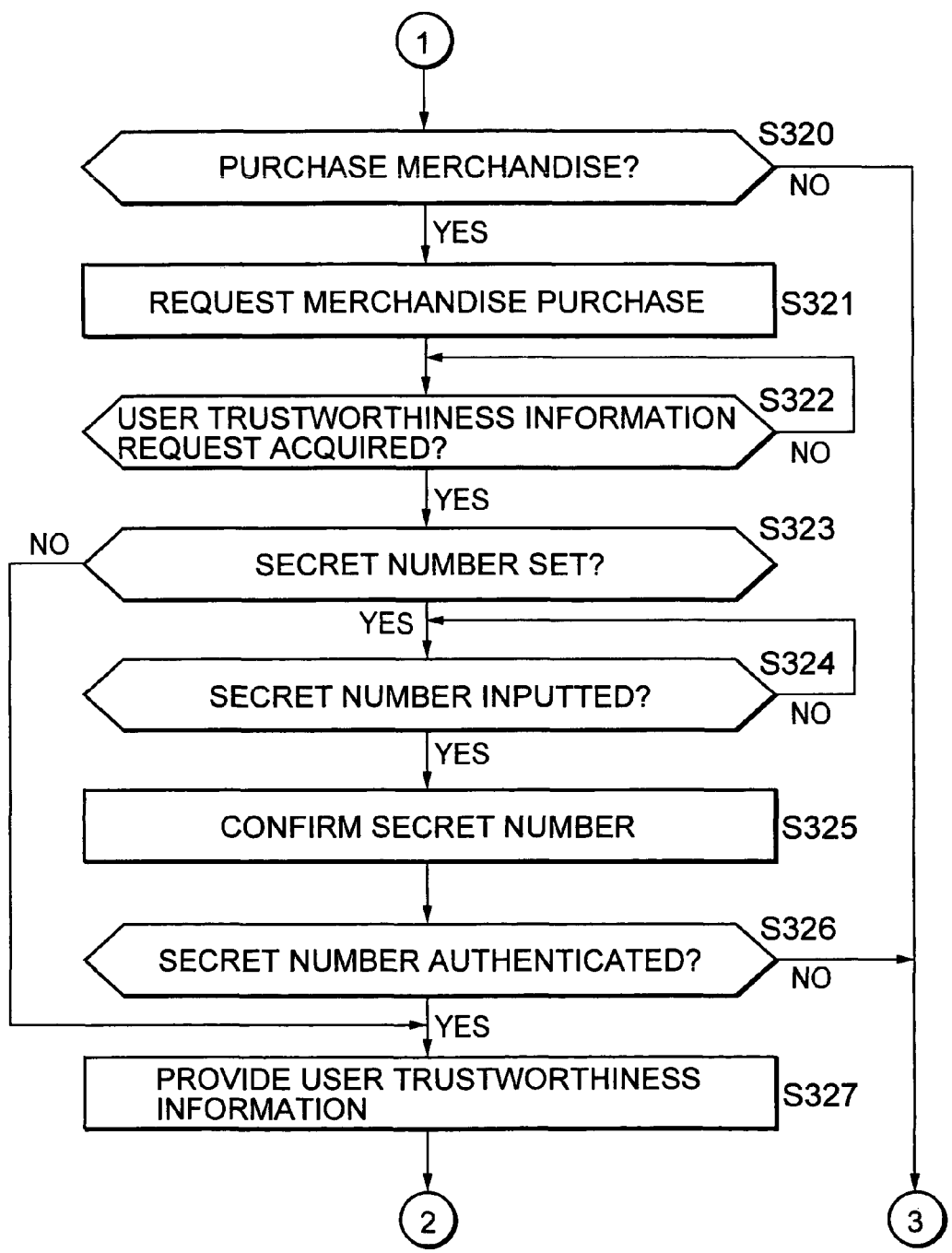
FIG. 38 is a flowchart continuing on from the flowchart of FIG. 37 illustrating purchasing processing by a mobile telephone.
Figure 39:
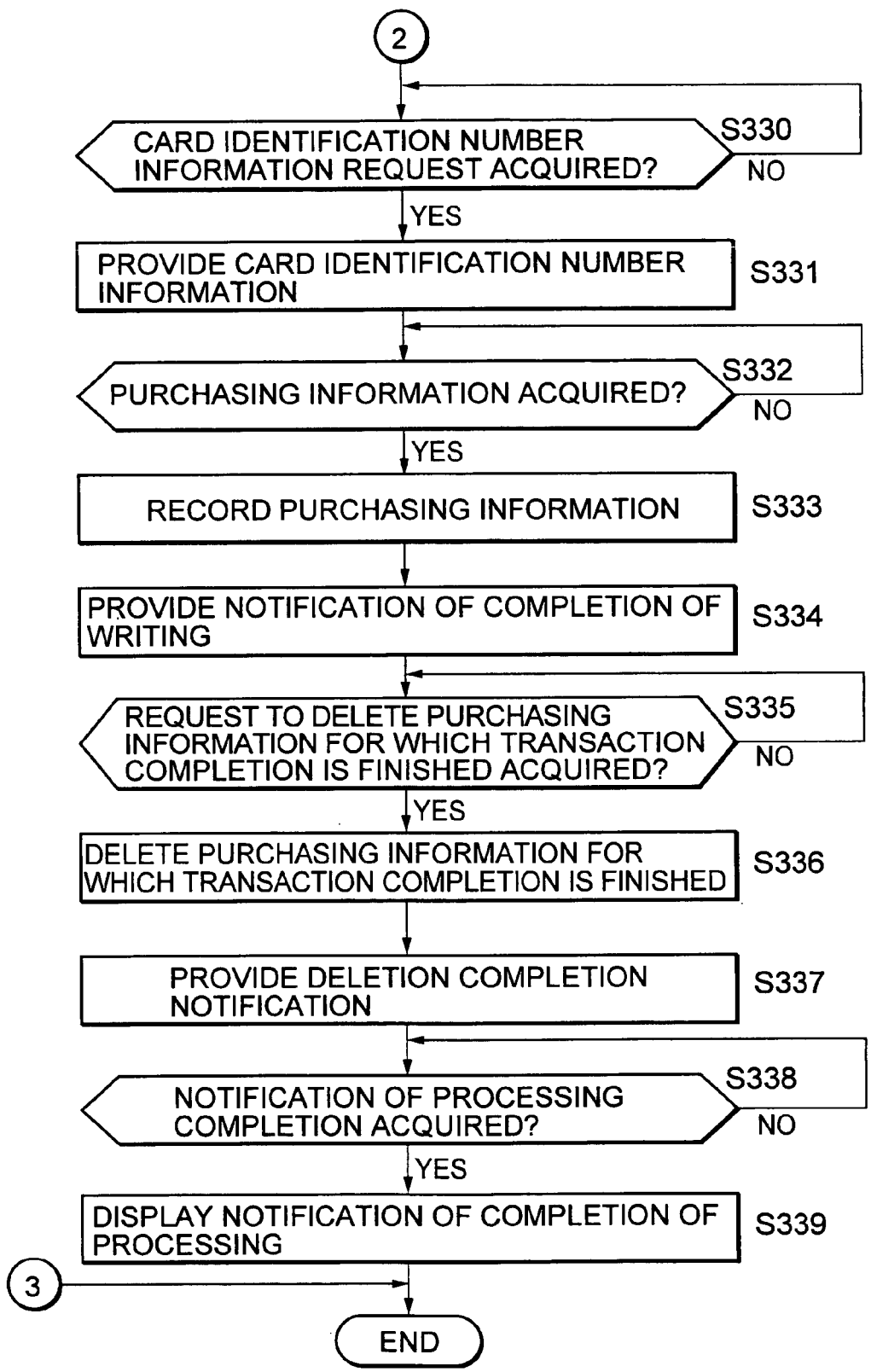
FIG. 39 is a flowchart continuing on from the flowchart of FIG. 38 illustrating purchasing processing by a mobile telephone.

The following is a description with reference to the flowcharts of FIG. 37 to FIG. 39 of purchasing processing of the mobile telephone 11. A description is now given corresponding to the flowcharts FIG. 13 and FIG. 14 as necessary.

The processing from step S311 of FIG. 37 to step S334 of FIG. 39 by the main control unit 131 of the mobile telephone 11 corresponds to the processing of step S1 of FIG. 13 to step S29 of FIG. 14, is the same processing, and is therefore omitted from this description.

Namely, in step S311 to step S313 of FIG. 37, the main control unit 131 acquires purchasing information from the point-of-purchase server 21 and displays this at the liquid crystal display 115, and acquires store trustworthiness information for displaying at the store trustworthiness information in step S314 to step S317.

In step S320 and step S321 of FIG. 38, the main control unit 131 determines whether or not to purchase merchandise. In step S322 to step S327, requested user trustworthiness information is provided. In step S330 and step S331 of FIG. 39, the requested card identification number information is provided. In step S332 to step S334, the provided purchasing information is recorded, and notification of completion of writing is provided to the point-of-purchase server 21.

As described in the following, the point-of-purchase server 21 that has acquired the notification of completion of writing provides the purchasing information rewriting key 361 to the mobile telephone 11, and a request is made for purchasing information for which commercial transaction completion is finished is made.

In step S335, the main control unit 131 of the mobile telephone 11 determines whether or not a request for deletion of purchasing information for which commercial transaction completion is finished has been acquired from the point-of-purchase server 21, and waits until it is determined that acquisition has taken place.

When it is determined that a request to delete the purchasing information rewriting key 361 and purchasing information for which commercial transaction completion is finished has been acquired, the main control unit 131 advances the processing to step S336, and purchasing information 353 stored in the non-contact IC card 146 for which commercial transactions have already been completed is deleted using the acquired purchasing information rewriting key 361.

When deletion is complete, in step S337, the main control unit 131 deletes the purchasing information rewriting key 361 and deletion completion notification is provided to the point-of-purchase server 21.

In step S338, as in the case of step S30 of FIG. 14, the main control unit 131 determines whether or not notification of completion of processing provided by the point-of-purchase server 21 has been acquired, and waits until it is determined that acquisition has taken place.

When it is determined that notification of completion of processing has been acquired, in step S339, as in the case of step S31 of FIG. 14, the main control unit 131 controls the LCD control unit 136, the acquired notification of completion of processing is displayed at the liquid crystal display 115, and purchasing processing is complete.

The authentication server 41 executes store trustworthiness information providing processing corresponding with the purchasing processing by the mobile telephone 11 described above. However, this processing is the same as the case described with reference to the flowchart of FIG. 15, and its description is therefore omitted.

Next, purchasing processing by the mobile telephone 11 described above and sales processing by the point-of-purchase server 21 executed so as to correspond to the store trustworthiness information providing processing by the authentication server 41 is described with reference to the flowcharts of FIG. 40 and FIG. 41. A description is now given corresponding to the flowcharts FIG. 16 and FIG. 17 as necessary.

Figure 40:
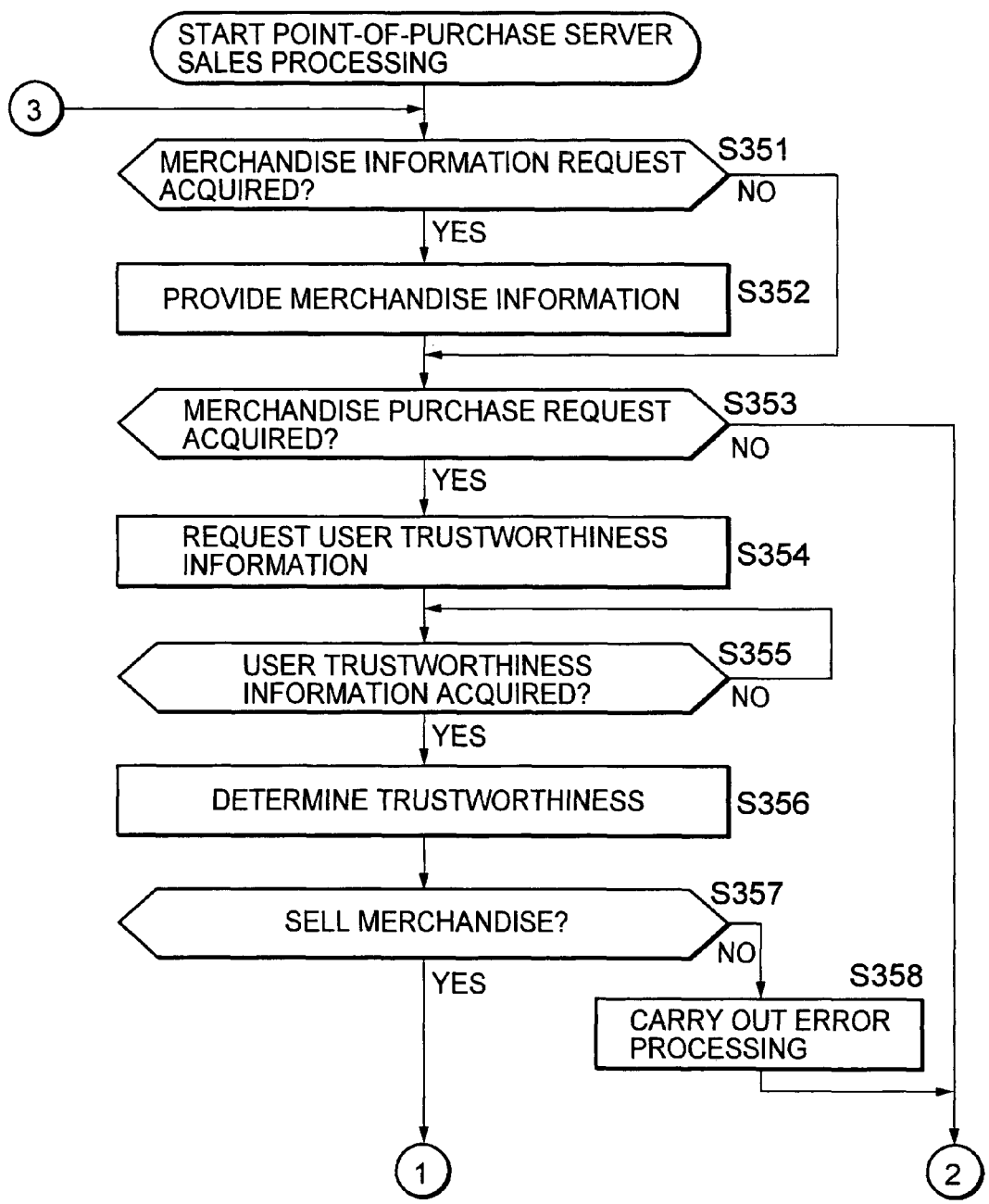
FIG. 40 is a flowchart illustrating sales processing performed by a point-of-purchase server.
Figure 41:
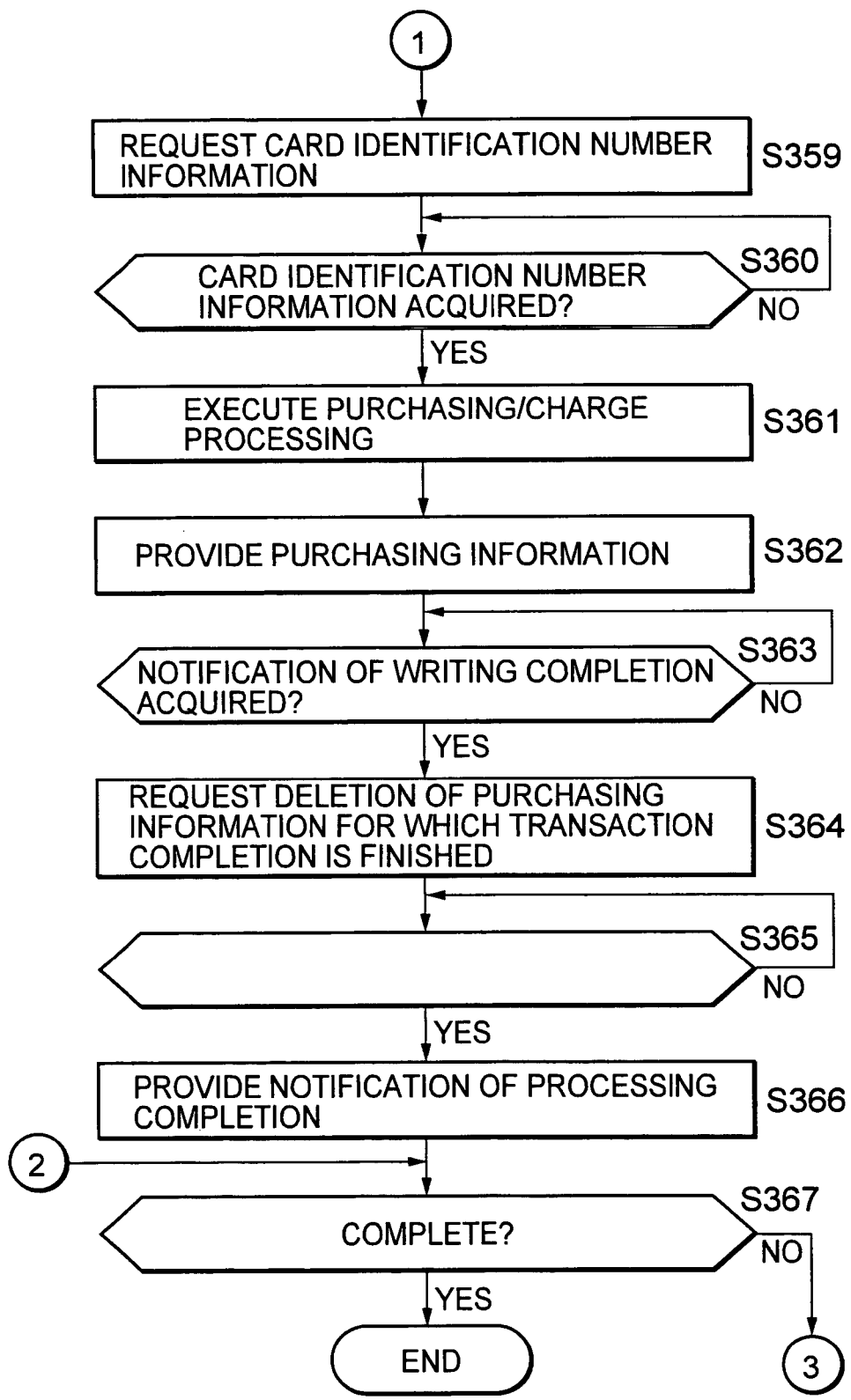
FIG. 41 is a flowchart continuing on from the flowchart of FIG. 40, and is a flowchart illustrating sales processing performed by a point-of-purchase server.

The processing from step S351 of FIG. 40 to step S363 of FIG. 41 by the CPU 201 of the point-of-purchase server 21 corresponds to the processing of step S61 of FIG. 16 to step S75 of FIG. 17, is the same processing, and is therefore omitted from this description.

Namely, in step S351 and step S352 of FIG. 40, the CPU 201 provides merchandise information based on a request. In step S353, it is determined whether or not a request to purchase merchandise is acquired. In step S354 and step S355, user trustworthiness information is acquired from the mobile telephone 11. In step S356, trustworthiness is determined, and in step S357, a determination is made as to whether or not merchandise is sold.

When merchandise is not sold, in step S358, the CPU 201 carries out error processing. When merchandise is sold, in step S359 and step S360 of FIG. 41, card identification number information is acquired from the mobile telephone 11. After purchasing/charging processing is carried out in step S361, purchasing information is generated in step S362 and is provided to the mobile telephone 11.

Next, in step S363, the CPU 201 controls the communication unit 224 so as to determine whether or not notification of completion of writing has been acquired, and waits until it is determined that acquisition has taken place.

When it is determined that notification of completion of writing has been acquired, the CPU 201 advances processing to step S364, controls the communication unit 224, provides the purchasing information rewriting key 361 to the purchaser mobile telephone 11, and makes a request for deletion of purchasing information for which commercial transaction completion is finished to the purchaser mobile telephone 11.

As shown in step S336 of FIG. 39, the main control unit 131 of the mobile telephone 11 that has acquired the request for deletion of purchasing information for which commercial transaction completion is finished deletes purchasing information for completed commercial transaction. When deletion is complete, in step S337, deletion completion notification is provided to the point-of-purchase server 21.

In step S365, the CPU 201 of the point-of-purchase server 21 controls the communication unit 224 so as to determine whether or not deletion completion notification has been acquired, and waits until it is determined that acquisition has taken place.

When it is determined that deletion completion notification has been acquired, the CPU 201 advances processing to step S366, and as in the case of step S76 of FIG. 17, controls the communication unit 224, and provides notification of completion of processing to the mobile telephone 11.

Next, in step S367, as in the case of step S77 of FIG. 17, the CPU 201 determines whether or not sales processing is finished. When it is determined that the processing is not finished, the processing of step S351 of FIG. 40 is returned to and processing from there onwards is repeated.

Further, when it is determined that the sales processing has finished, the CPU 201 ends the sales processing.

In the above, processing relating to purchasing and sale of merchandise is carried out.

Figure 42:
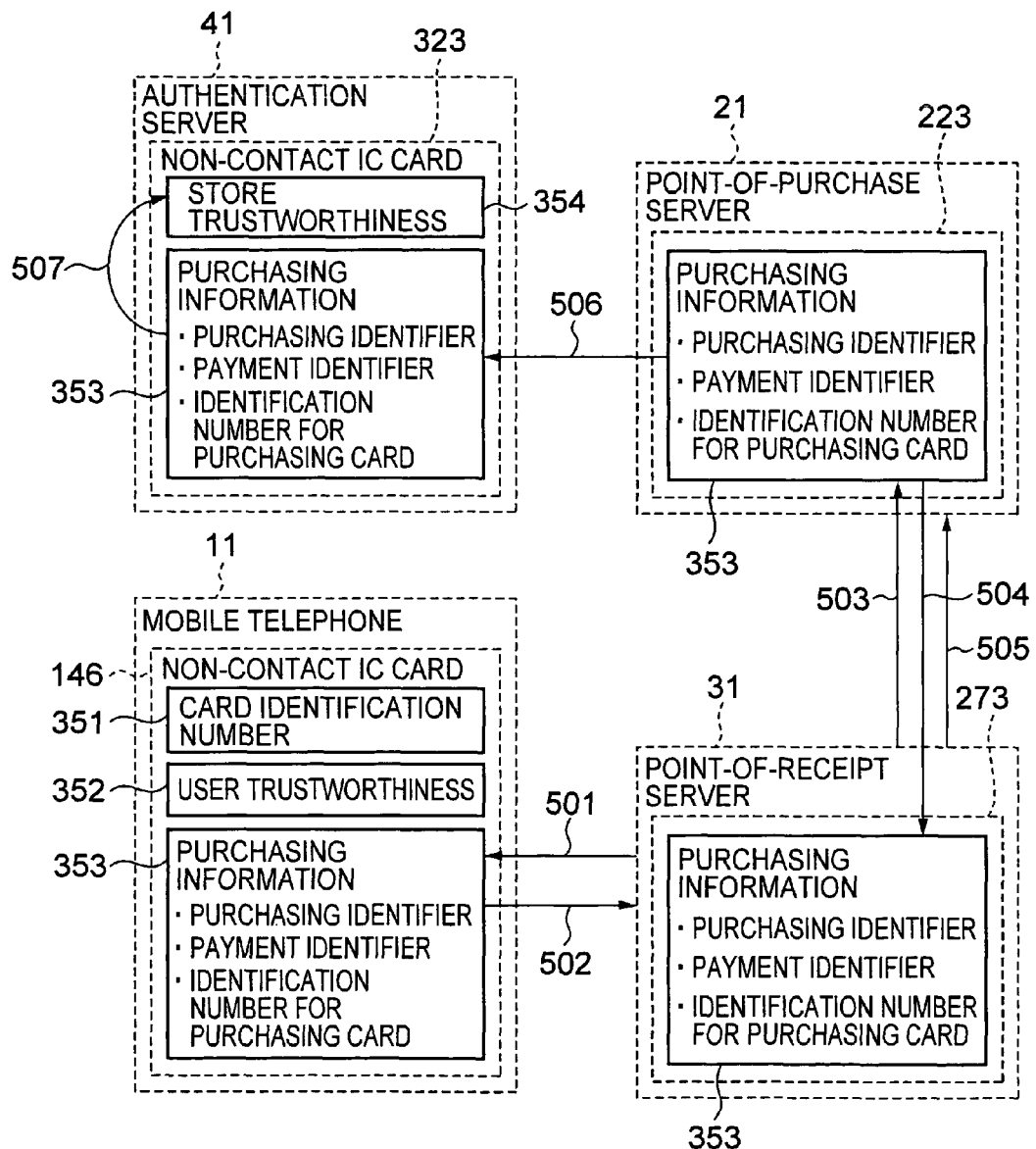
FIG. 42 is a view showing another of a process flow relating to handing over of merchandise.

Next, as shown in FIG. 42, a description is given corresponding to the case of FIG. 18 of the flow of processing occurring at the mobile telephone 11, point-of-purchase server 21, point-of-receipt server 31 and authentication server 41 executed while delivering the merchandise.

In the case in FIG. 42, as in the case in FIG. 18, when the non-contact IC card 146 is positioned with communication range of short-range wireless communication of the IC card reader/writer 275, the point-of-receipt server 31 the mobile telephone 11 is in the proximity of makes a request to (arrow 501) and acquires from (arrow 502) the mobile telephone 11 purchasing information 353 and the card identification number 351.

A request is then made to the point-of-purchase server 21 for purchasing information 353 corresponding to the acquired purchasing information 353 (arrow 503), and this is acquired (arrow 504). The purchasing information 353 and card identification number 351 acquired from the mobile telephone 11 are then authenticated using the purchasing information 353 acquired from the point-of-purchase server 21 and notification of completion of processing is provided to the point-of-purchase server 21 (arrow 505).

When notification of completion of processing is provided to the point-of-purchase server 21, the processing is completed without the point-of-receipt server 31 instructing the mobile telephone 11 to delete the purchasing information 353 or providing the temporary commercial transaction information 391 as in the case in FIG. 18.

Differing from the case of FIG. 18, when notification of completion of processing is acquired, the point-of-purchase server 21 provides purchasing information 353 to the authentication server 41. When the purchasing information 353 is acquired, the authentication server 41 updates the store trustworthiness information 354 based on this purchasing information 353.

Figure 43:
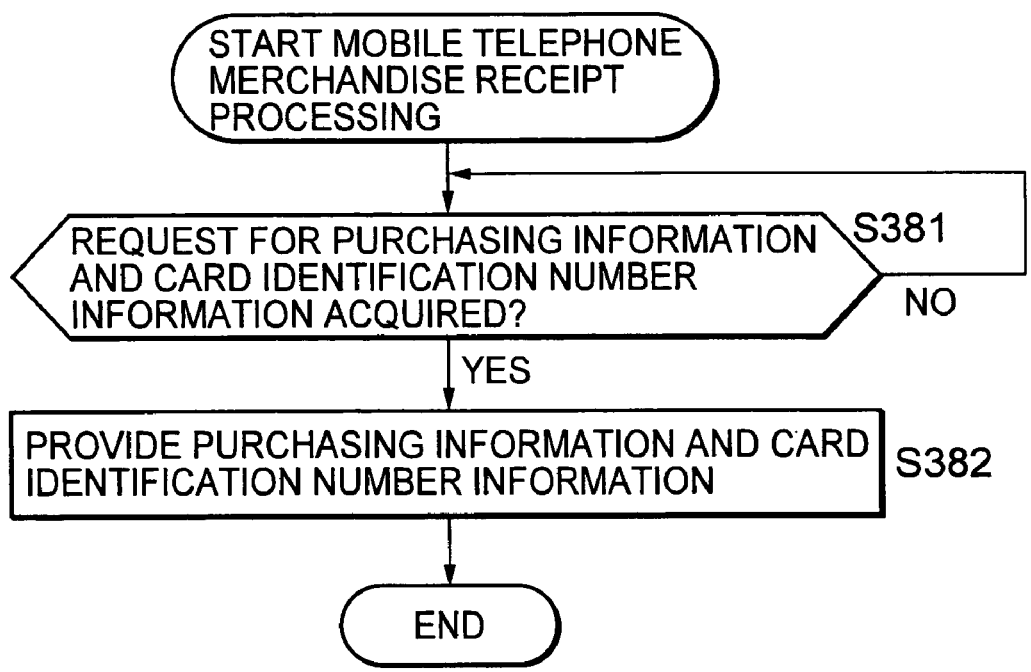
FIG. 43 is a flowchart illustrating merchandise receipt processing carried out by a mobile telephone.

A description is now given with reference to the flowchart of FIG. 43 of merchandise receipt processing performed by the mobile telephone 11 executed while handing over merchandise as described above. A description is now given corresponding to the flowchart FIG. 19 as necessary.

The processing of step S381 and step 382 of FIG. 43 by the main control unit 131 of the mobile telephone 11 corresponds to the processing of step S91 and step S92 of FIG. 19, is the same processing, and is therefore omitted from this description.

Namely, in step S381, the main control unit 131 of the mobile telephone 11 controls the non-contact IC card 146 so as to determine whether or not a request for card identification number information containing the purchasing information 353 and card identification number 351 has been acquired from the point-of-receipt server 31, and waits until it is determined that acquisition has taken place.

When it is determined that a request for the purchasing information 353 and the card identification number information has been acquired, in step S 382, the main control unit 131 controls the non-contact IC card 146, and provides card identification number information containing the purchasing information 353, and card identification number 351 to the point-of-receipt server 31.

When the purchasing information 353 and the card identification number information are provided to the point-of-receipt server 31, differently from the case of FIG. 19, the main control unit 131 ends merchandise receipt processing.

Figure 44:
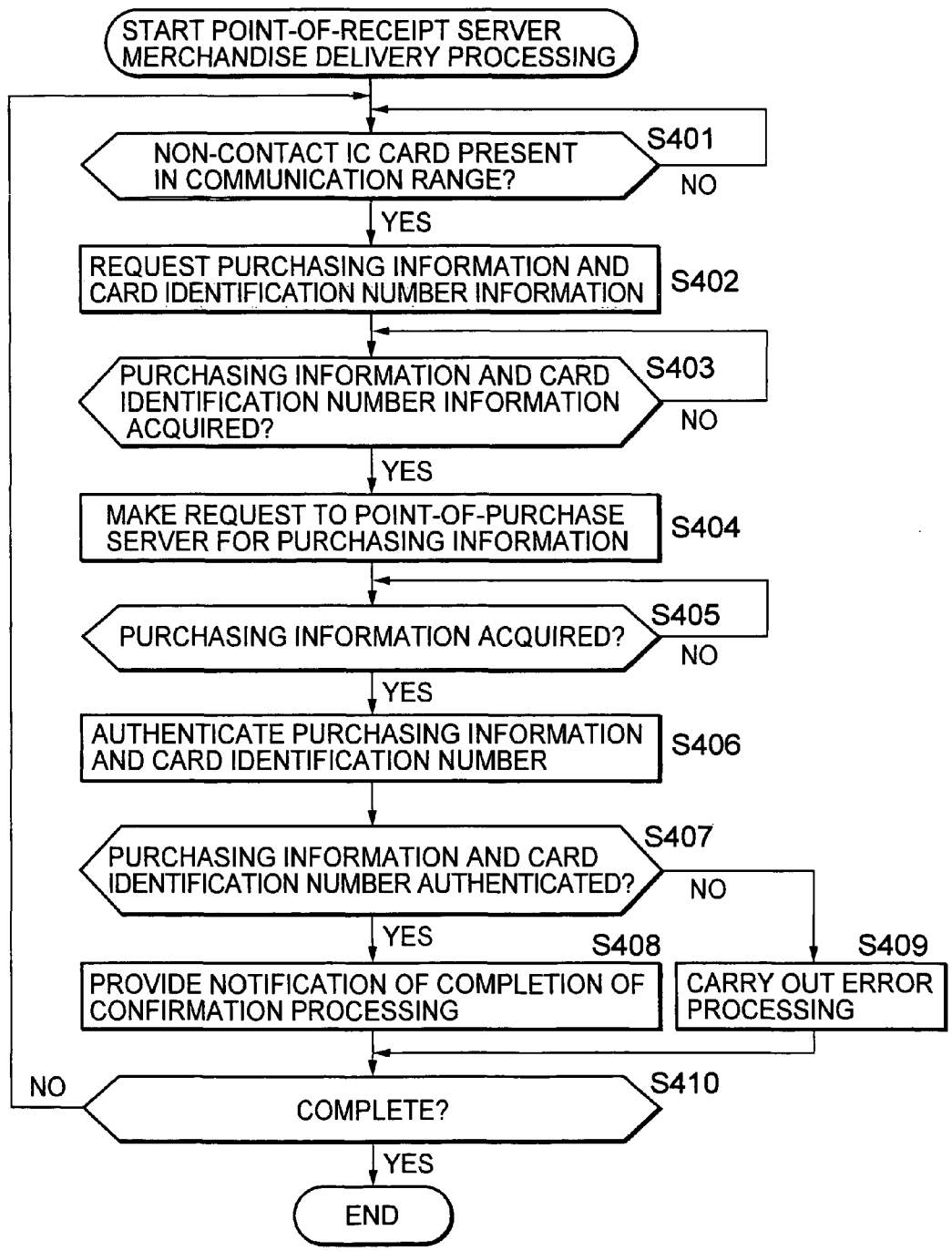
FIG. 44 is a flowchart illustrating merchandise delivery processing carried out by the point-of-receipt server.

Next, a description is given with reference to the flowchart of FIG. 44 of merchandise delivery processing performed by the point-of-receipt server executed so as to correspond with the merchandise receipt processing of the mobile telephone 11. A description is now given corresponding to the flowcharts FIG. 20 and FIG. 21 as necessary.

The processing from step S401 to step S409 of FIG. 44 by the CPU 251 of the point-of-receipt server 31 corresponds to the processing of step S111 to step S120 of FIG. 20, is the same processing, and is therefore omitted from this description.

Namely, in step S401 to step S403 of FIG. 44, the CPU 251 makes a request to and acquires from the mobile telephone 11 the purchasing information 353 and the card identification number information. In the processing of step S404 and step S405, purchasing information corresponding to (having the same purchasing identifier as) the purchasing information 353 acquired from the mobile telephone 11 is requested from the point-of-purchase server 21 and is acquired.

In step S406 and step S407, the CPU 251 carries out authentication processing. In the case of authentication, the processing advances to step S408, notification of completion of processing is provided to the point-of-purchase server 21 and the processing advances to step S410. When there is no authentication, processing advances to step S409, error processing is carried out, and processing advances to step S410.

In step S410, as in the case of step S134 of FIG. 21, the CPU 251 of the point-of-receipt server 31 determines whether or not merchandise delivery processing is complete. When it is determined not to be complete, the CPU 251 returns processing to step S401, and the process from there onwards is repeated. Further, when it is determined that the processing is complete, the CPU 251 ends the merchandise delivery processing.

Figure 45:
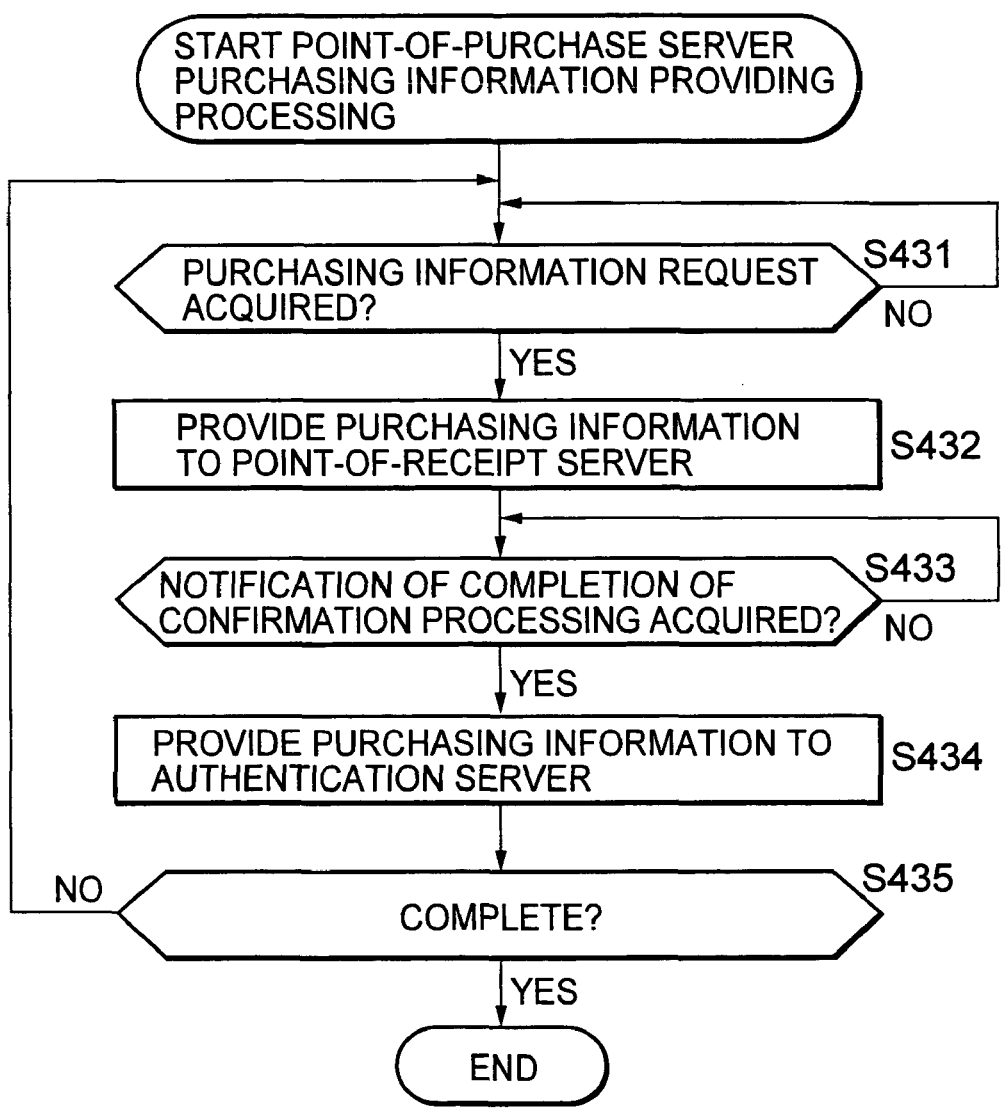
FIG. 45 is a flowchart illustrating processing for providing purchasing information performed by the point-of-purchase server.

The following is a description with reference to the flowchart of FIG. 45 of purchasing information providing processing performed by the point-of-purchase server 21. A description is now given corresponding to the flowchart FIG. 22 as necessary.

Figure 22:
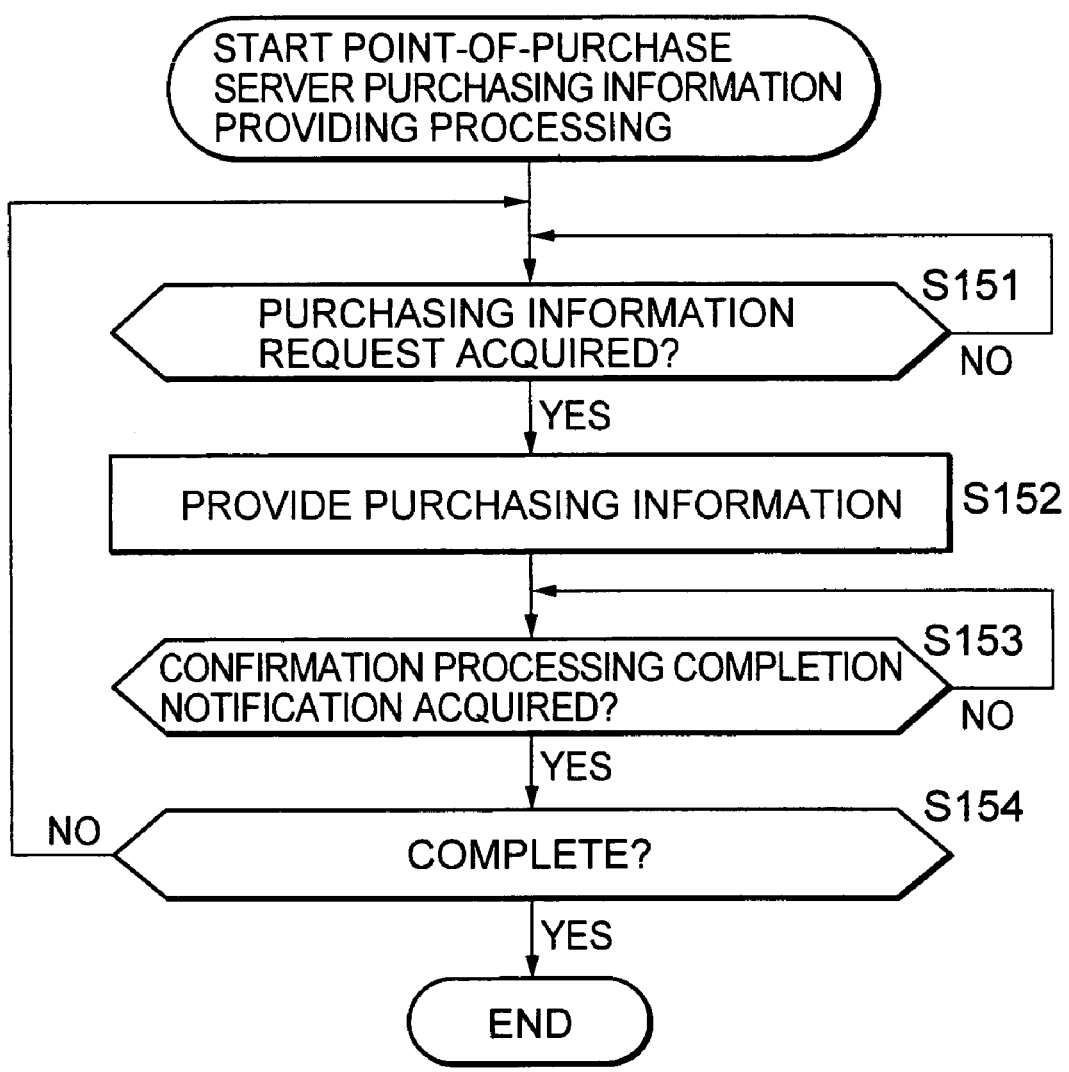
FIG. 22 is a flowchart illustrating processing for providing purchasing information performed by the point-of-purchase server.

The processing from step S431 to step S433 of FIG. 45 by the point-of-purchase server 21 corresponds to the processing of step S151 to step S153 of FIG. 22, is the same processing, and is therefore omitted from this description.

Namely, in step S431, the CPU 201 of the point-of-purchase server 21 determines whether or not a request for the purchasing information 353 is acquired from the point-of-receipt server 31 and awaits determination that this is the case. When this is determined to be acquired, processing advances to step S432, and the requested purchasing information is supplied to the point-of-receipt server 31.

In step S433, the CPU 201 determines whether or not notification of completion of confirmation processing has been acquired from the point-of-receipt server 31, and waits until it is determined that acquisition has taken place.

When it is determined that notification of completion of confirmation processing is acquired, the CPU 201 advances processing to step S434, controls the communication unit 224, and provides the same purchasing information 353 as is provided to the point-of-receipt server 31 to the authentication server 41.

In step S435, the CPU 201 determines whether or not purchasing information providing processing is finished. When it is determined that the processing is not finished, processing returns to step S431 and processing from there onwards is repeated.

Further, when it is determined that the processing has finished, the CPU 201 ends the purchasing information providing processing.

Figure 46:
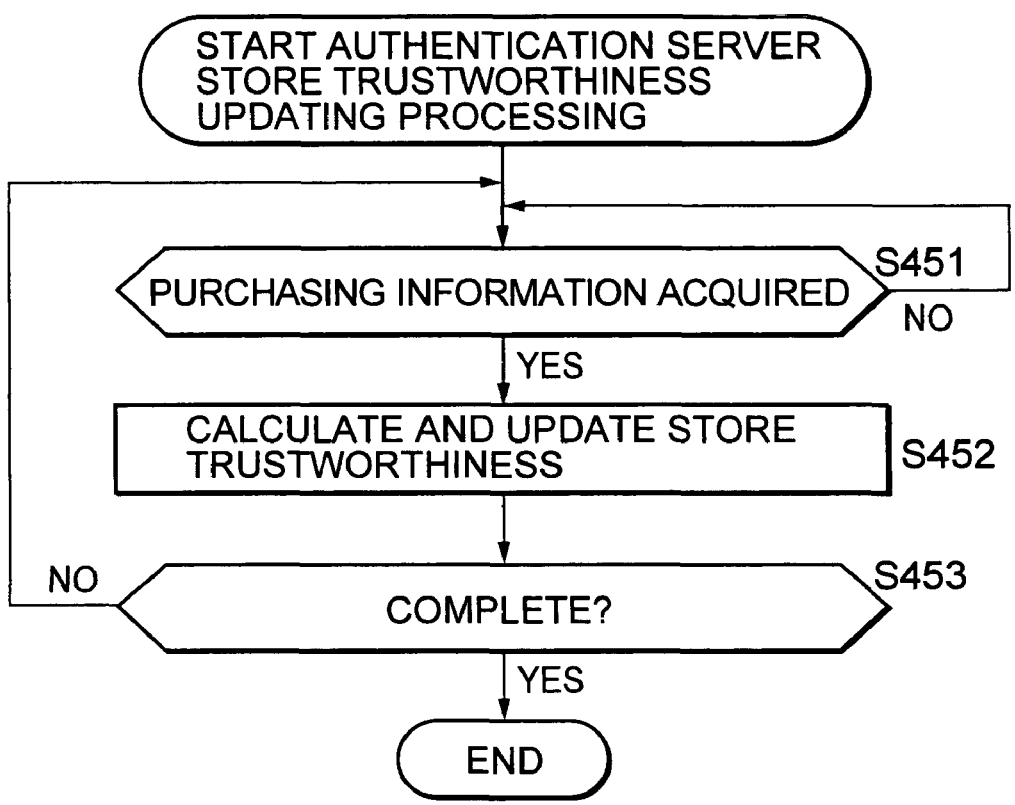
FIG. 46 is a flowchart illustrating processing for updating store trustworthiness in information providing performed by the authentication server.

Store trustworthiness update processing performed by the authentication server 41 executed so as to correspond to purchasing information providing processing performed by the point-of-purchase server 21 described above is described with reference to the flowchart of FIG. 46.

First, in step S451, the CPU 311 of the authentication server 41 controls the communication unit 324, a determination is made as to whether or not purchasing information 353 provided by the point-of-purchase server 31 via the network 10 has been acquired, and a determination that this has been acquired is awaited.

When it is determined that the purchasing information 353 has been acquired, the CPU 311 advances processing to step S452, calculates the extent of change in store trustworthiness 354 for this time based on the acquired purchasing information 353, and updates the store trustworthiness 354 stored in the storage unit 323.

The CPU 311 for which the store trustworthiness 354 has been updated the advances the processing to step S453 and determines whether or not processing is complete. When processing is determined not to be complete, step S451 is returned to, and processing from there onwards is repeated. Further, when it is determined that the processing is complete, the CPU 311 ends the store trustworthiness update processing.

In the above, processing relating to handing over of merchandise is carried out.

Figure 47:
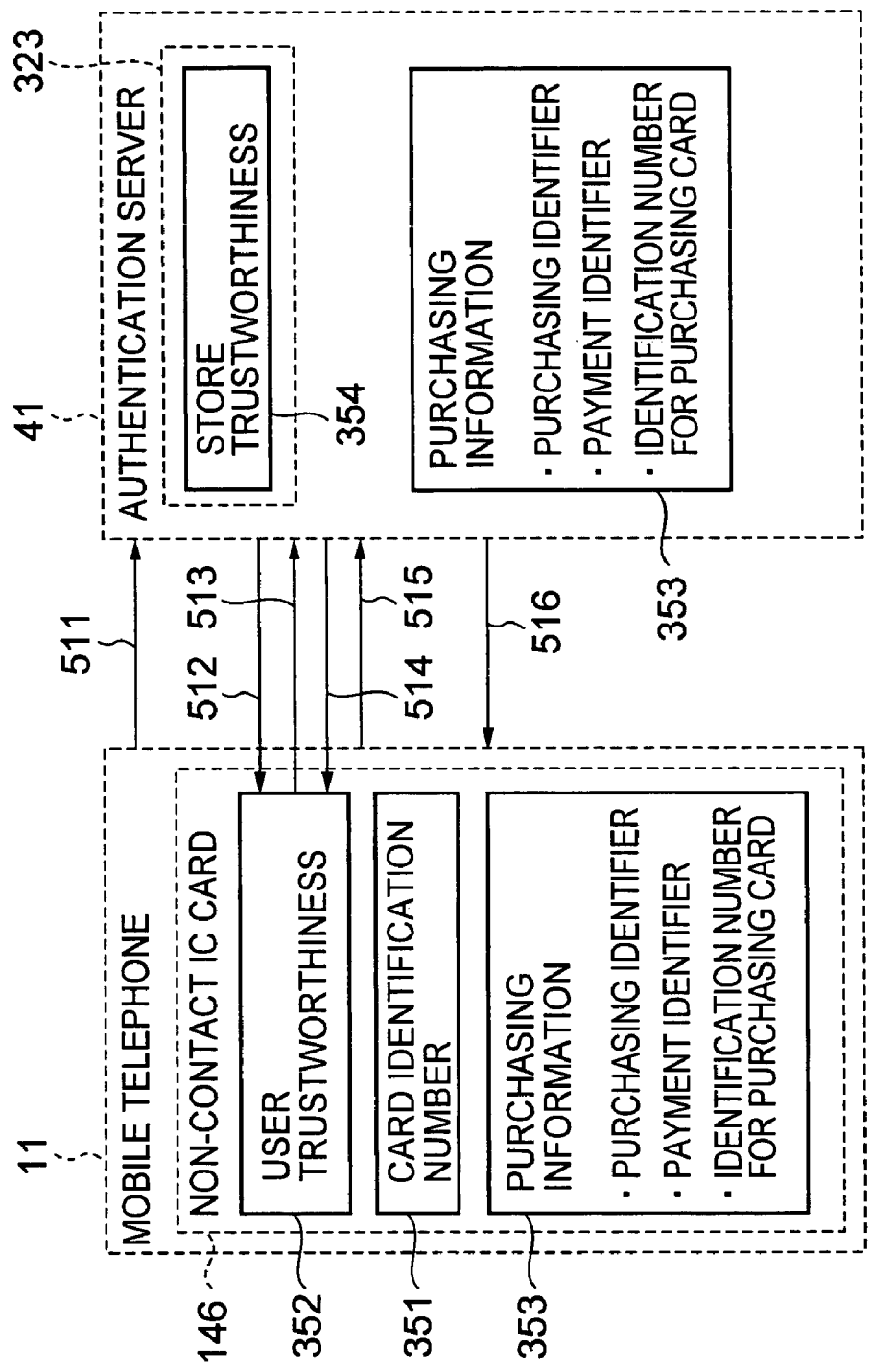
FIG. 47 is a view illustrating an example of the flow of processing relating to updating of user trustworthiness.

Next, as shown in FIG. 47, a description is given corresponding to the case of FIG. 24 of the flow of processing by the mobile telephone 11 and the authentication server 41 relating to updating of user trustworthiness.

In FIG. 47, as with the case in FIG. 24, the mobile telephone 11 accesses the authentication server 41 (arrow 511), but in a point of difference with the case of FIG. 24, the authentication server 41 does not request temporary commercial transaction information, but does request (arrow 512) and acquire (arrow 513) user trustworthiness information. The authentication server 41 then updates the user trustworthiness 352 contained in the acquired user trustworthiness information based on the purchasing information 353 provided by the point-of-purchase server 21 and provides this to (arrow 514) and stores this in the mobile telephone 11.

When the user trustworthiness 352 contained in the acquired user trustworthiness information is stored, the mobile telephone 11 provides notification of completion of writing to the authentication server 41 (arrow 515). When notification of completion of writing is acquired, the authentication server 41 provides notification of completion of processing to the mobile telephone 11 (arrow 516) and processing is complete.

Figure 48:
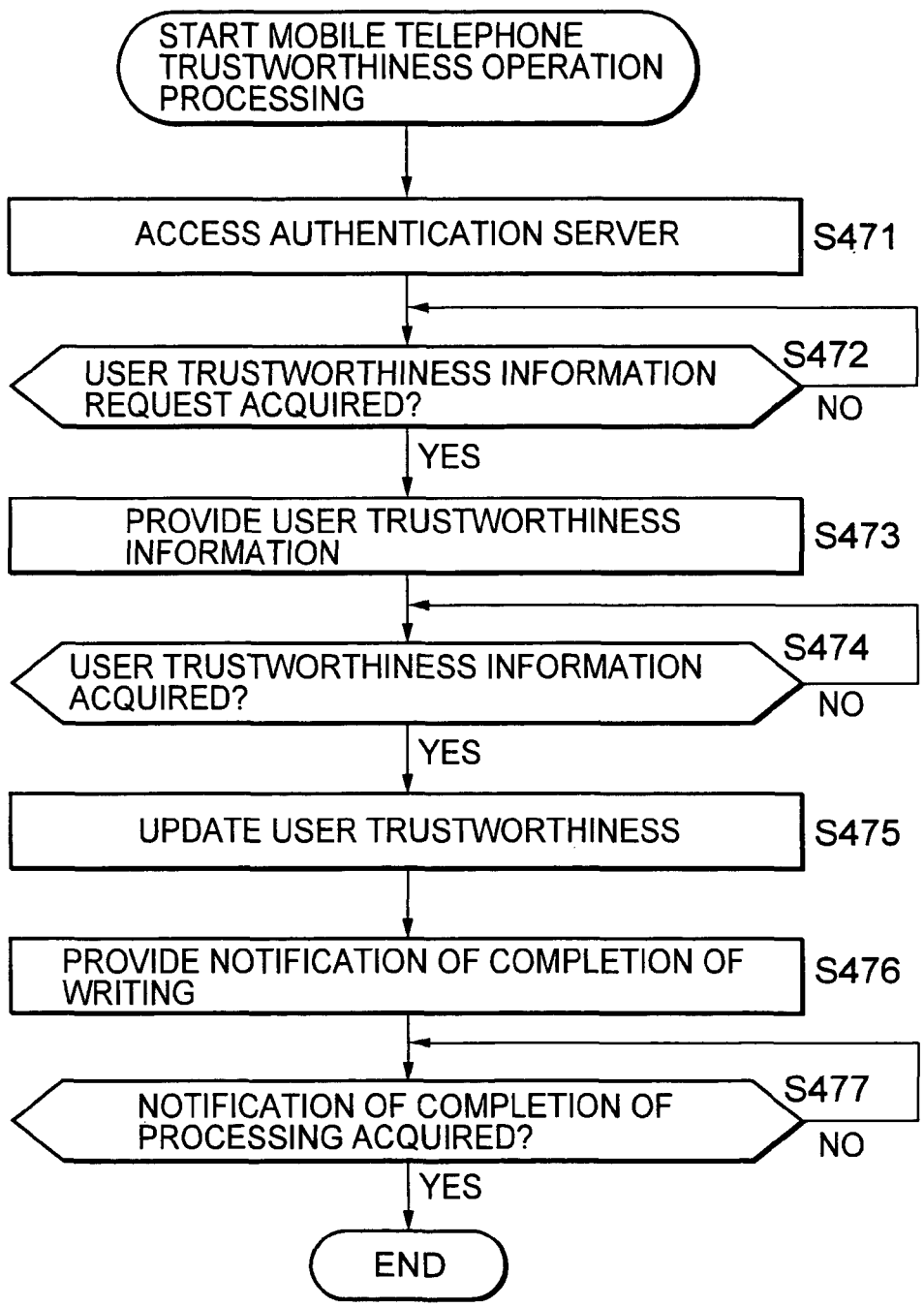
FIG. 48 is a flowchart illustrating trustworthiness operation processing carried out by a mobile telephone.

Trustworthiness operation processing carried out by the mobile telephone 11 executed when updating the user trustworthiness as described above is now described with reference to the flowchart of FIG. 48. A description is now given corresponding to the flowcharts FIG. 25 and FIG. 26 as necessary.

First, in step S471, as in the case of step S171 of FIG. 25, the main control unit 131 of the mobile telephone 11 accesses the authentication server 41 via the network 10.

As described in the following, rather than requesting the temporary commercial transaction information 391, the authentication server 41 requests user trustworthiness information containing the user trustworthiness 352 stored in the non-contact IC card 146.

In step S472 to step S476, the main control unit 131 of the mobile telephone 11 carries out the same processing as in the case of step S174 of FIG. 25 to step S181 of FIG. 26.

Namely, in step S472, as in the case of step S174 of FIG. 25, the main control unit 131 determines whether or not a request for user trustworthiness information has been acquired, and waits until it is determined that acquisition has taken place.

When a request for user trustworthiness information is acquired, the main control unit 131 advances processing to step S473, and as in the case of step S275 of FIG. 25, the requested user trustworthiness information containing the user trustworthiness 352 is provided to the authentication server 41.

In step S474, as in the case of step S176 of FIG. 25, the main control unit 131 determines whether or not a request for user trustworthiness information containing the updated user trustworthiness 352 and the user trustworthiness rewriting key 363 has been acquired, and waits until it is determined that acquisition has taken place.

When it is determined that the user trustworthiness information has been acquired, the main control unit 131 advances processing to step S475, and as in the case of step S177 of FIG. 25, the user trustworthiness 352 recorded in the non-contact IC card 146 is updated by overwriting with the updated user trustworthiness 352 using the user trustworthiness information rewriting key 363 contained in the acquired user trustworthiness information.

In step S476, as in the case of step S181 of FIG. 26, the main control unit 131 with the updated user trustworthiness 352 recorded in the non-contact IC card 146 provides notification of completion of writing to the authentication server 41.

As described in the following, the authentication server 41 then provides notification of completion of processing to the mobile telephone 11 without requesting deletion of the temporary commercial transaction information 391.

Namely, in step S477, as in the case of step S185 of FIG. 26, the main control unit 131 of the mobile telephone 11 determines whether or not notification of completion of processing has been acquired, and waits until it is determined that acquisition has taken place.

When it is determined that notification of completion of processing has been acquired, the main control unit 131 completes the trustworthiness operation processing.

Figure 49:
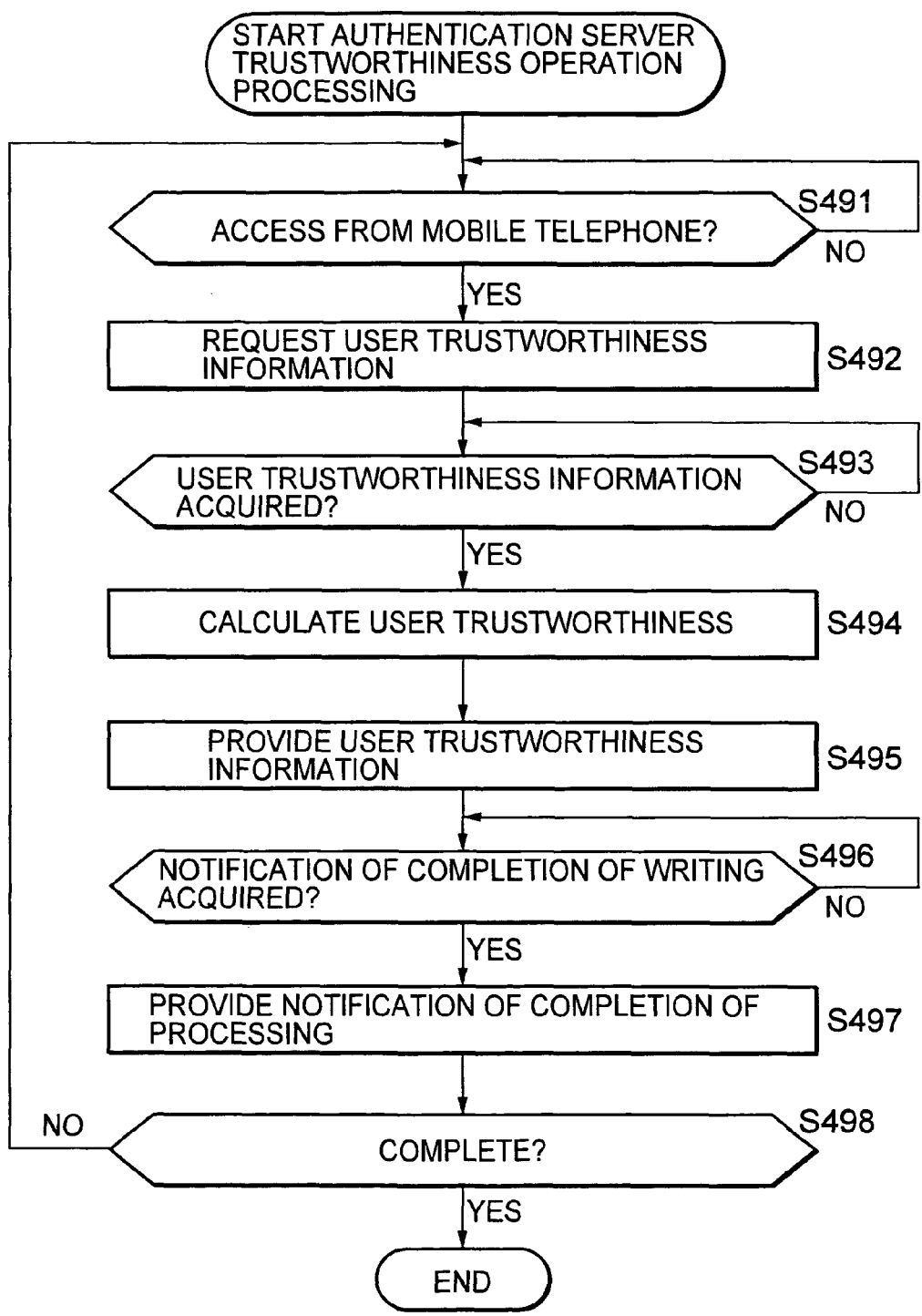
FIG. 49 is a flowchart illustrating trustworthiness operation processing carried out by the authentication server.

A description is given with reference to the flowchart of FIG. 49 of trustworthiness operation processing of the authentication server 41 carried out in such a manner as to correspond with trustworthiness operation processing of the mobile telephone 11 described above.

First, in step S491, as in the case of step S201 of FIG. 27, the CPU 311 of the authentication server 41 controls the communication unit 324, it is determined whether or not there has been an access by the mobile telephone 11, and determination that an access has been made is awaited. When it is determined that an access has been made, the CPU 311 advances processing to step S492.

The processing from step S492 to step S496 of FIG. 49 by the CPU 311 corresponds to the processing of step S205 of FIG. 27 to step S211 of FIG. 28, is the same processing, and is therefore omitted from this description.

Namely, in step S492, the CPU 311 requests user trustworthiness information containing user trustworthiness 352 stored in the non-contact IC card 146. In step S493, a determination is made as to whether or not the requested user trustworthiness information has been acquired, and a determination of acquisition is awaited. When it is determined that the requested user trustworthiness information has been acquired, in step S494, the user trustworthiness 352 is updated based on the purchasing information 353 stored in the storage unit 323. In step S495, the updated user trustworthiness information is provided to the mobile telephone 11.

Next, in step S496, the communication unit 324 is controlled and whether or not notification of completion of writing provided by the mobile telephone 11 has been acquired is determined, with determination that acquisition has taken place then being awaited. When this is determined to have been acquired, the CPU 311 does not request deletion of temporary commercial transaction as in the case in FIG. 28, but rather advances to step S497 and provides notification of completion of processing to the mobile telephone 11.

Next, in step S498, as in the case of step S215 of FIG. 28, the CPU 311 determines whether or not processing is finished. When it is determined that the processing is not finished, the processing returns to step S491 and processing from there onwards is repeated.

Further, when it is determined that the processing is complete, the CPU 311 ends the trustworthiness operation processing.

In this way, the results of processing purchasing information can be reflected in user trustworthiness.

In the above, it is possible to implement a basic service where temporary commercial transaction information is not used by not having the point-of-receipt server 31 delete the purchasing information 353 of the mobile telephone 11 and by having the authentication server 41 update the user trustworthiness of the mobile telephone 11 based on the purchasing information.

In the above, a description is given where the purchaser of the merchandise acquires purchasing information 353 using the mobile telephone 11, and authentication processing is then carried out using the acquired purchasing information 353 when receiving the merchandise. However, the device used by the purchase may be any mobile communication terminal device such as, for example, a PDA (Personal Digital Assistant) etc.

The series of processes described above are executed using hardware, but may also be executed using software. When the series of processes is implemented using software, the programs comprising this software may be built-into dedicated hardware of a computer. Further, as it is possible to implement various functions by installing the various programs, installation is also possible from a network or recording medium to, for example, a general-purpose personal computer.

As shown in FIGS. 4, 7, 8 and 10, in addition to this recording medium for distribution providing programs to the users that is separate from the device body being comprised of magnetic discs 151, 231, 281 and 331 (including flexible discs) recorded with the programs, optical discs 152, 232, 282 and 332 (including CD-ROMs (Compact Disk-Read Only Memory) and DVDs (Digital Versatile Discs), magneto-optical discs 153, 233, 283 and 333 (including MDs (Mini-Discs) (trademark)), or packaged media such as semiconductor memory 154, 234, 284 and 334 etc., the programs may also be provided to the users in a manner built-into the device body, such as in the case of ROM 202, 252 and 312 recorded with the programs or with hard discs containing storage unit 223, 273 and 323 etc.

In this specification, the steps described by programs recorded in recording media are for processing carried out in chronological order in the order disclosed but this processing by no means has to be carried out in chronological order, and these processes may also be executed in parallel or individually.

In the above, "system" refers to the overall device configured from a plurality of devices.

INDUSTRIAL APPLICABILITY

According to the first information processing system of the present invention described above, it is possible to carry out electronic commercial transactions. In particular, it is possible to easily authenticate a purchaser of merchandise and more secure electronic commercial transactions can be carried out in a straightforward manner.

According to the second information processing system of the present invention described above, it is possible to carry out electronic commercial transactions. In particular, it is possible to be aware of the trustworthiness of a commercial transaction target and more secure commercial transactions can easily be carried out.

Further, according to an information communication terminal and method, first recording medium and first program of the present invention, it is possible to carry out more secure electronic commercial transactions in a straightforward manner. In particular, it is possible to hold purchasing information indicating purchased merchandise.

Moreover, according to a first information processing apparatus and method, second recording medium and second program of the present invention, it is possible to carry out more secure electronic commercial transactions in a straightforward manner. In particular, it is possible to authenticate a rightful purchaser of merchandise using purchasing information indicating purchased merchandise.

Further, according to a second information processing apparatus and method, third recording medium and third program of the present invention, it is possible to carry out more secure electronic commercial transactions in a straightforward manner. In particular, it is possible to manage trustworthiness of stores selling merchandise and trustworthiness of purchasers purchasing merchandise.

The invention claimed is:

1. An information processing system comprising:
an information communication terminal connected to a network, for holding information relating to a commercial transaction;
a first information processing apparatus connected to said network, for managing information relating to said commercial transaction; and
a second information processing apparatus connected to said network, for managing information relating to trustworthiness of a first user of said information communication terminal and information relating to trustworthiness of a second user of said first information processing apparatus;
wherein said information communication terminal comprises:
a non-contact IC card that utilizes electromagnetic induction for communication, an identification number of the non-contact IC card being included in the information relating to the commercial transaction upon receiving a product of the commercial transaction,
a first storage unit that stores information relating to trustworthiness of said first user;
a first providing unit that provides information relating to trustworthiness of said first user to said first information processing apparatus directly by short-range wireless communication;
a first acquiring unit that acquires information relating to trustworthiness of said second user from said second information processing apparatus;
a second acquiring unit that acquires information relating to said commercial transaction from said first information processing apparatus directly by short-range wireless communication;
a second providing unit that provides trustworthiness of said first user and information relating to said commercial transaction to said second information processing apparatus; and
a third acquiring unit that acquires information relating to trustworthiness of said first user updated by said second information processing apparatus,
wherein said first information processing apparatus comprises:
a fourth acquiring unit that acquires information relating to trustworthiness of said first user from said information communication terminal directly by short-range wireless communication; and
a third providing unit that provides information relating to said commercial transaction to said information communication terminal directly by short-range wireless communication; and
wherein said second information processing apparatus comprises:
a second storage unit that stores information relating to trustworthiness of said second user;
a fourth providing unit that provides information relating to trustworthiness of said second user to said information communication terminal;
a fifth acquiring unit that acquires information relating to said first user from said information communication terminal and information relating to said commercial transaction;
an updating unit that updates information relating to said first user and information relating to trustworthiness of said second user based on information relating to said commercial transaction; and
a fifth providing unit that provides said information relating to trustworthiness of said first user updated by said updating unit to said information communication terminal,
wherein the non-contact IC card stores purchasing information of said commercial transaction in a first location in the non-contact IC card, the purchasing information includes a purchasing identifier, a payment identifier, and the identification number of the non-contact IC cards, and the non-contact IC card also stores the identification number in a second location different from the first location in the non-contact IC card, and wherein a one-time password is required each time the information relating to said commercial transaction is updated so that an illegal duplication or falsification is prevented.

2. An information communication terminal comprising:

a first acquiring unit that acquires information relating to a commercial transaction employed in user authentication during product purchasing;

a storage unit that stores information relating to said commercial transaction acquired by said first acquiring unit; and a first providing unit that provides said information relating to said commercial transaction during receipt of product directly by short-range wireless communication;

a second acquiring unit that acquires key information required for editing information relating to said commercial transaction; and a deleting unit that deletes information relating to said commercial transaction, by using said key information, wherein the information communication terminal further comprises a non-contact IC card that utilizes electromagnetic induction for communication, an identification number of the non-contact IC card being included in the information relating to the commercial transaction upon receiving a product of the commercial transaction, and wherein the non-contact IC card stores purchasing information of said commercial transaction in a first location in the non-contact IC card, the purchasing information includes a purchasing identifier, a payment identifier, and the identification number of the non-contact IC cards, and the non-contact IC card also stores the identification number in a second location different from the first location in the non-contact IC card, and wherein a one-time password is required each time the information relating to said commercial transaction is updated so that an illegal duplication or falsification is prevented.

3. An information communication terminal comprising:

a first storage unit that stores information relating to trustworthiness of a user decided based on results of past commercial transactions of said user;

a first providing unit that provides said information relating to trustworthiness of said user directly by short-range wireless communication;

a first acquiring unit that acquires information relating to a commercial transaction employed in user authentication during product purchasing;

a second storage unit that stores information relating to said commercial transaction; and a second providing unit that provides information relating to said commercial transaction during product purchasing, wherein the information communication terminal further comprises a non-contact IC card that utilizes electromagnetic induction for communication, an identification number of the non-contact IC card being included in the information relating to the commercial transaction upon receiving a product of the commercial transaction, and wherein the non-contact IC card stores purchasing information of said commercial transaction in a first location in the non-contact IC card, the purchasing information includes a purchasing identifier, a payment identifier, and the identification number of the non-contact IC cards, and the non-contact IC card also stores the identification number in a second location different from the first location in the non-contact IC card, and wherein a one-time password is required each time the information relating to said commercial transaction is updated so that an illegal duplication or falsification is prevented.

4. The information communication terminal according to claim 3, further comprising:

a second acquiring unit that acquires key information required to edit information relating to trustworthiness of said user; and said first storage unit stores information relating to trustworthiness of said user using said key information.

5. The information communication terminal according to claim 3, further comprising:

a password input unit that inputs a password permitting providing information relating to trustworthiness of said user; and an authentication unit that authenticates said password;

wherein said first providing unit provides information relating to trustworthiness of said user if said password is authenticated made by said authentication unit.

6. An information communication terminal comprising:

a first acquiring unit that acquires information relating to a commercial transaction employed in user authentication during product purchasing;

a storage unit that stores information relating to said commercial transaction; and a first providing unit that provides said information relating to said commercial transaction during receipt of product directly by short-range wireless communication;

a second acquiring unit that acquires information relating to trustworthiness of a commercial transaction target of said commercial transaction constituted by said user of said first information processing apparatus from a second information processing apparatus separate from said first information processing apparatus; and a display unit that displays information relating to trustworthiness of said commercial transaction target, wherein the information communication terminal further comprises a non-contact IC card that utilizes electromagnetic induction for communication, an identification number of the non-contact IC card being included in the information relating to the commercial transaction upon receiving a product of the commercial transaction, and wherein the non-contact IC card stores purchasing information of said commercial transaction in a first location in the non-contact IC card, the purchasing information includes a purchasing identifier, a payment identifier, and the identification number of the non-contact IC cards, and the non-contact IC card also stores the identification number in a second location different from the first location in the non-contact IC card, and wherein a one-time password is required each time the information relating to said commercial transaction is updated so that an illegal duplication or falsification is prevented.

7. The information communication terminal according to claim 6, further comprising:

a third acquiring unit that acquires information in order to decide trustworthiness of said commercial transaction target of said commercial transaction; and a second providing unit that provides information;

wherein said storage unit stores information relating to said first information processing apparatus.

8. The information communication terminal according to claim 7, further comprising:
- a fourth acquiring unit that acquires key information required to edit information; and
- a deleting unit that deletes information using said key information.

9. An information processing apparatus connected to a network, for managing information relating to a commercial transaction, comprising:
- a first acquiring unit that acquires information relating to trustworthiness of a target of said commercial transaction directly by short-range wireless communication;
- a generating unit that generates information relating to said commercial transaction during product sales;
- a first providing unit that provides information relating to said commercial transaction directly by short-range wireless communication;
- a storage unit that stores information relating to said commercial transaction;
- a second acquiring unit that acquires information relating to said commercial transaction during product delivery directly by short-range wireless communication;
- an authentication unit that authenticates information relating to said commercial transaction using information relating to said commercial transaction; and
- a second providing unit that provides information relating to said information processing apparatus for generating information relating to user trustworthiness,
- wherein the second acquiring unit acquires in a first acquiring process purchasing information of said commercial transaction from a non-contact IC card, the purchasing information includes a purchasing identifier, a payment identifier, and an identification number of the non-contact IC card, and the second acquiring unit acquires in a second acquiring process the identification number from the non-contact IC card, and
- wherein a one-time password is required each time the information relating to said commercial transaction is updated so that an illegal duplication or falsification is prevented.

10. An information processing method for an information processing apparatus connected to a network, for managing information relating to a commercial transaction, comprising:
- a first acquisition control step of controlling the acquisition of information relating to trustworthiness of a target of said commercial transaction;
- a generating step for generating information relating to said commercial transaction during product sales;
- a first providing control step for controlling providing of information relating to said commercial transaction generated by said generating step process directly by short-range wireless communication;
- a storage control step for controlling storage of information relating to said commercial transaction generated by said generating step process;
- a second acquisition control step for controlling acquisition of information relating to said commercial transaction during product delivery;
- an authentication step for authenticating information relating to said commercial transaction having acquisition thereof controlled by said second acquisition control step using information relating to said commercial transaction having storage thereof controlled by said storage control step process; and
- a second providing control step for controlling providing of information for generating information relating to user trustworthiness to authenticated by said authentication step directly by short-range wireless communication,
- wherein the second acquisition control step acquires in a first acquiring process purchasing information of said commercial transaction from a non-contact IC card, the purchasing information includes a purchasing identifier, a payment identifier, and an identification number of the non-contact IC card, and the second acquiring unit acquires in a second acquiring process the identification number from the non-contact IC card, and
- wherein a one-time password is required each time the information relating to said commercial transaction is updated so that an illegal duplication or falsification is prevented.

11. A computer-readable recording medium recorded with a computer-executable program for use by an information processing apparatus connected to a network, for managing information relating to a commercial transaction, comprising:
- a first acquisition control step of controlling the acquisition of information relating to trustworthiness of said commercial transaction target;
- a generating step for generating information relating to said commercial transaction during product sales;
- a first providing control step for controlling providing of information relating to said commercial transaction generated by said generating step process directly by short-range wireless communication;
- a storage control step for controlling storage of information relating to said commercial transaction generated by said generating step process;
- a second acquisition control step for controlling acquisition of information relating to said commercial transaction during product delivery;
- an authentication step for authenticating information relating to said commercial transaction having acquisition thereof controlled by said second acquisition control step using information relating to said commercial transaction having storage thereof controlled by said storage control step process; and
- a second providing control step for controlling providing of information relating to said information processing apparatus for generating information relating to user trustworthiness to authenticated by said authentication step directly by short-range wireless communication,
- wherein the second acquisition control step acquires in a first acquiring process purchasing information of said commercial transaction from a non-contact IC card, the purchasing information includes a purchasing identifier, a payment identifier, and an identification number of the non-contact IC card, and the second acquiring unit acquires in a second acquiring process the identification number from the non-contact IC card, and
- wherein a one-time password is required each time the information relating to said commercial transaction is updated so that an illegal duplication or falsification is prevented.

12. An information processing system connected to a network, for managing information relating to trustworthiness of a first user of an information communication terminal and information relating to trustworthiness of a second user of another information processing apparatus, comprising:
- a storage unit that stores information relating to trustworthiness of said second user;
- a first providing unit that provides information relating to trustworthiness of said second user to said information communication terminal directly by short-range wireless communication;
- an acquiring unit that acquires information relating to said first user from said information communication terminal and information relating to a commercial transaction directly by short-range wireless communication;

an updating unit that updates information relating to said first user and information relating to trustworthiness of said second user based on information relating to said commercial transaction; and a second providing unit that provides information relating to trustworthiness of said first user to said information communication terminal directly by short-range wireless communication, wherein the information communication terminal further comprises a non-contact IC card that utilizes electromagnetic induction for communication, an identification number of the non-contact IC card being included in the information relating to the commercial transaction upon receiving a product of the commercial transaction, and wherein the non-contact IC card stores purchasing information of said commercial transaction in a first location in the non-contact IC card, the purchasing information includes a purchasing identifier, a payment identifier, and the identification number of the non-contact IC cards, and the non-contact IC cards also stores the identification number in a second location different from the first location in the non-contact IC card, and wherein a one-time password is required each time the information relating to said commercial transaction is updated so that an illegal duplication or falsification is prevented.

13. An information processing method, executed by a processor, for an information processing system connected to a network, for managing information relating to trustworthiness of a first user of an information communication terminal and information relating to trustworthiness of a second user of another information processing apparatus, comprising:

a storage control step of controlling storage of information relating to trustworthiness of said second user;

a first provision control step of controlling providing of information relating to trustworthiness of said second user directly by short-range wireless communication, the storage thereof being controlled by processing of said storage control step, to said information communication terminal;

an acquisition control step of controlling acquisition of information relating to said first user provided by said information communication terminal and information relating to a commercial transaction directly by short-range wireless communication;

an updating step for updating information relating to trustworthiness of said first user with the acquisition thereof controlled by the processing of said acquisition control step and information relating to trustworthiness of said second user with the storage thereof controlled by the processing of said storage control step based on information relating to said commercial transaction with acquisition thereof controlled by processing of said acquisition control step; and a second provision control step of controlling providing of information relating to trustworthiness of said first user updated by processing of said updating step, to said information communication terminal directly by short-range wireless communication, wherein the information communication terminal further comprises a non-contact IC card that utilizes electromagnetic induction for communication, an identification number of the non-contact IC card being included in the information relating to the commercial transaction upon receiving a product of the commercial transaction, and wherein the non-contact IC card stores purchasing information of said commercial transaction in a first location in the non-contact IC card, the purchasing information includes a purchasing identifier, a payment identifier, and the identification number of the non-contact IC cards, and the non-contact IC cards also stores the identification number in a second location different from the first location in the non-contact IC card, and wherein a one-time password is required each time the information relating to said commercial transaction is updated so that an illegal duplication or falsification is prevented.

14. A recording medium recorded with a computer-readable program for use with an information processing system connected to a network, for managing information relating to trustworthiness of a first user of an information communication terminal and information relating to trustworthiness of a second user of another information processing apparatus, comprising:

a storage control step of controlling storage of information relating to trustworthiness of said second user;

a first provision control step of controlling providing of information relating to trustworthiness of said second user directly by short-range wireless communication, the storage thereof being controlled by processing of said storage control step, to said information communication terminal;

an acquisition control step of controlling acquisition of information relating to said first user provided by said information communication terminal and information relating to a commercial transaction directly by short-range wireless communication;

an updating step for updating information relating to trustworthiness of said first user with the acquisition thereof controlled by the processing of said acquisition control step and information relating to trustworthiness of said second user with the storage thereof controlled by the processing of said storage control step based on information relating to said commercial transaction with acquisition thereof controlled by processing of said acquisition control step; and a second provision control step of controlling providing of information relating to trustworthiness of said first user updated by processing of said updating step, to said information communication terminal directly by short-range wireless communication, wherein the information communication terminal further comprises a non-contact IC card that utilizes electromagnetic induction for communication, an identification number of the non-contact IC card being included in the information relating to the commercial transaction upon receiving a product of the commercial transaction, and wherein the non-contact IC card stores purchasing information of said commercial transaction in a first location in the non-contact IC card, the purchasing information includes a purchasing identifier, a payment identifier, and the identification number of the non-contact IC cards, and the non-contact IC cards also stores the identification number in a second location different from the first location in the non-contact IC card, and wherein a one-time password is required each time the information relating to said commercial transaction is updated so that an illegal duplication or falsification is prevented.

* * * * *